(12) United States Patent
Paluzzi

(10) Patent No.: US 6,901,468 B1
(45) Date of Patent: May 31, 2005

(54) DATA STORAGE SYSTEM HAVING SEPARATE DATA TRANSFER SECTION AND MESSAGE NETWORK HAVING BUS ARBITRATION

(75) Inventor: Nicholas Paluzzi, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 536 days.

(21) Appl. No.: 09/671,038

(22) Filed: Sep. 27, 2000

(51) Int. Cl.[7] .............................................. G06F 13/36
(52) U.S. Cl. ...................................... 710/116; 710/240
(58) Field of Search ................................. 710/116, 120, 710/123, 243, 240, 244, 241, 107, 113, 117, 40

(56) References Cited

U.S. PATENT DOCUMENTS

| | | | |
|---|---|---|---|
| 5,241,632 A | * 8/1993 | O'Connell et al. | 710/117 |
| 5,623,672 A | * 4/1997 | Popat | 710/100 |
| 5,706,446 A | * 1/1998 | Kalish et al. | 710/113 |
| 5,754,800 A | * 5/1998 | Lentz et al. | 710/116 |
| 6,128,677 A | * 10/2000 | Miller et al. | 710/40 |
| 6,311,244 B1 | * 10/2001 | Sheafor et al. | 710/107 |
| 6,571,306 B1 | * 5/2003 | Smith | 710/240 |

* cited by examiner

*Primary Examiner*—Khanh Dang

(57) ABSTRACT

A system interface includes a plurality of first directors, a plurality of second directors, a data transfer section and a message network. The data transfer section includes a cache memory. The cache memory is coupled to the plurality of first and second directors. The messaging network operates independently of the data transfer section and such network is coupled to the plurality of first directors and the plurality of second directors. The first and second directors control data transfer between the first directors and the second directors in response to messages passing between the first directors and the second directors through the messaging network to facilitate data transfer between first directors and the second directors. The data passes through the cache memory in the data transfer section. A method for operating a data storage system adapted to transfer data between a host computer/server and a bank of disk drives. The method includes transferring messages through a messaging network with the data being transferred between the host computer/server and the bank of disk drives through a cache memory, such message network being independent of the cache memory.

1 Claim, 30 Drawing Sheets

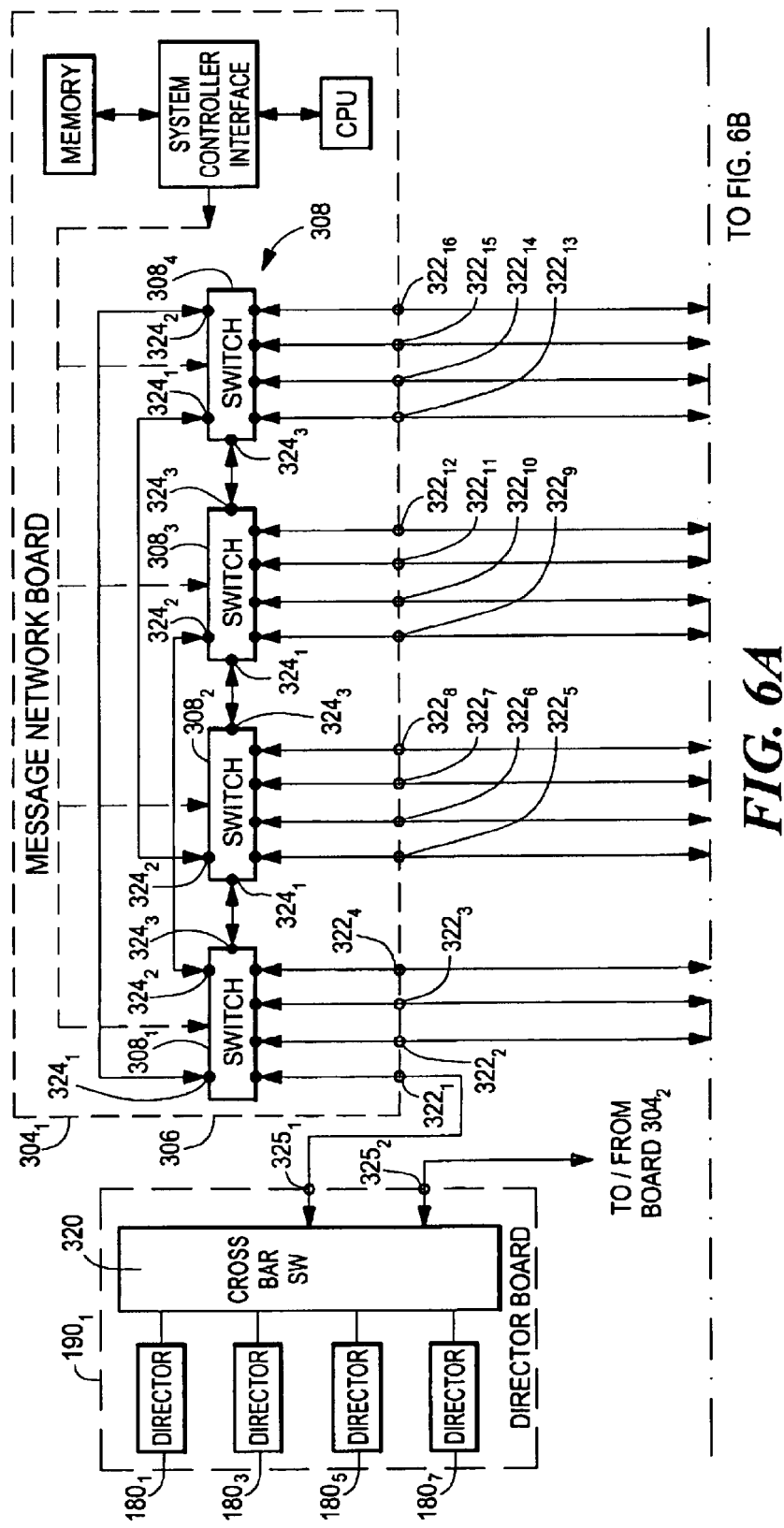

| FIG. 8C-1 |
|---|
| FIG. 8C-2 |

| Bit Position | 1 | 2 | 3 | 4 | ... | 62 | 63 | 64 | |
|---|---|---|---|---|---|---|---|---|---|
| | 1 | 0 | 0 | 0 | | 0 | 0 | 0 | FIG. 11C |
| | 0 | 1 | 0 | 0 | | 0 | 0 | 0 | FIG. 11D |
| | 0 | 1 | 1 | 0 | | 0 | 1 | 1 | FIG. 11E |
| | 1 | 1 | 1 | 1 | | 1 | 1 | 0 | FIG. 11F |
| | 0 | 1 | 1 | 0 | | 0 | 1 | 0 | FIG. 11G |

FIG. 19

| POTENTIAL GRANT TO | CPU_BR | DMAREC_BR | DMAXMT_BR | DPDMA_BR | CPU_BG_STATUS | DMAREC_BG_STATUS | DMAXMT_BG_STATUS | DPDMA_BG_STATUS | CPU_BG_CNTLIM | DMAREC_BG_CNTLIM | DMAXMT_BG_CNTLIM | DPDMA_BG_CNTLIM | DOUBLE ACCESS |
|---|---|---|---|---|---|---|---|---|---|---|---|---|---|
| (CPU_BG)' | DC | 0 | 0 | 0 | DC | DC | DC | DC | DC | DC | DC | DC | DC |
| (CPU_BG)' | 1 | DC | DC | DC | 0 | DC | DC | DC | DC | 0 | 0 | 0 | 0 |
| (CPU_BG)' | 1 | DC | DC | DC | DC | DC | DC | DC | 1 | DC | DC | DC | 0 |
| (DMAREC_BG)' | 0 | 1 | 0 | 0 | DC | DC | DC | DC | DC | DC | DC | DC | DC |
| (DMAREC_BG)' | DC | 1 | DC | DC | DC | 0 | DC | DC | DC | 1 | DC | DC | 1 |
| (DMAREC_BG)' | 0 | 1 | DC | DC | DC | 1 | DC | DC | 0 | DC | DC | DC | DC |
| (DMAREC_BG)' | 1 | 1 | DC | DC | 1 | DC | DC | DC | 0 | 0 | 0 | 0 | DC |
| (DMAXMT_BG)' | DC | 0 | 1 | 0 | DC | DC | DC | DC | DC | DC | DC | DC | DC |
| (DMAXMT_BG)' | 0 | 0 | 1 | DC | DC | DC | 0 | DC | DC | DC | DC | DC | DC |
| (DMAXMT_BG)' | 0 | 1 | 1 | DC | DC | 1 | DC | DC | DC | DC | DC | DC | DC |
| (DMAXMT_BG)' | 1 | 0 | 1 | DC | 1 | DC | DC | DC | 0 | DC | DC | DC | DC |
| (DPDMA_BG)' | DC | 0 | 0 | 1 | DC | DC | 1 | DC | DC | DC | 1 | DC | DC |
| (DPDMA_BG)' | 0 | 0 | 1 | 1 | DC | DC | DC | 0 | DC | DC | DC | DC | 0 |
| (DPDMA_BG)' | 0 | 0 | 0 | 1 | DC | DC | DC | DC | DC | DC | DC | DC | DC |
| (DPDMA_BG)' | 0 | 1 | 0 | 1 | 1 | DC | DC | DC | 0 | DC | DC | DC | 0 |
| (DPDMA_BG)' | 1 | 0 | DC | 1 | DC | DC | DC | DC | 0 | 0 | 0 | 1 | 0 |

DATA STORAGE SYSTEM HAVING SEPARATE DATA TRANSFER SECTION AND MESSAGE NETWORK HAVING BUS ARBITRATION

TECHNICAL FIELD

This invention relates generally to data storage systems, and more particularly to data storage systems having redundancy arrangements to protect against total system failure in the event of a failure in a component or subassembly of the storage system.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

The arrangement is shown schematically in FIG. 1. Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box" (not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

When data is to be read from a disk drive in bank 22 to the host computer/server 12 the system operates in a reciprocal manner. More particularly, during a read operation, a read request is instituted by the host computer/server 12 for data at specified memory locations (i.e., a requested data block). One of the front-end directors 14 receives the read request and examines the cache memory 18 to determine whether the requested data block is stored in the cache memory 18. If the requested data block is in the cache memory 18, the requested data block is read from the cache memory 18 and is sent to the host computer/server 12. If the front-end director 14 determines that the requested data block is not in the cache memory 18 (i.e., a so-called "cache miss") and the director 14 writes a note in the cache memory 18 (i.e., the "mail box") that it needs to receive the requested data block. The back-end directors 20 poll the cache memory 18 to determine whether there is an action to be taken (i.e., a read operation of the requested block of data). The one of the back-end directors 20 which poll the cache memory 18 mail box and detects a read operation reads the requested data block and initiates storage of such requested data block stored in the cache memory 18. When the storage is completely written into the cache memory 18, a read complete indication is placed in the "mail box" in the cache memory 18. It is to be noted that the front-end directors 14 are polling the cache memory 18 for read complete indications. When one of the polling front-end directors 14 detects a read complete indication, such front-end director 14 completes the transfer of the requested data which is now stored in the cache memory 18 to the host computer/server 12.

The use of mailboxes and polling requires time to transfer data between the host computer/server 12 and the bank 22 of disk drives thus reducing the operating bandwidth of the interface.

SUMMARY

In accordance with the present invention, a system interface is provided. Such interface includes a plurality of first directors, a plurality of second directors, a data transfer section and a message network. The data transfer section includes a cache memory. The cache memory is coupled to the plurality of first and second directors. The messaging network operates independently of the data transfer section and such network is coupled to the plurality of first directors and the plurality of second directors. The first and second directors control data transfer between the first directors and the second directors in response to messages passing between the first directors and the second directors through the messaging network to facilitate data transfer between first directors and the second directors. The data passes through the cache memory in the data transfer section.

With such an arrangement, the cache memory in the data transfer section is not burdened with the task of transferring the director messaging but rather a messaging network is provided, operative independent of the data transfer section, for such messaging thereby increasing the operating bandwidth of the system interface.

In one embodiment of the invention, the system interface each one of the first directors includes a data pipe coupled between an input of such one of the first directors and a the cache memory and a controller for transferring the messages between the message network and such one of the first directors.

In one embodiment each one of the second directors includes a data pipe coupled between an input of such one of the second directors and the cache memory and a controller for transferring the messages between the message network and such one of the second directors.

In one embodiment the directors includes: a data pipe coupled between an input of such one of the first directors and the cache memory; a microprocessor; and a controller coupled to the microprocessor and the data pipe for controlling the transfer of the messages between the message network and such one of the first directors and for controlling the data between the input of such one of the first directors and the cache memory.

In accordance with another feature of the invention, a data storage system is provided for transferring data between a host computer/server and a bank of disk drives through a system interface. The system interface includes a plurality of first directors coupled to host computer/server, a plurality of second directors coupled to the bank of disk drives, a data transfer section, and a message network. The data transfer section includes a cache memory. The cache memory is coupled to the plurality of first and second directors. The message network is operative independently of the data transfer section and such network is coupled to the plurality of first directors and the plurality of second directors. The first and second directors control data transfer between the host computer and the bank of disk drives in response to messages passing between the first directors and the second directors through the messaging network to facilitate the data transfer between host computer/server and the bank of disk drives with such data passing through the cache memory in the data transfer section.

In accordance with yet another embodiment, a method is provided for operating a data storage system adapted to transfer data between a host computer/server and a bank of disk drives. The method includes transferring messages through a messaging network with the data being transferred between the host computer/server and the bank of disk drives through a cache memory, such message network being independent of the cache memory.

In accordance with another embodiment, a method is provided for operating a data storage system adapted to transfer data between a host computer/server and a bank of disk drives through a system interface. The interface includes a plurality of first directors coupled to host computer/server, a plurality of second directors coupled to the bank of disk drives; and a data transfer section having a cache memory, such cache memory being coupled to the plurality of first and second directors. The method comprises transferring the data between the host computer/server and the bank of disk drives under control of the first and second directors in response to messages passing between the first directors and the second directors through a messaging network to facilitate the data transfer between host computer/server and the bank of disk drives with such data passing through the cache memory in the data transfer section, such message network being independent of the cache memory.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other features of the invention will become more readily apparent from the following detailed description when read together with the accompanying drawings, in which:

FIG. 19 is a truth table used in a priority/fairness controller used the arbiter of FIG. 18;

DETAILED DESCRIPTION

Figure 2:
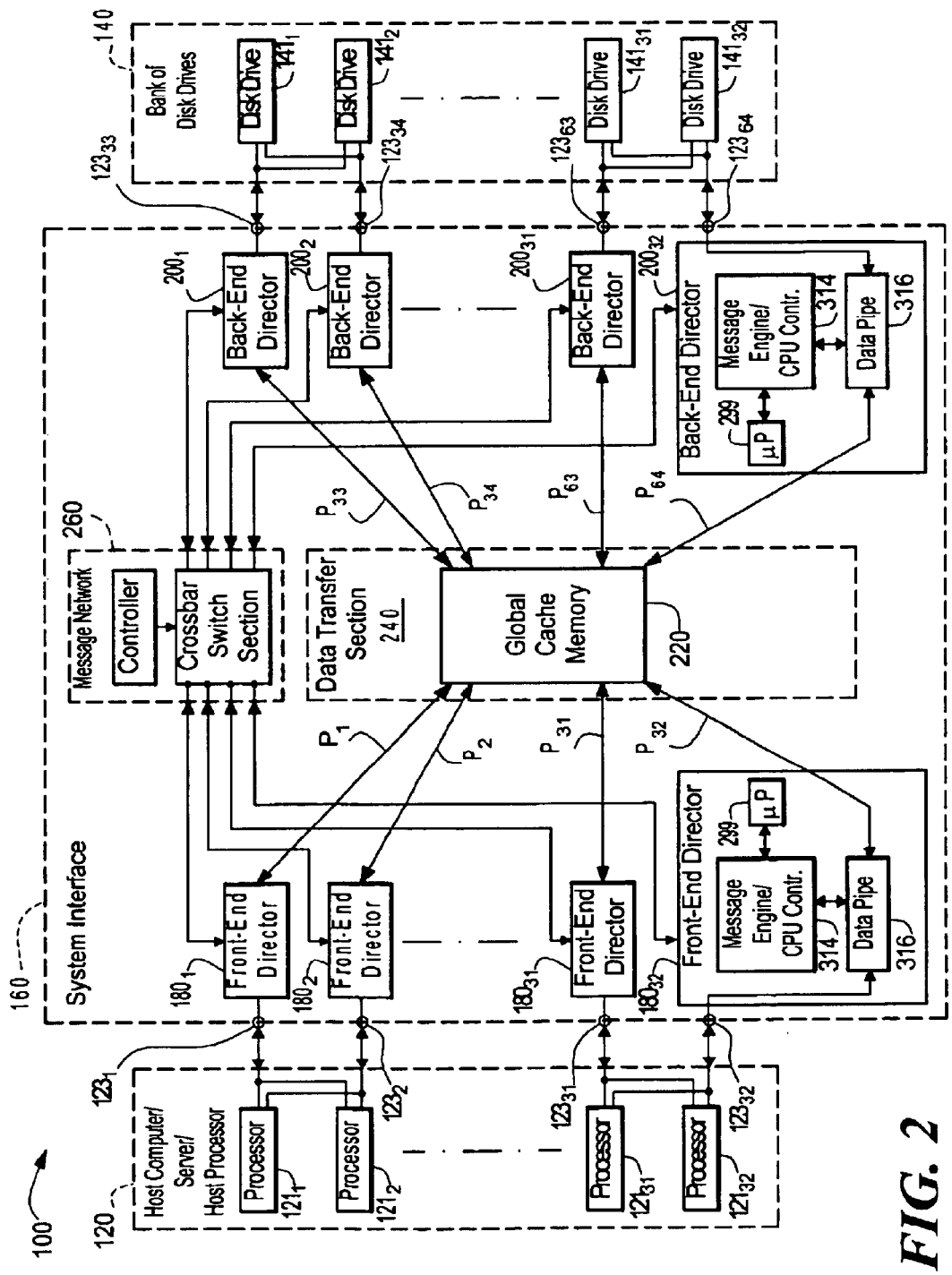
FIG. 2 is a block diagram of a data storage system according to the invention.

Referring now to FIG. 2, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports-$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor ($\mu$P) 299 (i.e., a central processing unit (CPU) and RAM), a message engine/CPU controller 314 and a data pipe 316 to be described in detail in connection with FIGS. 5, 6 and 7. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$–$180_{32}$, the data passes between the host computer to the global cache memory 220 through the data pipe 316 in the front-end directors $180_1$–$180_{32}$ and the messages pass through the message engine/CPU controller 314 in such front-end directors $180_1$–$180_{32}$. In the case of the back-end directors $200_1$–$200_{32}$ the data passes between the back-end directors $200_1$–$200_{32}$ and the bank of disk drives 140 and the global cache memory 220 through the data pipe 316 in the back-end directors $200_1$–$200_{32}$ and again the messages pass through the message engine/CPU controller 314 in such back-end director $200_1$–$200_{32}$.

With such an arrangement, the cache memory 220 in the data transfer section 240 is not burdened with the task of transferring the director messaging. Rather the messaging network 260 operates independent of the data transfer section 240 thereby increasing the operating bandwidth of the system interface 160.

In operation, and considering first a read request by the host computer/server 120 (i.e., the host computer/server 120 requests data from the bank of disk drives 140), the request is passed from one of a plurality of, here 32, host computer processors $121_1$–$121_{32}$ in the host computer 120 to one or more of the pair of the front-end directors $180_1$–$180_{32}$ connected to such host computer processor $121_1$–$121_{32}$. (It is noted that in the host computer 120, each one of the host computer processors $121_1$–$121_{32}$ is coupled to here a pair (but not limited to a pair) of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to here a pair (but not limited to a pair) of the back-end directors $200_1$–$200_{32}$, to provide redundancy in the event of a failure in one of the back-end directors $200_1$–$200_{32}$ coupled thereto). Each front-end director $180_1$–$180_{32}$ includes a microprocessor ($\mu$P) 299 (i.e., a central processing unit (CPU) and RAM) and will be described in detail in connection with FIGS. 5 and 7. Suffice it to say here, however, that the microprocessor 299 makes a request for the data from the global cache memory 220. The global cache memory 220 has a resident cache management table, not shown. Every director $180_1$–$180_{32}$, $200_1$–$200_{32}$ has access to the resident cache management table and every time a front-end director $180_1$–$180_{32}$ requests a data transfer, the front-end director $180_1$–$180_{32}$ must query the global cache memory 220 to determine whether the requested data is in the global cache memory 220. If the requested data is in the global cache memory 220 (i.e., a read "hit"), the front-end director $180_1$–$180_{32}$, more particularly the microprocessor 299 therein, mediates a DMA (Direct Memory Access) operation for the global cache memory 220 and the requested data is transferred to the requesting host computer processor $121_1$–$121_{32}$.

If, on the other hand, the front-end director $180_1$–$180_{32}$ receiving the data request determines that the requested data is not in the global cache memory 220 (i.e., a "miss") as a result of a query of the cache management table in the global cache memory 220, such front-end director $180_1$–$180_{32}$ concludes that the requested data is in the bank of disk drives 140. Thus the front-end director $180_1$–$180_{32}$ that received the request for the data must make a request for the data from one of the back-end directors $200_1$–$200_{32}$ in order for such back-end director $200_1$–$200_{32}$ to request the data from the bank of disk drives 140. The mapping of which back-end directors $200_1$–$200_{32}$ control which disk drives $141_1$–$141_{32}$ in the bank of disk drives 140 is determined during a power-up initialization phase. The map is stored in the global cache memory 220. Thus, when the front-end director $180_1$–$180_{32}$ makes a request for data from the global cache memory 220 and determines that the requested data is not in the global cache memory 220 (i.e., a "miss"), the front-end director $180_1$–$180_{32}$ is also advised by the map in the global cache memory 220 of the back-end director $200_1$–$200_{32}$ responsible for the requested data in the bank of disk drives 140. The requesting front-end director $180_1$–$180_{32}$ then must make a request for the data in the bank of disk drives 140 from the map designated back-end director $200_1$–$200_{32}$. This request between the front-end director $180_1$–$180_{32}$ and the appropriate one of the back-end directors $200_1$–$200_{32}$ (as determined by the map stored in the global cache memory 200) is by a message which passes from the front-end director $180_1$–$180_{32}$ through the message network 260 to the appropriate back-end director $200_1$–$200_{32}$. It is noted then that the message does not pass through the global cache memory 220 (i.e., does not pass through the data transfer section 240) but rather passes through the separate, independent message network 260. Thus, communication between the directors $180_1$–$180_{32}$, $200_1$–$200_{32}$ is through the message network 260 and not through the global cache memory 220. Consequently, valuable bandwidth for the global cache memory 220 is not used for messaging among the directors $180_1$–$180_{32}$, $200_1$–$200_{32}$.

Thus, on a global cache memory 220 "read miss", the front-end director $180_1$–$180_{32}$ sends a message to the appropriate one of the back-end directors $200_1$–$200_{32}$ through the message network 260 to instruct such back-end director $200_1$–$200_{32}$ to transfer the requested data from the bank of disk drives 140 to the global cache memory 220. When accomplished, the back-end director $200_1$–$200_{32}$ advises the requesting front-end director $180_1$–$180_{32}$ that the transfer is accomplished by a message, which passes from the back-end director $200_1$–$200_{32}$ to the front-end director $180_1$–$180_{32}$ through the message network 260. In response to the acknowledgement signal, the front-end director $180_1$–$180_{32}$ is thereby advised that such front-end director $180_1$–$180_{32}$ can transfer the data from the global cache memory 220 to the requesting host computer processor $121_1$–$121_{32}$ as described above when there is a cache "read hit".

It should be noted that there might be one or more back-end directors $200_1$–$200_{32}$ responsible for the requested data. Thus, if only one back-end director $200_1$–$200_{32}$ is responsible for the requested data, the requesting front-end director $180_1$–$180_{32}$ sends a uni-cast message via the message network 260 to only that specific one of the back-end directors $200_1$–$200_{32}$. On the other hand, if more than one of the back-end directors $200_1$–$200_{32}$ is responsible for the requested data, a multi-cast message (here implemented as a series of uni-cast messages) is sent by the requesting one of the front-end directors $180_1$–$180_{32}$ to all of the back-end directors $200_1$–$200_{32}$ having responsibility for the requested data. In any event, with both a uni-cast or multi-cast message, such message is passed through the message network 260 and not through the data transfer section 240 (i.e., not through the global cache memory 220).

Likewise, it should be noted that while one of the host computer processors $121_1$–$121_{32}$ might request data, the acknowledgement signal may be sent to the requesting host computer processor $121_1$ or one or more other host computer processors $121_1$–$121_{32}$ via a multi-cast (i.e., sequence of uni-cast) messages through the message network 260 to complete the data read operation.

Considering a write operation, the host computer 120 wishes to write data into storage (i.e., into the bank of disk drives 140). One of the front-end directors $180_1$–$180_{32}$ receives the data from the host computer 120 and writes it into the global cache memory 220. The front-end director $180_1$–$180_{32}$ then requests the transfer of such data after some period of time when the back-end director $200_1$–$200_{32}$ determines that the data can be removed from such cache memory 220 and stored in the bank of disk drives 140. Before the transfer to the bank of disk drives 140, the data in the cache memory 220 is tagged with a bit as "fresh data" (i.e., data which has not been transferred to the bank of disk drives 140, that is data which is "write pending"). Thus, if there are multiple write requests for the same memory location in the global cache memory 220 (e.g., a particular bank account) before being transferred to the bank of disk drives 140, the data is overwritten in the cache memory 220 with the most recent data. Each time data is transferred to the global cache memory 220, the front-end director $180_1$–$180_{32}$ controlling the transfer also informs the host computer 120 that the transfer is complete to thereby free-up the host computer 120 for other data transfers.

When it is time to transfer the data in the global cache memory 220 to the bank of disk drives 140, as determined by the back-end director $200_1$–$200_{32}$, the back-end director $200_1$–$200_{32}$ transfers the data from the global cache memory 220 to the bank of disk drives 140 and resets the tag associated with data in the global cache memory 220 (i.e., un-tags the data) to indicate that the data in the global cache memory 220 has been transferred to the bank of disk drives 140. It is noted that the un-tagged data in the global cache memory 220 remains there until overwritten with new data.

Figure 3:
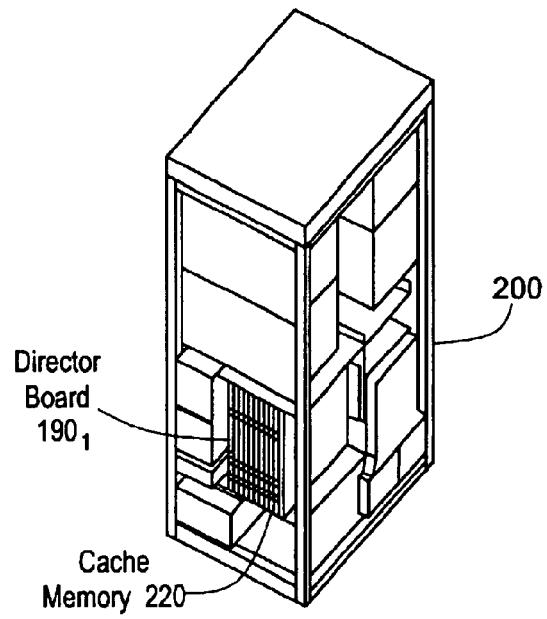
FIG. 3 is a sketch of an electrical cabinet storing a system interface used in the data storage system of FIG. 2.
Figure 4:
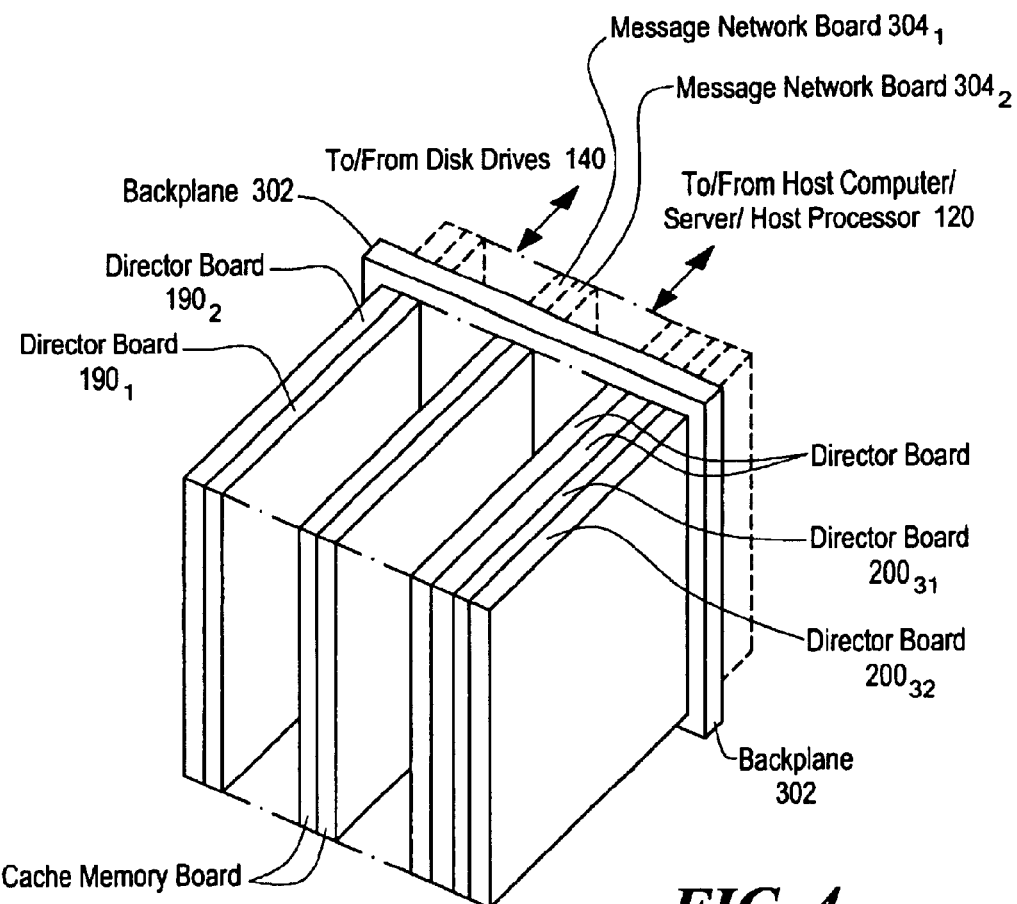
FIG. 4 is a diagramatical, isometric sketch showing printed circuit boards providing the system interface of the data storage system of FIG. 2.

Referring now to FIGS. 3 and 4, the system interface 160 is shown to include an electrical cabinet 300 having stored therein: a plurality of, here eight front-end director boards $190_1$–$190_8$, each one having here four of the front-end directors $180_1$–$180_{32}$; a plurality of, here eight back-end director boards $210_1$–$210_8$, each one having here four of the back-end directors $200_1$–$200_{32}$; and a plurality of, here eight, memory boards 220' which together make up the global cache memory 220. These boards plug into the front side of a backplane 302. (It is noted that the backplane 302 is a mid-plane printed circuit board). Plugged into the backside of the backplane 302 are message network boards $304_1$, $304_2$. The backside of the backplane 302 has plugged into it adapter boards, not shown in FIGS. 2–4, which couple the boards plugged into the back-side of the backplane 302 with the computer 120 and the bank of disk drives 140 as shown in FIG. 2. That is, referring again briefly to FIG. 2, an I/O adapter, not shown, is coupled between each one of the front-end directors $180_1$–$180_{32}$ and the host computer 120 and an I/O adapter, not shown, is coupled between each one of the back-end directors $200_1$–$200_{32}$ and the bank of disk drives 140.

Figure 5:
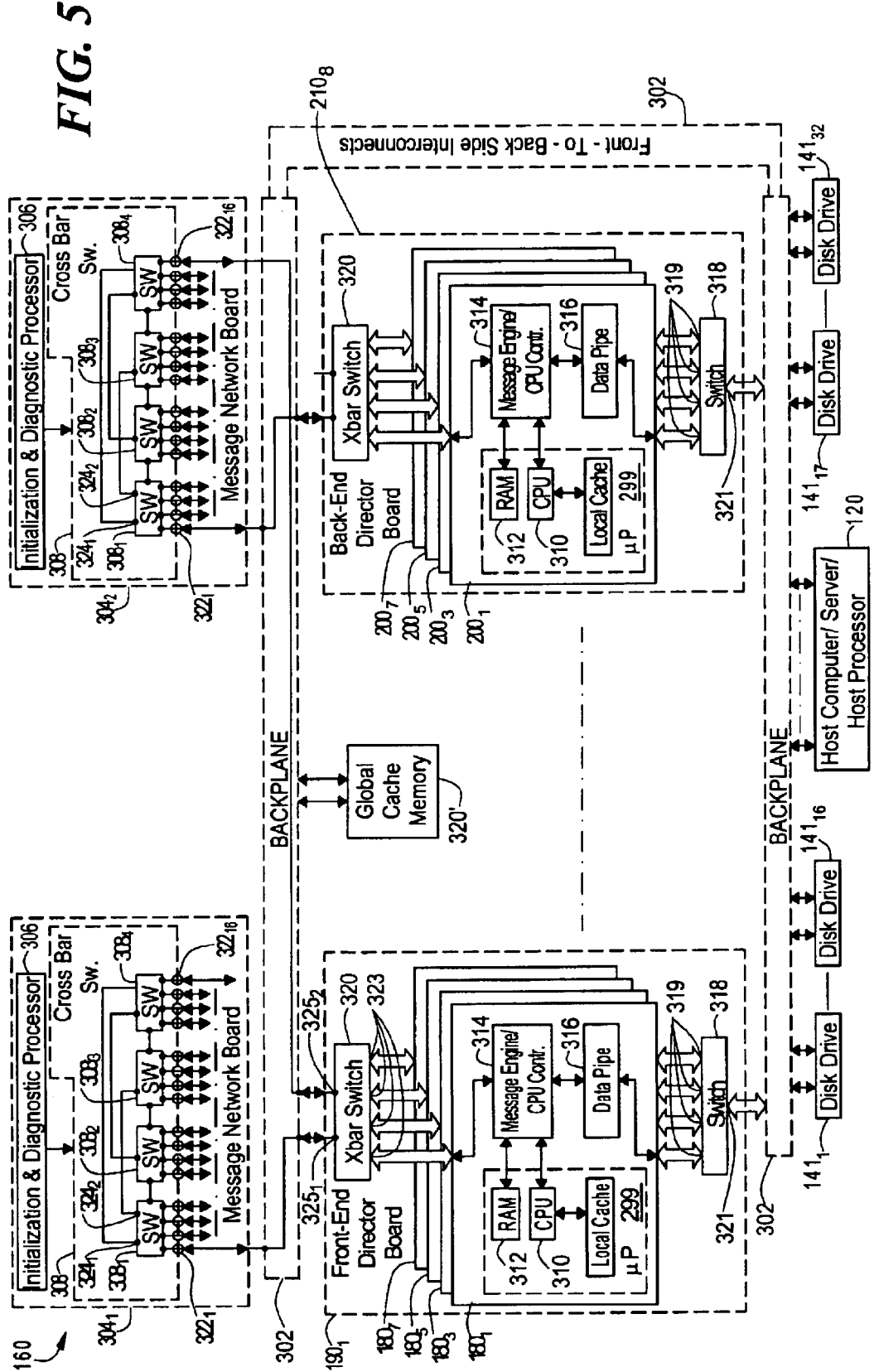
FIG. 5 is a block diagram of the system interface used in the data storage system of FIG. 2.
Figure 6B:
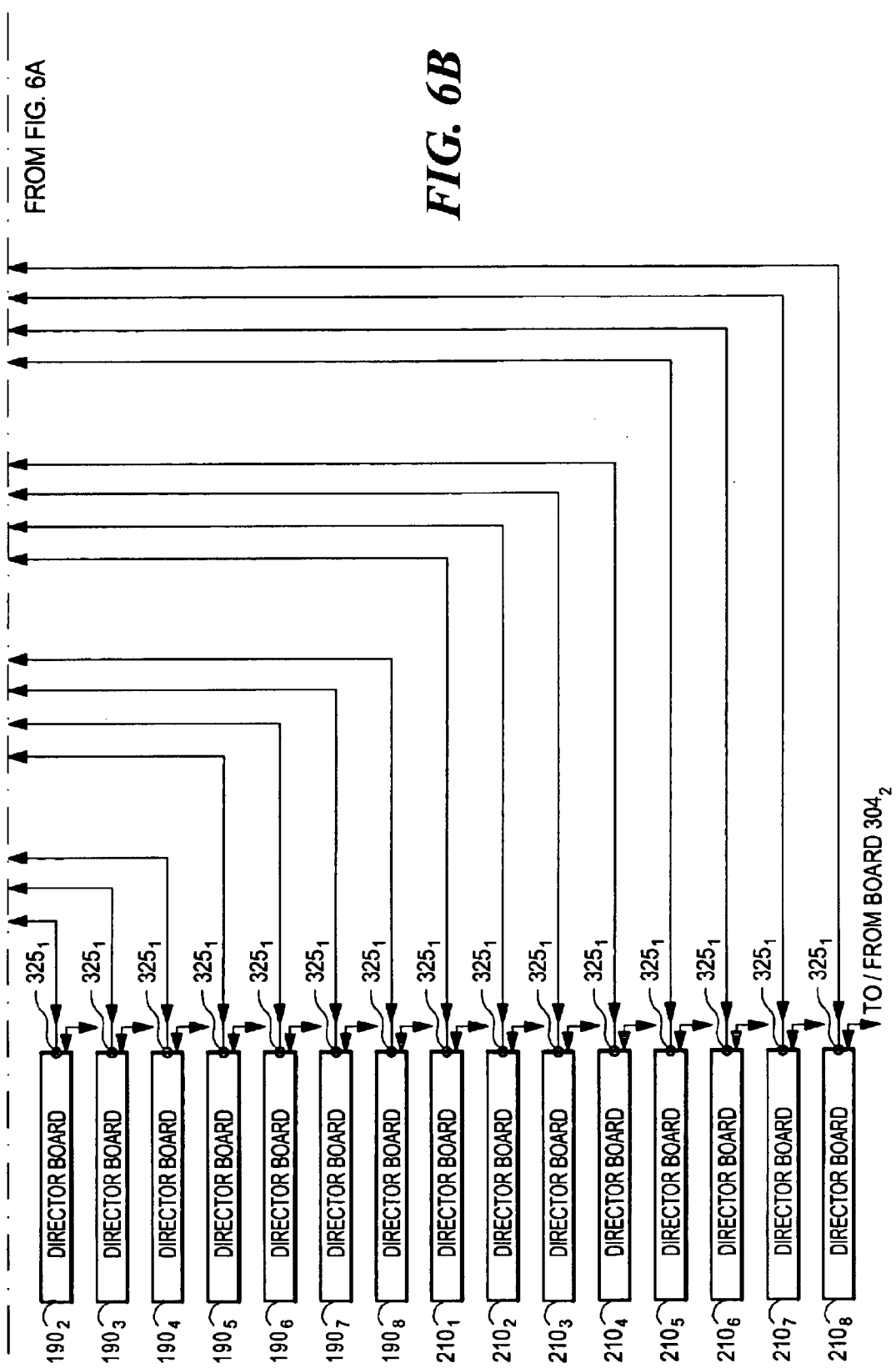
FIG. 6 is a block diagram showing the connections between front-end and back-end directors to one of a pair of message network boards used in the system interface of the data storage system of FIG. 2.

Referring now to FIG. 5, the system interface 160 is shown to include the director boards $190_1$–$190_8$, $210_1$–$210_8$ and the global cache memory 220 plugged into the backplane 302 and the disk drives $141_1$–$141_{32}$ in the bank of disk drives along with the host computer 120 also plugged into the backplane 302 via I/O adapter boards, not shown. The message network 260 (FIG. 2) includes the message network boards $304_1$ and $304_2$. Each one of the message network boards $304_1$ and $304_2$ is identical in construction. A pair of message network boards $304_1$ and $304_2$ is used for redundancy and for message load balancing. Thus, each message network board $304_1$, $304_2$, includes a controller 306, (i.e., an initialization and diagnostic processor comprising a CPU, system controller interface and memory, as shown in FIG. 6 for one of the message network boards $304_1$, $304_2$, here board $304_1$) and a crossbar switch section 308 (e.g., a switching fabric made up of here four switches $308_1$–$308_4$).

Referring again to FIG. 5, each one of the director boards $190_1$–$210_8$ includes, as noted above four of the directors $180_1$–$180_{32}$, $200_1$–$200_{32}$ (FIG. 2). It is noted that the director boards $190_1$–$190_8$ having four front-end directors per board, $180_1$–$180_{32}$ are referred to as front-end directors and the director boards $210_1$–$210_8$ having four back-end directors per board, $200_1$–$200_{32}$ are referred to as back-end directors. Each one of the directors $180_1$–$180_{32}$, $200_1$–$200_{32}$ includes a CPU 310, a RAM 312 (which make up the microprocessor 299 referred to above), the message engine/CPU controller 314, and the data pipe 316.

Each one of the director boards $190_1$–$210_8$ includes a crossbar switch 318. The crossbar switch 318 has four input/output ports 319, each one being coupled to the data pipe 316 of a corresponding one of the four directors $180_1$–$180_{32}$, $200_1$–$200_{32}$ on the director board. $190_1$–$210_8$. The crossbar switch 318 has eight output/input ports collectively identified in FIG. 5 by numerical designation 321 (which plug into the backplane 302. The crossbar switch 318 on the front-end director boards $191_1$–$191_8$ is used for coupling the data pipe 316 of a selected one of the four front-end directors $180_1$–$180_{32}$ on the front-end director board $190_1$–$190_8$ to the global cache memory 220 via the backplane 302 and I/O adapter, not shown. The crossbar switch 318 on the back-end director boards $210_1$–$210_8$ is used for coupling the data pipe 316 of a selected one of the four back-end directors $200_1$–$200_{32}$ on the back-end director board $210_1$–$210_8$ to the global cache memory 220 via the backplane 302 and I/O adapter, not shown. Thus, referring to FIG. 2, the data pipe 316 in the front-end directors $180_1$–$180_{32}$ couples data between the host computer 120 and the global cache memory 220 while the data pipe 316 in the back-end directors $200_1$–$200_{32}$ couples data between the bank of disk drives 140 and the global cache memory 220. It is noted that there are separate point-to-point data paths $P_1$–$P_{64}$ (FIG. 2) between each one of the directors $180_1$–$180_{32}$, $200_1$–$200_{32}$ and the global cache memory 220. It is also noted that the backplane 302 is a passive backplane because it is made up of only etched conductors on one or more layers of a printed circuit board. That is, the backplane 302 does not have any active components.

Referring again to FIG. 5, each one of the director boards $190_1$–$210_8$ includes a crossbar switch 320. Each crossbar switch 320 has four input/output ports 323, each one of the four input/output ports 323 being coupled to the message engine/CPU controller 314 of a corresponding one of the four directors $180_1$–$180_{32}$, $200_1$–$200_{32}$ on the director board $190_1$–$210_8$. Each crossbar switch 320 has a pair of output/input ports $325_1$, $325_2$, which plug into the backplane 302. Each port $325_1$–$325_2$ is coupled to a corresponding one of the message network boards $304_1$, $304_2$, respectively, through the backplane 302. The crossbar switch 320 on the front-end director boards $190_1$–$190_8$ is used to couple the messages between the message engine/CPUcontroller 314 of a selected one of the four front-end directors $180_1$–$180_{32}$ on the front-end director boards $190_1$–$190_8$ and the message network 260, FIG. 2. Likewise, the back-end director boards $210_1$–$210_8$ are used to couple the messages produced by a selected one of the four back-end directors $200_1$–$200_{32}$ on the back-end director board $210_1$–$210_8$ between the message engine/CPU controller 314 of a selected one of such four back-end directors and the message network 260 (FIG. 2). Thus, referring also to FIG. 2, instead of having a separate dedicated message path between each one of the directors $180_1$–$180_{32}$, $200_1$–$200_{32}$ and the message network 260 (which would require M individual connections to the backplane 302 for each of the directors, where M is an integer), here only M/4 individual connections are required). Thus, the total number of connections between the directors $180_1$–$180_{32}$, $200_1$–$200_{32}$ and the backplane 302 is reduced to ¼th. Thus, it should be noted from FIGS. 2 and 5 that the message network 260 (FIG. 2) includes the crossbar switch 320 and the message network boards $304_1$, $304_2$.

Figure 2A:
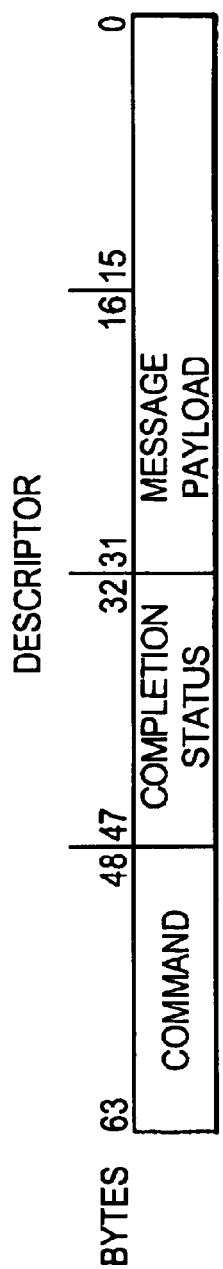
FIG. 2A shows the fields of a descriptor used in the system interface of the data storage system of FIG. 2.
Figure 2B:
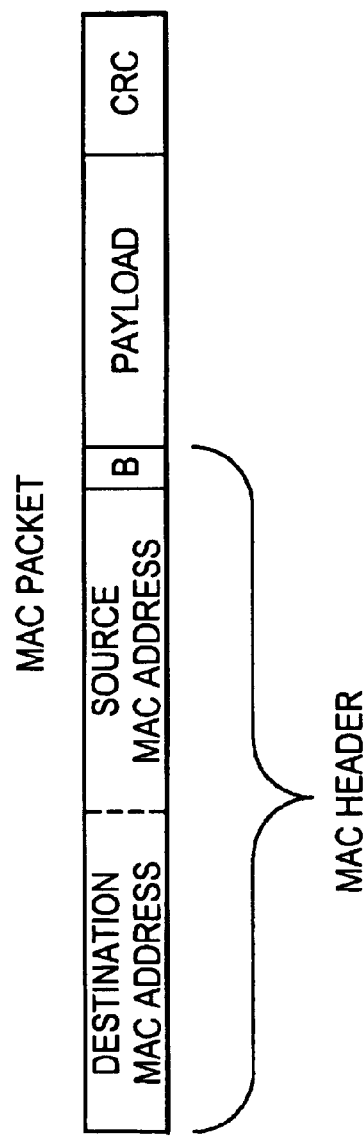
FIG. 2B shows the filed used in a MAC packet used in the system interface of the data storage system of FIG. 2.

Each message is a 64-byte descriptor, shown in FIG. 2A) which is created by the CPU 310 (FIG. 5) under software control and is stored in a send queue in RAM 312. When the message is to be read from the send queue in RAM 312 and transmitted through the message network 260 (FIG. 2) to one or more other directors via a DMA operation to be described, it is packetized in the packetizer portion of packetizer/de-packetizer 428 (FIG. 7) into a MAC type packet, shown in FIG. 2B, here using the NGIO protocol specification. There are three types of packets: a message packet section; an acknowledgement packet; and a message network fabric management packet, the latter being used to establish the message network routing during initialization (i.e., during power-up). Each one of the MAC packets has: an 8-byte header which includes source (i.e., transmitting director) and destination (i.e., receiving director) address; a payload; and terminates with a 4-byte Cyclic Redundancy Check (CRC), as shown in FIG. 2B. The acknowledgement packet (i.e., signal) has a 4-byte acknowledgment payload section. The message packet has a 32-byte payload section. The Fabric Management Packet (FMP) has a 256-byte payload section. The MAC packet is sent to the crossbar switch 320. The destination portion of the packet is used to indicate the destination for the message and is decoded by the switch 320 to determine which port the message is to be routed. The decoding process uses a decoder table 327 in the switch 318, such table being initialized by controller during power-up by the initialization and diagnostic processor (controller) 306 (FIG. 5). The table 327 (FIG. 7) provides the relationship between the destination address portion of the MAC packet, which identifies the routing for the message and the one of the four directors $180_1$–$180_{32}$, $200_1$–$200_{32}$ on the director board $190_1$–$190_8$, $210_1$–$210_8$ or to one of the message network boards $304_1$, $304_2$ to which the message is to be directed.

More particularly, and referring to FIG. 5, a pair of output/input ports $325_1$, $325_2$ is provided for each one of the crossbar switches 320, each one being coupled to a corresponding one of the pair of message network boards $304_1$, $304_2$. Thus, each one of the message network boards $304_1$, $304_2$ has sixteen input/output ports $322_1$–$322_{16}$, each one being coupled to a corresponding one of the output/input ports $325_1$, $325_2$, respectively, of a corresponding one of the director boards $190_1$–$190_8$, $210_1$–$210_8$ through the backplane 302, as shown. Thus, considering exemplary message network board $304_1$, FIG. 6, each switch $308_1$–$308_4$ also includes three coupling ports $324_1$–$324_3$. The coupling ports $324_1$–$324_3$ are used to interconnect the switches $322_1$–$322_4$, as shown in FIG. 6. Thus, considering message network board $304_1$, input/output ports $322_1$–$322_8$ are coupled to output/input ports $325_1$ of front-end director boards $190_1$–$190_8$ and input/output ports $322_9$–$322_{16}$ are coupled to output/input ports $325_1$ of back-end director boards $210_1$–$210_8$, as shown. Likewise, considering message network board $304_2$, input/output ports $322_1$–$322_8$ thereof are coupled, via the backplane 302, to output/input ports $325_2$ of front-end director boards $190_1$–$190_8$ and input/output ports $322_9$–$322_{16}$ are coupled, via the backplane 302, to output/input ports $325_2$ of back-end director boards $210_1$–$210_8$.

As noted above, each one of the message network boards $304_1$, $304_2$ includes a processor 306 (FIG. 5) and a crossbar switch section 308 having four switches $308_1$–$308_4$, as shown in FIGS. 5 and 6. The switches $308_1$–$308_4$ are interconnected as shown so that messages can pass between any pair of the input/output ports $322_1$–$322_{16}$. Thus, it follow that a message from any one of the front-end directors $180_1$–$180_{32}$ can be coupled to another one of the front-end directors $180_1$–$180_{32}$ and/or to any one of the back-end directors $200_1$–$200_{32}$. Likewise, a message from any one of the back-end directors $180_1$–$180_{32}$ can be coupled to another one of the back-end directors $180_1$–$180_{32}$ and/or to any one of the front-end directors $200_1$–$200_{32}$.

As noted above, each MAC packet (FIG. 2B) includes in an address destination portion and a data payload portion. The MAC header is used to indicate the destination for the MAC packet and such MAC header is decoded by the switch to determine which port the MAC packet is to be routed. The decoding process uses a table in the switch $308_1$–$308_4$, such table being initialized by processor 306 during power-up. The table provides the relationship between the MAC header, which identifies the destination for the MAC packet and the route to be taken through the message network. Thus, after initialization, the switches 320 and the switches $308_1$–$308_4$ in switch section 308 provides packet routing which enables each one of the directors $180_1$–$180_{32}$, $200_1$–$200_{32}$ to transmit a message between itself and any other one of the directors, regardless of whether such other director is on the same director board $190_1$–$190_8$, $210_1$–$210_8$ or on a different director board. Further, the MAC packet has an additional bit B in the header thereof, as shown in FIG. 2B, which enables the message to pass through message network board $304_1$ or through message network board $304_2$. During normal operation, this additional bit B is toggled between a logic 1 and a logic 0 so that one message passes through one of the redundant message network boards $304_1$, $304_2$ and the next message to pass through the other one of the message network boards $304_1$, $304_2$ to balance the load requirement on the system. However, in the event of a failure in one of the message network boards $304_1$, $304_2$, the non-failed one of the boards $304_1$, $304_2$ is used exclusively until the failed message network board is replaced.

Figure 7:
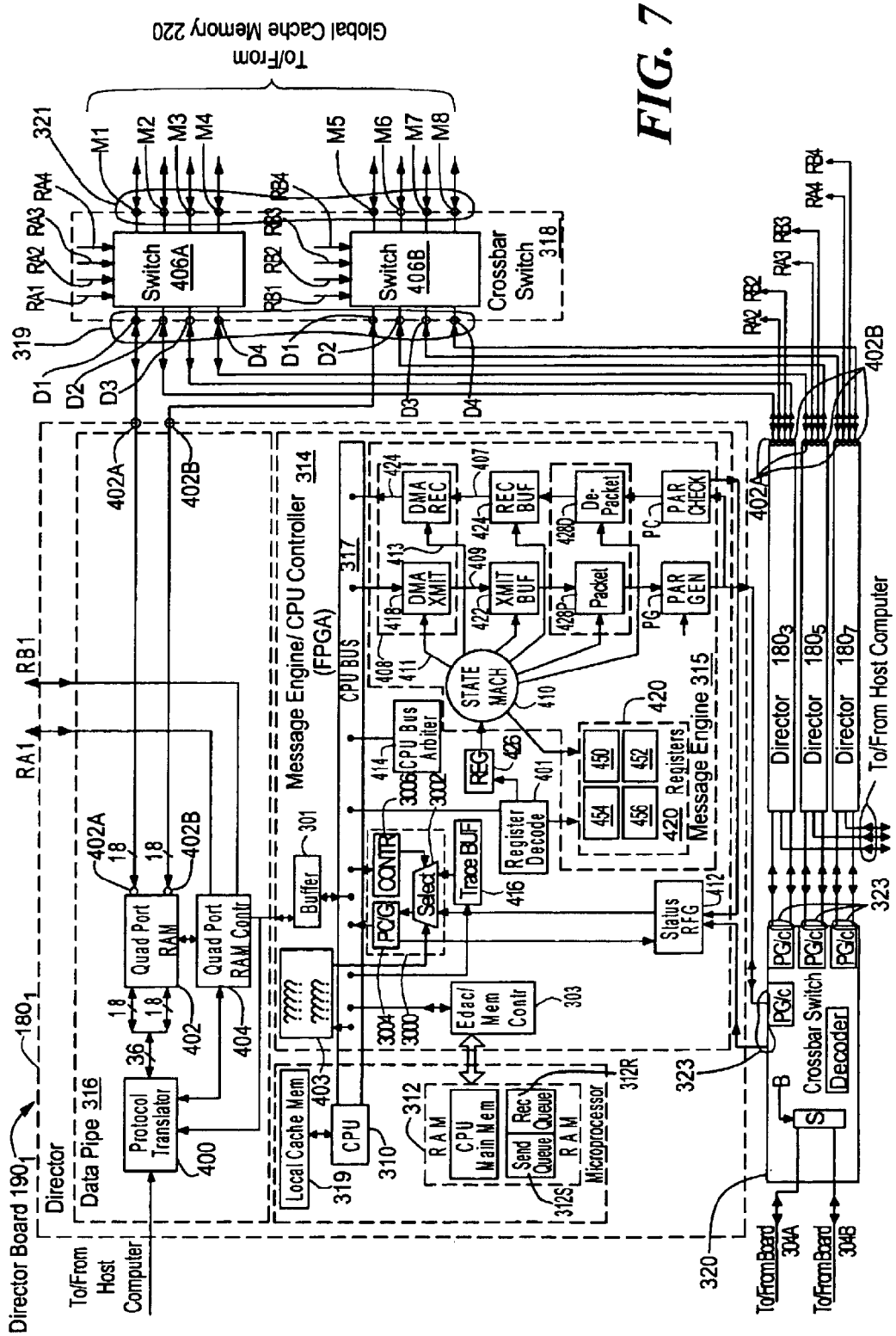
FIG. 7 is a block diagram of an exemplary one of the director boards used in the system interface of he data storage system of FIG. 2.

Referring now to FIG. 7, an exemplary one of the director boards $190_1$–$190_8$, $210_1$–$210_8$, here director board $190_1$ is shown to include directors $180_1$, $180_3$, $180_5$ and $180_7$. An exemplary one of the directors $180_1$–$180_4$, here director $180_1$ is shown in detail to include the data pipe 316, the message engine/CPU controller 314, the RAM 312, and the CPU 310 all coupled to the CPU interface bus 317, as shown. The exemplary director $180_1$ also includes: a local cache memory 319 (which is coupled to the CPU 310); the crossbar switch 318; and, the crossbar switch 320, described briefly above in connection with FIGS. 5 and 6. The data pipe 316 includes a protocol translator 400, a quad port RAM 402 and a quad port RAM controller 404 arranged as shown. Briefly, the protocol translator 400 converts between the protocol of the host computer 120, in the case of a front-end director $180_1$–$180_{32}$, (and between the protocol used by the disk drives in bank 140 in the case of a back-end director $200_1$–$200_{32}$) and the protocol between the directors $180_1$–$180_3$, $200_1$–$200_{32}$ and the global memory 220 (FIG. 2). More particularly, the protocol used the host computer 120 may, for example, be fibre channel, SCSI, ESCON or FICON, for example, as determined by the manufacture of the host computer 120 while the protocol used internal to the system interface 160 (FIG. 2) may be selected by the manufacturer of the interface 160. The quad port RAM 402 is a FIFO controlled by controller 404 because the rate data coming into the RAM 402 may be different from the rate data leaving the RAM 402. The RAM 402 has four ports, each adapted to handle an 18 bit digital word. Here, the protocol translator 400 produces 36 bit digital words for the system interface 160 (FIG. 2) protocol, one 18 bit portion of the word is coupled to one of a pair of the ports of the quad port RAM 402 and the other 18 bit portion of the word is coupled to the other one of the pair of the ports of the quad port RAM 402. The quad port RAM has a pair of ports 402A, 402B, each one of to ports 402A, 402B being adapted to handle an 18 bit digital word. Each one of the ports 402A, 402B is independently controllable and has independent, but arbitrated, access to the memory array within the RAM 402. Data is transferred between the ports 402A, 402B and the cache memory 220 (FIG. 2) through the crossbar switch 318, as shown.

Figure 8:
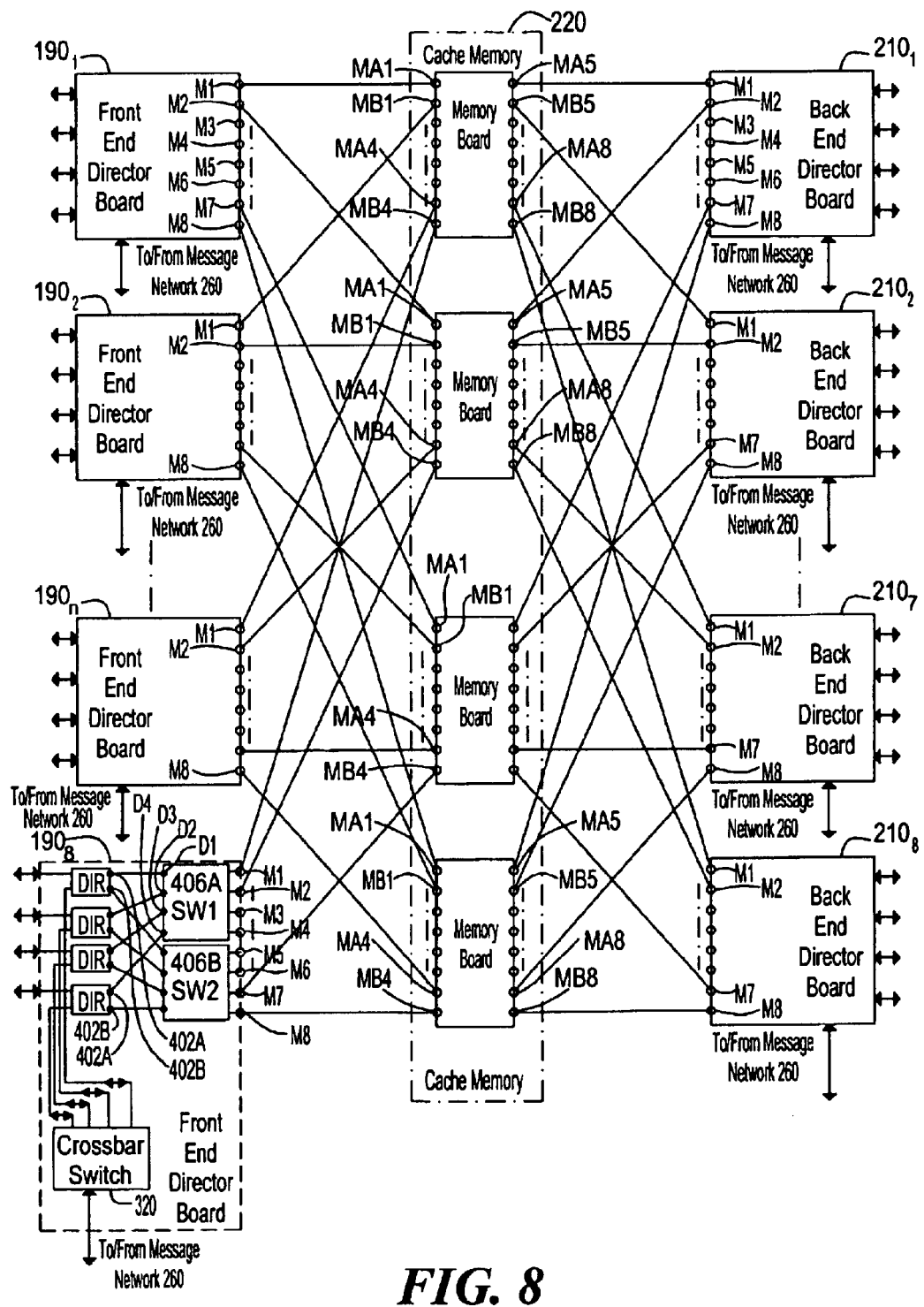
FIG. 8 is a block diagram of the system interface used in the data storage system of FIG. 2.

The crossbar switch 318 includes a pair of switches 406A, 406B. Each one of the switches 406A, 406B includes four input/output director-side ports $D_1$–$D_4$ (collectively referred to above in connection with FIG. 5 as port 319) and four input/output memory-side ports $M_1$–$M_4$, $M_5$–$M_8$, respectively, as indicated. The input/output memory-side ports $M_1$–$M_4$, $M_5$–$M_8$ were collectively referred to above in connection with FIG. 5 as port 317). The director-side ports $D_1$–$D_4$ of switch 406A are connected to the 402A ports of the quad port RAMs 402 in each one the directors $180_1$, $180_3$, $180_5$ and $180_7$, as indicated. Likewise, director-side ports of switch 406B are connected to the 402B ports of the quad port RAMs 402 in each one the directors $180_1$, $180_3$, $180_5$, and $180_7$, as indicated. The ports $D_1$–$D_4$ are selectively coupled to the ports $M_1$–$M_4$ in accordance with control words provided to the switch 406A by the controllers in directors $180_1$, $180_3$, $180_5$, $180_7$ on busses $R_{A1}$–$R_{A4}$, respectively, and the ports $D_1$–$D_4$ are coupled to ports $M_5$–$M_8$ in accordance with the control words provided to switch 406B by the controllers in directors $180_1$, $180_3$, $180_5$, $180_7$ on busses $R_{B1}$–$R_{B4}$, as indicated. The signals on buses $R_{A1}$–$R_{A4}$ are request signals. Thus, port 402A of any one of the directors $180_1$, $180_3$, $180_5$, $180_7$ may be coupled to any one of the ports $M_1$–$M_4$ of switch 406A, selectively in accordance with the request signals on buses $R_{A1}$–$R_{A4}$. Likewise, port 402B of any one of the directors $180_1$–$180_4$ may be coupled to any one of the ports $M_5$–$M_8$ of switch 406B, selectively in accordance with the request signals on buses $R_{B1}$–$R_{B4}$. The coupling between the director boards $190_1$–$190_8$, $210_1$–$210_8$ and the global cache memory 220 is shown in FIG. 8.

More particularly, and referring also to FIG. 2, as noted above, each one of the host computer processors $121_1$–$121_{32}$ in the host computer 120 is coupled to a pair of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to a pair of the back-end directors $200_1$–$200_{32}$, to provide redundancy in the event of a failure in one of the back-end directors $200_1$–$200_{32}$ coupled thereto). Thus, considering exemplary host computer processor$121_1$, such processor $121_1$ is coupled to a pair of front-end directors $180_1$, $180_2$. Thus, if director $180_1$ fails, the host computer processor $121_1$ can still access the system interface 160, albeit by the other front-end director $180_2$. Thus, directors $180_1$ and $180_2$ are considered redundancy pairs of directors. Likewise, other redundancy pairs of front-end directors are; front-end directors $180_3$, $180_4$; $180_5$, $180_6$; $180_7$, $180_8$; $180_9$, $180_{10}$; $180_{11}$, $180_{12}$; $180_{13}$, $180_{14}$; $180_{15}$, $180_{16}$; $180_{17}$, $180_{18}$; $180_{19}$, $180_{20}$; $180_{21}$, $180_{22}$; $180_{23}$, $180_{24}$; $180_{25}$, $180_{26}$; $180_{27}$, $180_{28}$; $180_{29}$, $180_{30}$; and $180_{31}$, $180_{32}$ (only directors $180_{31}$ and $180_{32}$ being shown in FIG. 2).

Figure 8A:
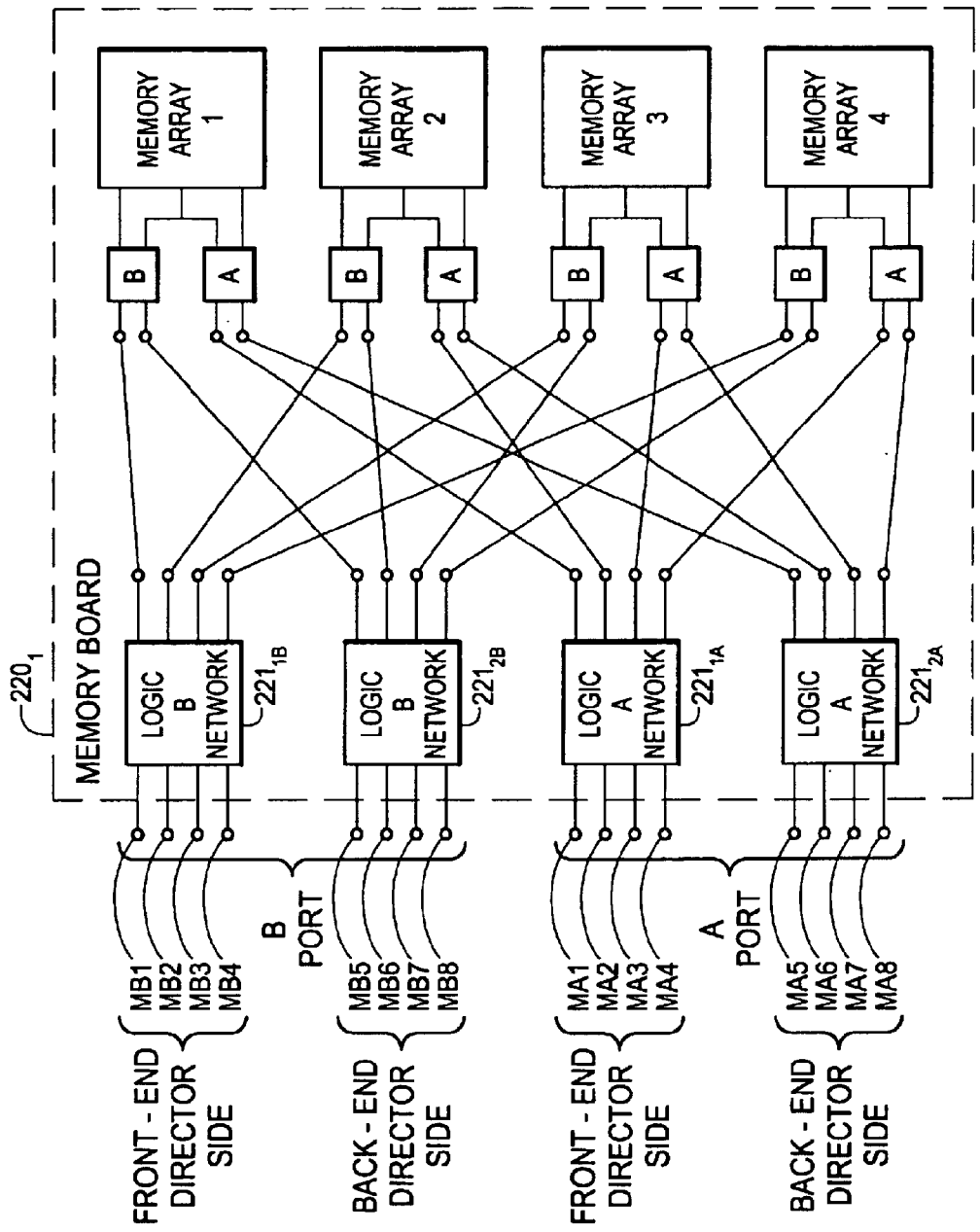
FIG. 8A is a diagram of an exemplary global cache memory board used in the system interface of FIG. 8.

Likewise, disk drive 141, is coupled to a pair of back-end directors $200_1$, $200_2$. Thus, if director $200_1$ fails, the disk drive $141_1$ can still access the system interface160, albeit by the other back-end director $180_2$. Thus, directors $200_1$ and $200_2$ are considered redundancy pairs of directors. Likewise, other redundancy pairs of back-end directors are: back-end directors $200_3$, $200_4$; $200_5$, $200_6$; $200_7$, $200_8$; $200_9$, $200_{10}$; $200_{11}$, $200_{12}$; $200_{13}$, $200_{14}$; $200_{15}$, $200_{16}$; $200_{17}$, $200_{18}$; $200_{19}$, $200_{20}$; $200_{21}$, $200_{22}$; $200_{23}$, $200_{24}$; $200_{25}$, $200_{26}$; $200_{27}$, $200_{28}$; $200_{29}$, $200_{30}$; and $200_{31}$, $200_{32}$ (only directors $200_{31}$ and $200_{32}$ being shown in FIG. 2). Further, referring also to FIG. 8, the global cache memory 220 includes a plurality of, here eight, cache memory boards $220_1$–$220_8$, as shown. Still further, referring to FIG. 8A, an exemplary one of the cache memory boards, here board $220_1$ is shown in detail and is described in detail in U.S. Pat. No. 5,943,287 entitled "Fault Tolerant Memory System", John K. Walton, inventor, issued Aug. 24, 1999 and assigned to the same assignee as the present invention, the entire subject matter therein being incorporated herein by reference. Thus, as shown in FIG. 8A, the board $220_1$ includes a plurality of, here four RAM memory arrays, each one of the arrays has a pair of redundant ports, i.e., an A port and a B port. The board itself has sixteen ports; a set of eight A ports $M_{A1}$–$M_{A8}$ and a set of eight B ports $M_{B1}$–$M_{B8}$. Four of the eight A port, here A ports $M_{A1}$–$M_{A4}$ are coupled to the $M_1$ port of each of the front-end director boards $190_1$, $190_3$, $190_5$, and $190_7$, respectively, as indicated in FIG. 8. Four of the eight B port, here B ports $M_{B1}$–$M_{B4}$ are coupled to the $M_1$ port of each of the front-end director boards $190_2$, $190_4$, $190_6$, and $190_8$, respectively, as indicated in FIG. 8. The other four of the eight A port, here A ports $M_{A5}$–$M_{A8}$ are coupled to the $M_1$ port of each of the back-end director boards $210_1$, $210_3$, $210_5$, and $210_7$, respectively, as indicated in FIG. 8. The other four of the eight B port, here B ports $M_{B5}$–$M_{48}$ are coupled to the $M_1$ port of each of the back-end director boards $210_2$, $210_4$, $210_6$, and $210_8$, respectively, as indicated in FIG. 8

Considering the exemplary four A ports $M_{A1}$–$M_{A4}$, each one of the four A ports $M_{A1}$–$M_{A4}$ can be coupled to the A port of any one of the memory arrays through the logic network $221_{1A}$. Thus, considering port $M_{A1}$, such port can be coupled to the A port of the four memory arrays. Likewise, considering the four A ports $M_{A5}$–$M_{A8}$, each one of the four A ports $M_{A5}$–$M_{A8}$ can be coupled to the A port of any one of the memory arrays through the logic network $221_{1B}$. Likewise, considering the four B ports $M_{B1}$–$M_{B4}$, each one of the four B ports $M_{B1}$–$M_{B4}$ can be coupled to the B port of any one of the memory arrays through logic network $221_{1B}$. Likewise, considering the four B ports $M_{B5}$–$M_{B8}$, each one of the four B ports $M_{B5}$–$M_{B8}$ can be coupled to the B port of any one of the memory arrays through the logic network $221_{2B}$. Thus, considering port $M_{B1}$, such port can be coupled to the B port of the four memory arrays. Thus, there are two paths data and control from either a front-end director $180_1$–$180_{32}$ or a back-end director $200_1$–$200_{32}$ can reach each one of the four memory arrays on the memory board. Thus, there are eight sets of redundant ports on a memory board, i.e., ports $M_{A1}$, $M_{B1}$; $M_{A2}$, $M_{B2}$; $M_{A3}$, $M_{B3}$; $M_{A4}$, $M_{B4}$; $M_{A5}$, $M_{B5}$; $M_{A6}$, $M_{B6}$; $M_{A7}$, $MB_{B7}$; and $M_{A8}$, $M_{B8}$. Further, as noted above each one of the directors has a pair of redundant ports, i.e. a 402A port and a 402 B port (FIG. 7). Thus, for each pair of redundant directors, the A port (i.e., port 402A) of one of the directors in the pair is connected to one of the pair of redundant memory ports and the B port (i.e., 402B) of the other one of the directors in such pair is connected to the other one of the pair of redundant memory ports.

Figure 8B:
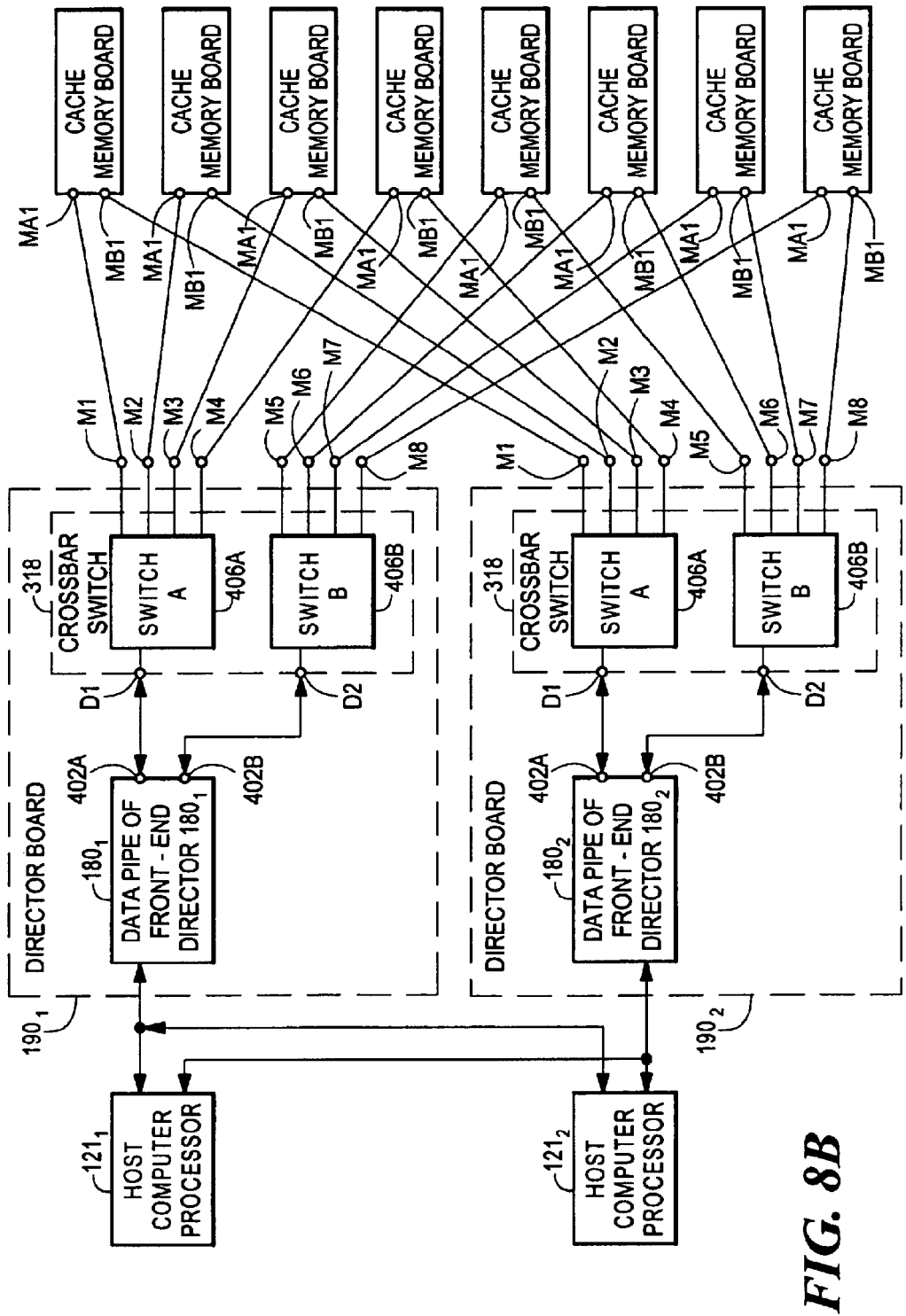
FIG. 8B is a diagram showing a pair of director boards coupled between a pair of host processors and global cache memory boards used in the system interface of FIG. 8.

More particularly, referring to FIG. 8B, an exemplary pair of redundant directors is shown, here, for example, front-end director $180_1$ and front end-director $180_2$. It is first noted that the directors $180_1$, $180_2$ in each redundant pair of directors must be on different director boards, here boards $190_1$, $190_2$, respectively. Thus, here front-end director boards $190_1$–$190_8$ have thereon: front-end directors $180_1$, $180_3$, $180_5$ and $180_7$; front-end directors $180_2$, $180_4$, $180_6$ and $180_8$; front end directors $180_9$, $180_{11}$, $180_{13}$ and $180_{15}$; front end directors $180_{10}$, $180_{12}$, $180_{14}$ and $180_{16}$; front-end directors $180_{17}$, $180_{19}$, $180_{21}$ and $180_{23}$; front-end directors $180_{18}$, $180_{20}$, $180_{22}$ and $180_{24}$; front-end directors $180_{25}$, $180_{27}$, $180_{29}$ and $180_{31}$; front-end directors $180_{18}$, $180_{20}$, $180_{22}$ and $180_{24}$. Thus, here back-end director boards $210_1$–$210_8$ have thereon: back-end directors $200_1$, $200_3$, $200_5$ and $200_7$; back-end directors $200_2$, $200_4$, $200_6$ and $200_8$; back-end directors $200_9$, $200_{11}$, $200_{13}$ and $200_{15}$; back-end directors $200_{10}$, $200_{12}$, $200_{14}$ and $200_{16}$; back-end directors $200_{17}$, $200_{19}$, $200_{21}$ and $200_{23}$; back-end directors $200_{18}$, $200_{20}$, $200_{22}$ and $200_{24}$; back-end directors $200_{25}$, $200_{27}$, $200_{29}$ and $200_{31}$; back-end directors $200_{18}$, $200_{20}$, $200_{22}$ and $200_{24}$;

Thus, here front-end director $180_1$, shown in FIG. 8A, is on front-end director board $190_1$ and its redundant front-end director $180_2$, shown in FIG. 8B, is on anther front-end director board, here for example, front-end director board $190_2$. As described above, the port 402A of the quad port RAM 402 (i.e., the A port referred to above) is connected to switch 406A of crossbar switch 318 and the port 402B of the quad port RAM 402 (i.e., the B port referred to above) is connected to switch 406B of crossbar switch 318. Likewise, for redundant director $180_2$. However, the ports $M_1$–$M_4$ of switch 406A of director $180_1$ are connected to the $M_{A1}$ ports of global cache memory boards $220_1$–$200_4$, as shown, while for its redundancy director $180_2$, the ports $M_1$–$M_4$ of switch 406A are connected to the redundant $M_{B1}$ ports of global cache memory boards $220_1$–$200_4$, as shown.

Referring in more detail to the crossbar switch 318 (FIG. 7), as noted above, each one of the director boards $190_1$–$210_8$ has such a switch 318 and such switch 318 includes a pair of switches 406A, 406B. Each one of the switches 406A, 406B is identical in construction, an exemplary one thereof, here switch 406A being shown in detail in FIG. 8C. Thus switch 406A includes four input/output director-side ports $D_1$–$D_4$ as described in connection with exemplary director board $190_1$. Thus, for the director board $190_1$ shown in FIG. 7, the four input/output director-side ports $D_1$–$D_4$ of switch 406A are each coupled to the port 402A of a corresponding one of the directors $180_1$, $180_3$, $180_5$, and $180_7$ on the director board $190_1$.

Referring again to FIG. 8C, the exemplary switch 406A includes a plurality of, here four, switch sections $430_1$–$430_4$. Each one of the switch sections $430_1$–$430_4$ is identical in construction and is coupled between a corresponding one of the input/output director-side ports $D_1$–$D_4$ and a corresponding one of the output/input memory-side ports $M_1$–$M_4$, respectively, as shown. (It should be understood that the output/input memory-side ports of switch 406B (FIG. 7) are designated as ports $M_5$–$M_8$, as shown. It should also be understood that while switch 406A is responsive to request signals on busses $R_{A1}$–$R_{A4}$ from quad port controller 404 in directors $180_1$, $180_3$, $180_5$, $180_7$ (FIG. 7), switch 406B is responsive in like manner to request signals on busses $R_{B1}$–$R_{B4}$ from controller 404 in directors $180_1$, $180_3$, $180_5$ and $180_7$). More particularly, controller 404 of director $180_1$ produces request signals on busses $R_{A1}$ or $R_{B1}$. In like manner, controller 404 of director $180_3$ produces request signals on busses $R_{A2}$ or $R_{B2}$, controller 404 of director $180_5$ produces request signals on busses $R_{A3}$ or $R_{B3}$, and controller 404 of director $180_7$ produces request signals on busses $R_{A4}$ or $R_{B4}$.

Figures 1, 8C:
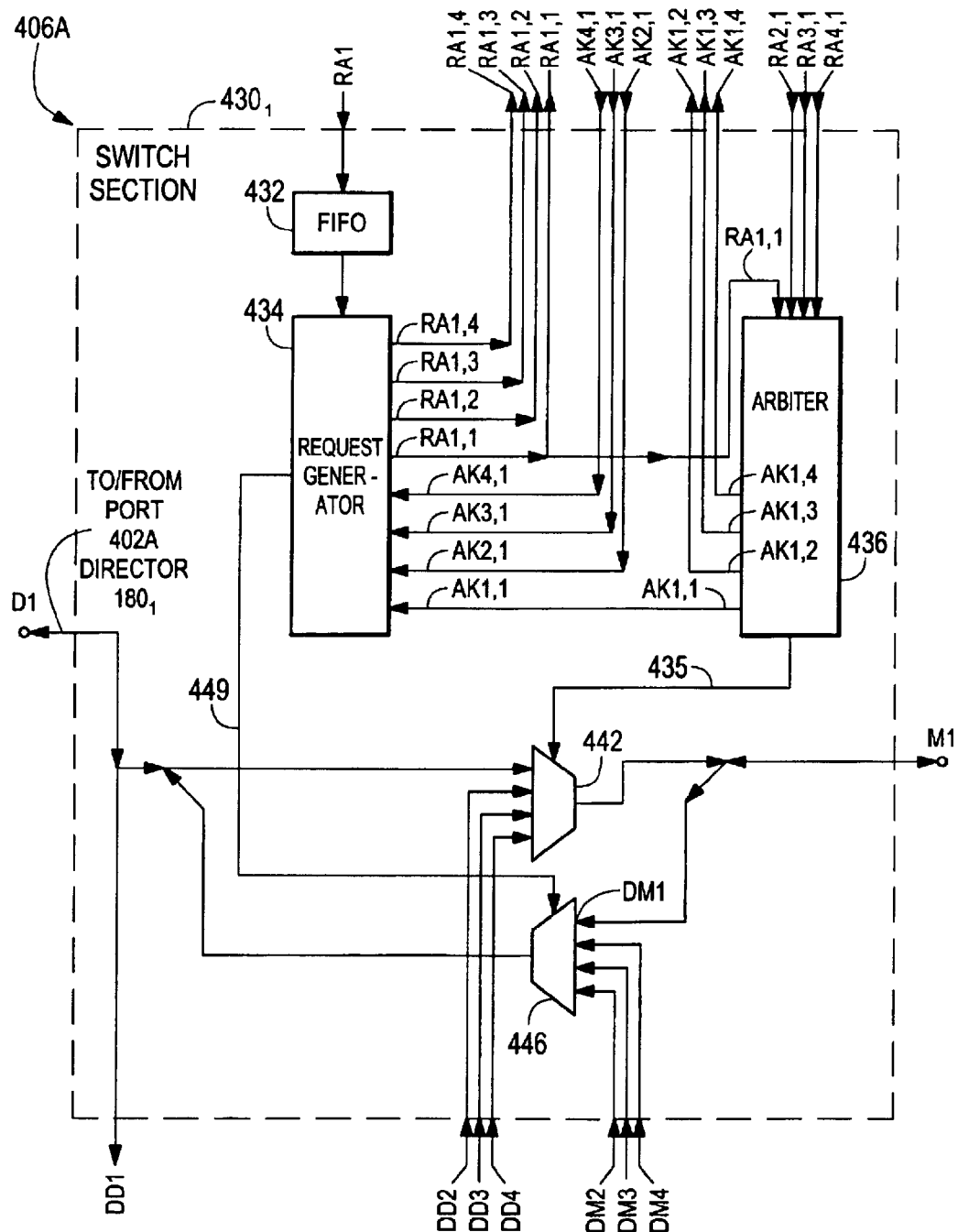
FIG. 8C is a block diagram of an exemplary crossbar switch used in the front-end and rear-end directors of the system interface of FIG. 8.
Figures 2, 8C:
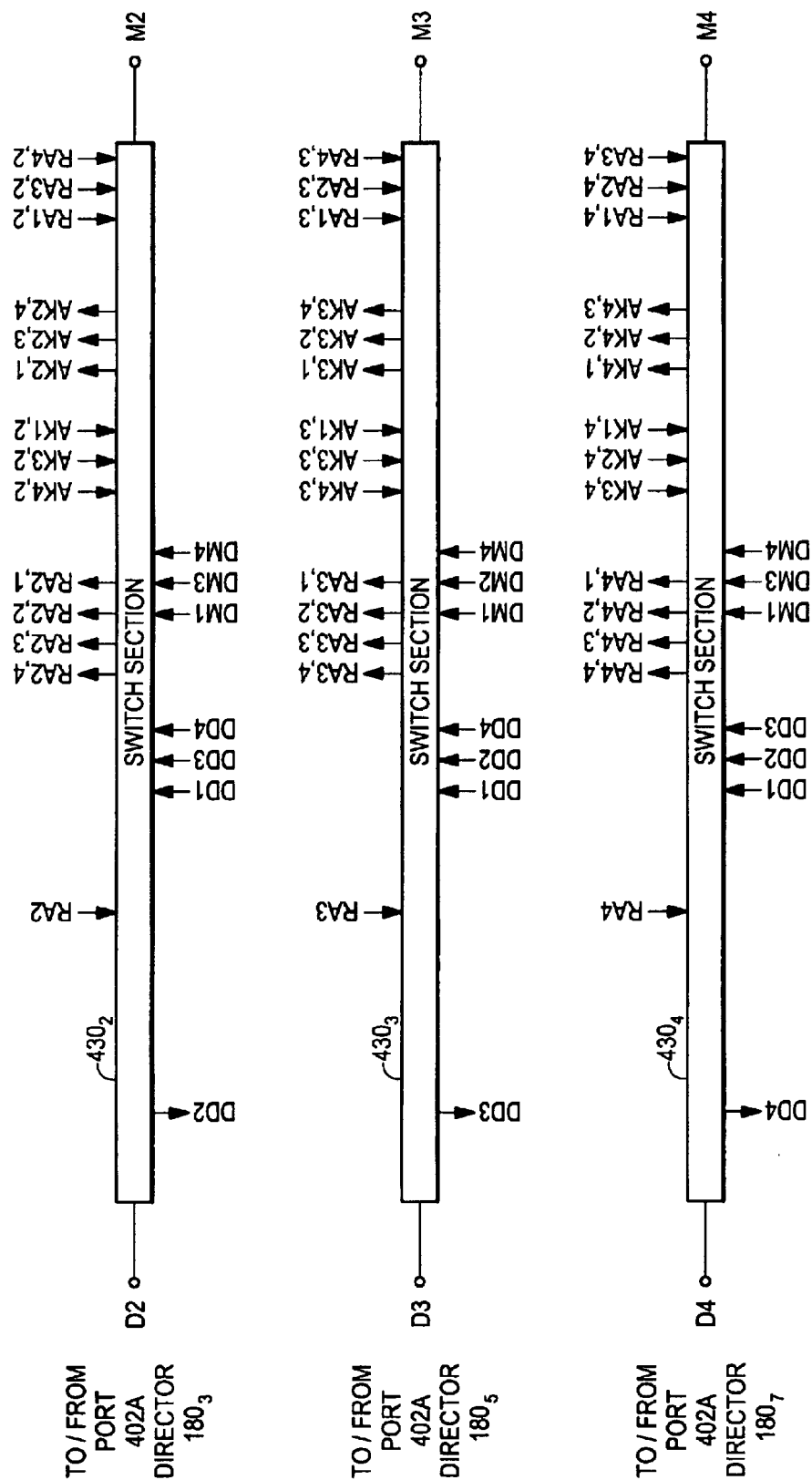

Considering exemplary switch section $430_1$, such switch section $403_1$ is shown in FIG. 8C to include a FIFO 432 fed by the request signal on bus $R_{1A}$. (It should be understood that the FIFOS, not shown, in switch sections $430_2$–$430_4$ are fed by request signals $R_{A2}$–$R_{A4}$, respectively). The switch section 406, also includes a request generation 434, and arbiter 436, and selectors 442 and 446, all arranged as shown. The data at the memory-side ports $M_1$–$M_4$ are on busses DM1–DM4 are fed as inputs to selector 446. Also fed to selector 446 is a control signal produced by the request generator on bus 449 in response to the request signal $R_{A1}$ stored in FIFO 432. The control signal on bus 449 indicates to the selector 446 the one of the memory-side ports $M_1$–$M_4$ which is to be coupled to director-side port $D_1$. The other switch sections $430_2$–$430_4$ operate in like manner with regard to director-side ports $D_1$–$D_4$, respectively and the memory-side ports $M_1$–$M_4$.

It is to be noted that the data portion of the word at port $D_1$ (i.e., the word on bus DD1) is also coupled to the other switch sections $430_2$–$430_4$. It is further noted that the data portion of the words at ports $D_2$–$D_4$ (i.e., the words on busses DD2–DD4, respectively), are fed to the switch sections $430_1$–$430_4$, as indicated. That is, each one of the switch sections $430_1$–$430_4$ has the data portion of the words on ports $D_1$–$D_4$ (i.e., busses DD1–DD4), as indicated. It is also noted that the data portion of the word at port $M_1$ (i.e., the word on bus DM1) is also coupled to the other switch sections $430_2$–$430_4$. It if further noted that the data portion of the words at ports $M_2$–$M_4$ (i.e., the words on busses DM2–DM4, respectively), are fed to the switch sections $430_2$–$430_4$, as indicated. That is, each one of the switch sections $430_1$–$430_4$ has the data portion of the words on ports $M_1$–$M_4$ (i.e., busses DM1–DM4), as indicated.

As will be described in more detail below, a request on bus $R_{A1}$ to switch section $430_1$ is a request from the director $180_1$ which identifies the one of the four ports $M_1$–$M_4$ in switch $430_1$ is to be coupled to port 402A of director $180_1$ (director side port $D_1$). Thus, port 402A of director $180_1$ may be coupled to one of the memory side ports $M_1$–$M_4$ selectively in accordance with the data on bus $R_{A1}$. Likewise, a request on busses $R_{A2}$, $R_{A3}$, $R_{A4}$ to switch section $430_2$–$430_4$, respectively, are requests from the directors $180_3$, $180_5$, and $180_7$, respectively, which identifies the one of the four ports $M_1$–$M_4$ in switch $430_1$–$430_4$ is to be coupled to port 402A of directors $180_3$, $180_5$ and $180_7$, respectively.

More particularly, the requests $R_{A1}$ are stored as they are produced by the quad port RAM controller 440 (FIG. 7) in receive FIFO 432. The request generator 434 receives from FIFO 432 the requests and determines which one of the four memory-side ports $M_1$–$M_4$ is to be coupled to port 402A of director $180_1$. These requests for memory-side ports $M_1$–$M_4$ are produced on lines RA1,1–RA1,4, respectively. Thus, line RA1,1 (i.e., the request for memory side port $M_1$) is fed to arbiter 436 and the requests from switch sections $430_2$–$430_4$ (which are coupled to port 402A of directors $180_3$, $180_5$, and $180_7$) on line RA2,1, RA3,1 and RA4,1, respectively are also fed to the arbiter 436, as indicated. The arbiter 436 resolves multiple requests for memory-side port $M_1$ on a first come-first serve basis. The arbiter 436 then produces a control signal on bus 435 indicating the one of the directors $180_1$, $180_3$, $180_5$ or $180_7$ which is to be coupled to memory-side port $M_1$.

The control signal on bus 435 is fed to selector 442. Also fed to selector 442 are the data portion of the data at port $D_1$, i.e., the data on data bus DD1) along with the data portion of the data at ports $D_2$–$D_4$, i.e., the data on data busses DD2–DD4, respectively, as indicated. Thus, the control signal on bus 435 causes the selector 442 to couple to the output thereof the data busses DD1–DD4 from the one of the directors $180_1$, $180_3$, $180_5$, $180_7$ being granted access to memory-side port $M_1$ by the arbiter 436. The selected outputs of selector 442 is coupled to memory-side port $M_1$. It should be noted that when the arbiter 436 receives a request via the signals on lines RA1,1, RA2,1, RA3,1 and RA4,1, acknowledgements are returned by the arbiter 436 via acknowledgement signals on line AK1,1, AK1,2, AK1,3, AK1,4, respectively such signals being fed to the request generators 434 in switch section $430_1$, $430_2$, $430_3$, $430_4$, respectively.

Thus, the data on any port $D_1$–$D_4$ can be coupled to and one of the ports $M_1$–$M_4$ to effectuate the point-to-point data paths $P_1$–$P_{64}$ described above in connection with FIG. 2.

Referring again to FIG. 7, data from host computer 120 (FIG. 2) is presented to the system interface 160 (FIG. 2) in batches from many host computer processors $121_1$–$121_{32}$. Thus, the data from the host computer processors $121_1$–$121_{32}$ are interleaved with each other as they are presented to a director $180_1$–$180_{32}$. The batch from each host computer processor $180_1$–$180_{32}$ (i.e., source) is tagged by the protocol translator 400. More particularly by a Tacheon ASIC in the case of a fibre channel connection. The controller 404 has a look-up table formed during initialization. As the data comes into the protocol translator 400 and is put into the quad port RAM 420 under the control of controller 404, the protocol translator 400 informs the controller that the data is in the quad port RAM 420. The controller 404 looks at the configuration of its look-up table to determine the global cache memory 220 location (e.g., cache memory board $220_1$–$220_8$) the data is to be stored into. The controller 404 thus produces the request signals on the appropriate bus $R_{A1}$, $R_{B1}$, and then tells the quad port RAM 402 that there is a block of data at a particular location in the quad port RAM 402, move it to the particular location in the global cache memory 220. The crossbar switch 318 also takes a look at what other controllers 404 in the directors $180_3$, $180_5$, and $180_7$ on that particular director board $190_1$ are asking by making request signal on busses $R_{A2}$, $R_{B2}$, $R_{A3}$, $R_{B3}$, $R_{A4}$, $R_{B4}$, respectively. The arbitration of multiple requests is handled by the arbiter 436 as described above in connection with FIG. 8C.

Referring again to FIG. 7, the exemplary director 180₁ is shown to include in the message engine/CPU controller 314. The message engine/CPU controller 314 is contained in an integrated circuit chip, here a field programmable gate array (FPGA). The message engine (ME) 315 is coupled to the CPU bus 317 and the DMA section 408 as shown. The message engine (ME) 315 includes a Direct Memory Access (DMA) section 408, a message engine (ME) state machine 410, a transmit buffer 424 and receive buffer 424, a MAC packetizer/depacketizer 428, send and receive pointer registers 420, and a parity generator 321. The DMA section 408 includes a DMA transmitter 418, shown and to be described below in detail in connection with FIG. 9, and a DMA receiver 424, shown and to be described below in detail in connection with FIG. 10, each of which is coupled to the CPU bus interface 317, as shown in FIG. 7. The message engine (ME) 315 includes a transmit data buffer 422 coupled to the DMA transmitter 418, a receive data buffer 424 coupled to the DMA receiver 421, registers 420 coupled to the CPU bus 317 through an address decoder 401, the packetizer/de-packetizer 428, described above, coupled to the transmit data buffer 422, the receive data buffer 424 and the crossbar switch 320, as shown, and a parity generator 321 coupled between the transmit data buffer 422 and the crossbar switch 320. More particularly, the packetizer portion 428P is used to packetize the message payload into a MAC packet (FIG. 2B) passing from the transmit data buffer 422 to the crossbar switch 320 and the de-packetizer portion 428D is used to de-packetize the MAC packet into message payload data passing from the crossbar switch 320 to the receive data buffer 424. The packetization is here performed by a MAC core which builds a MAC packet and appends to each message such things as a source and destination address designation indicating the director sending and receiving the message and a cyclic redundancy check (CRC), as described above. The message engine (ME) 315 also includes: a receive write pointer 450, a receive read pointer 452; a send write pointer 454, and a send read pointer 456.

Figure 11A:
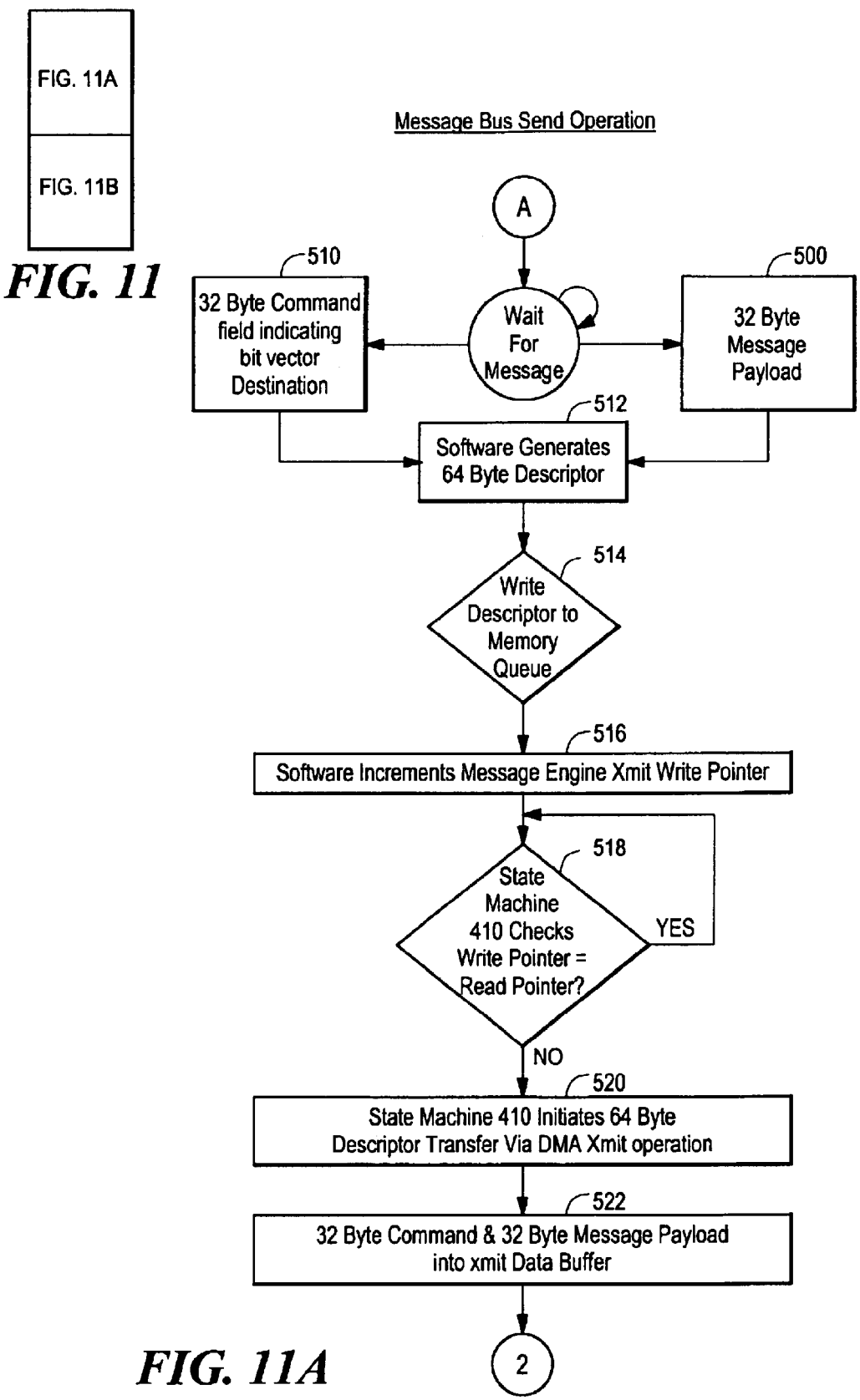
FIG. 11 shows the relationship between FIGS. 11A and 11B, such FIGS. 11A and 11B together showing a process flow diagram of the send operation of a message network used in the system interface of FIG. 8.
FIGS. 11C–11E are examples of digital words used by the message network in the system interface of FIG. 8.
FIG. 11F shows bits in a mask used in such message network.
FIG. 11G shows the result of the mask of FIG. 11F applied to the digital word shown in FIG. 11E.
Figure 11B:
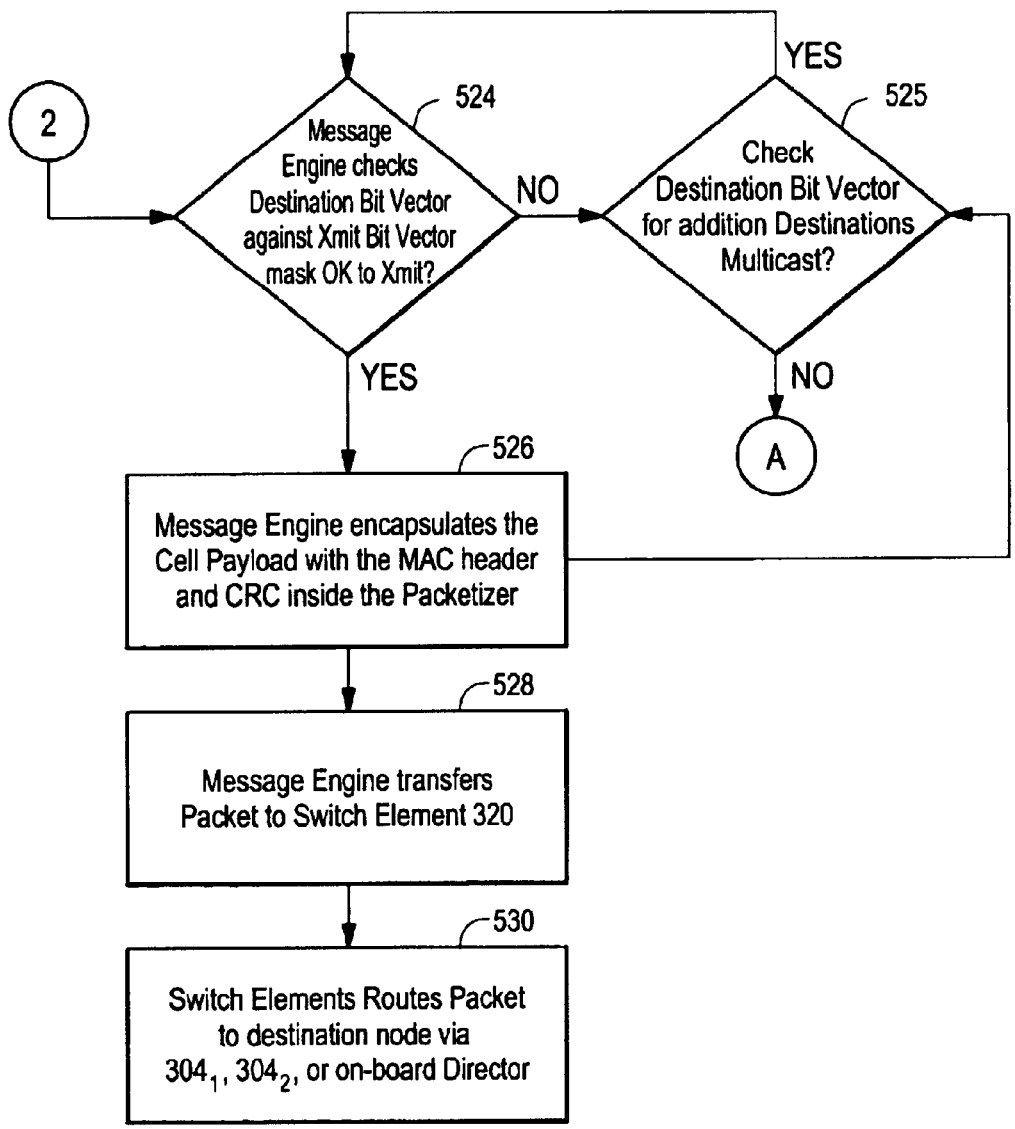
Figures 12, 12A:
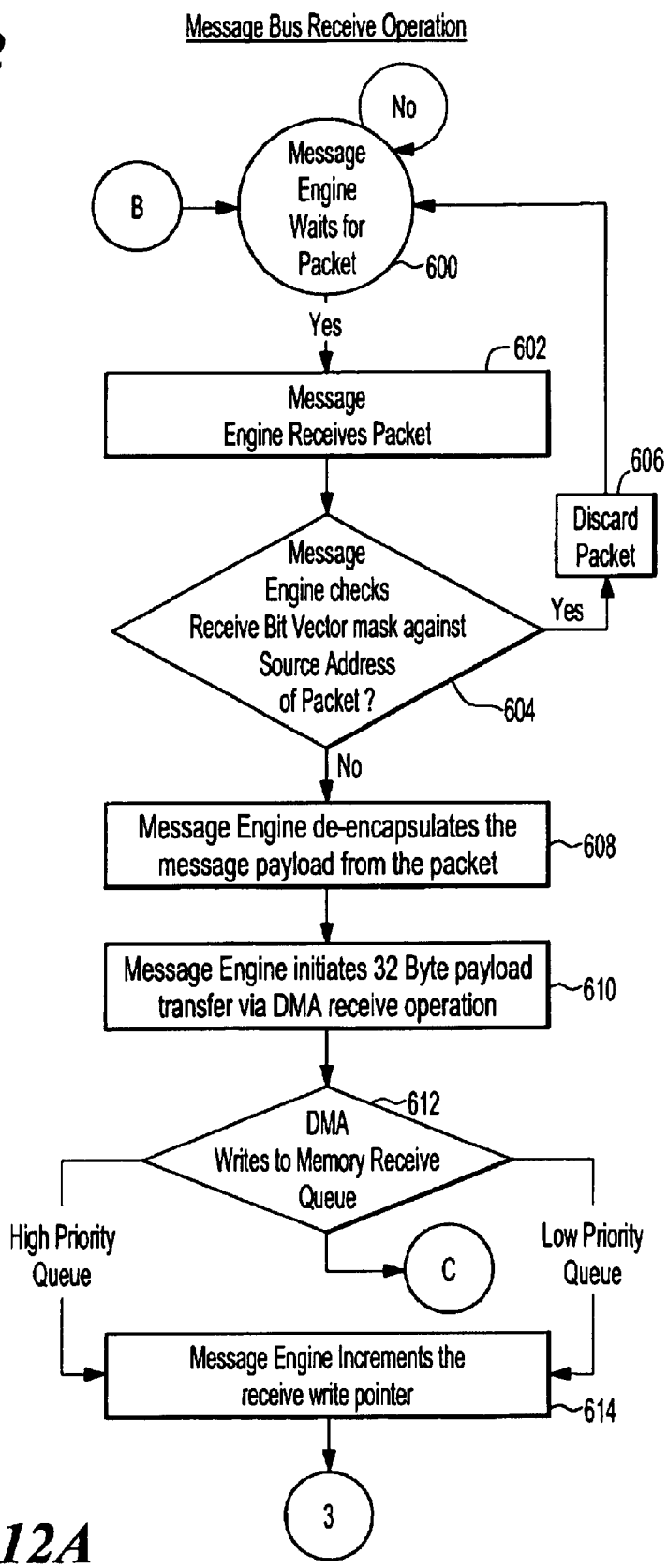
FIG. 12 shows the relationship between FIGS. 12A and 12B, such FIGS. 12A and 12B Showing a process flow diagram of the receive operation of a message network used in the system interface of FIG. 8.
Figure 12B:
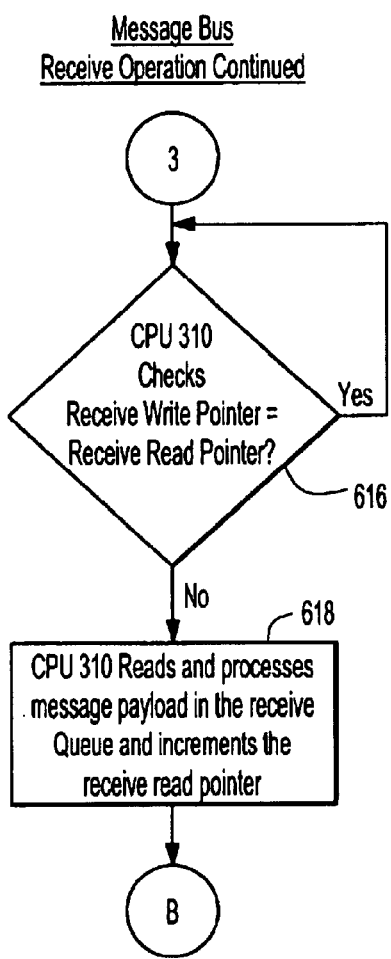

Referring now to FIGS. 11 and 12, the transmission of a message from a director 180₁–180₃₂, 200₁–200₃₂ and the reception of a message by a director 210₁–210₃₂, here exemplary director 180₁ shown in FIG. 7) will be described. Considering first transmission of a message, reference is made to FIGS. 7 and 11. First, as noted above, at power-up the controller 306 (FIG. 5) of both message network boards 304₁, 304₂ initialize the message routing mapping described above for the switches 308₁–308₄ in switch section 308 and for the crossbar switches 320. As noted above, a request is made by the host computer 120. The request is sent to the protocol translator 400. The protocol translator 400 sends the request to the microprocessor 299 via CPU bus 317 and buffer 301. When the CPU 310 (FIG. 7) in the microprocessor 299 of exemplary director 180₁ determines that a message is to be sent to another one of the directors 180₂–180₃₂, 200₁–200₃₂, (e.g., the CPU 310 determines that there has been a "miss" in the global cache memory 220 (FIG. 2) and wants to send a message to the appropriate one of the back-end directors 200₁–200₃₂, as described above in connection with FIG. 2), the CPU 310 builds a 64 byte descriptor (FIG. 2A) which includes a 32 byte message payload indicating the addresses of the batch of data to be read from the bank of disk drives 140 (FIG. 2) (Step 500) and a 32 byte command field (Step 510) which indicates the message destination via an 8-byte bit vector, i.e., the director, or directors, which are to receive the message. An 8-byte portion of the command field indicates the director or directors, which are to receive the message. That is, each one of the 64 bits in the 8-byte portion corresponds to one of the 64 directors. Here, a logic 1 in a bit indicates that the corresponding director is to receive a message and a logic 0 indicates that such corresponding director is not to receive the message. Thus, if the 8-byte word has more than one logic 1 bit more than one director will receive the same message. As will be described, the same message will not be sent in parallel to all such directors but rather the same message will be sent sequentially to all such directors. In any event, the resulting 64-byte descriptor is generated by the CPU 310 (FIG. 7) (Step 512) is written into the RAM 312 (Step 514), as shown in FIG. 11.

More particularly, the RAM 512 includes a pair of queues; a send queue and a receive queue, as shown in FIG. 7. The RAM 312 is coupled to the CPU bus 317 through an Error Detection and Correction (EDAC)/Memory control section 303, as shown. The CPU 310 then indicates to the message engine (ME) 315 state machine 410 (FIG. 7) that a descriptor has been written into the RAM 312. It should be noted that the message engine (ME) 315 also includes: a receive write pointer or counter 450, the receive read pointer or counter 452, the send write pointer or counter 454, and the send read pointer or counter 454, shown in FIG. 7. All four pointers 450, 452, 454 and 456 are reset to zero on power-up. As is also noted above, the message engine/CPU controller 314 also includes: the de-packetizer portion 428D of packetizer/de-packetizer 428, coupled to the receive data buffer 424 (FIG. 7) and a packetizer portion 428P of the packetizer/de-packetizer 428, coupled to the transmit data buffer 422 (FIG. 7). Thus, referring again to FIG. 11, when the CPU 310 indicates that a descriptor has been written into the RAM 312 and is now ready to be sent, the CPU 310 increments the send write pointer and sends it to the send write pointer register 454 via the register decoder 401. Thus, the contents of the send write pointer register 454 indicates the number of messages in the send queue 312S of RAM 312, which have not been sent. The state machine 410 checks the send write pointer register 454 and the send read pointer register 456, Step 518. As noted above, both the send write pointer register 454 and the send read pointer register 456 are initially reset to zero during power-up. Thus, if the send read pointer register 456 and the send write pointer register 454 are different, the state machine knows that there is a message is in RAM 312 and that such message is ready for transmission. If a message is to be sent, the state machine 410 initiates a transfer of the lo stored 64-byte descriptor to the message engine (ME) 315 via the DMA transmitter 418, FIG. 7 (Steps 520, 522). The descriptor is sent from the send queues 312S in RAM 312 until the send read pointer 456 is equal to the send write pointer 454.

As described above in connection with Step 510, the CPU 310 generates a destination vector indicating the director, or directors, which are to receive the message. As also indicated above the command field is 32-bytes, eight bytes thereof having a bit representing a corresponding one of the 64 directors to receive the message. For example, referring to FIG. 11C, each of the bit positions 1–64 represents directors 180₁–180₃₂, 200₁–200₃₁, respectively. Here, in this example, because a logic 1 is only in bit position 1, the eight-byte vector indicates that the destination director is only front-end director 108₁. In the example in FIG. 11D, because a logic 1 is only in bit position 2, the eight-byte vector indicates that the destination director is only front-end director $108_2$. In the example in FIG. 11E, because a logic 1 is more than one bit position, the destination for the message is to more than one director, i.e., a multi-cast message. In the example in FIG. 11E, a logic 1 is only in bit positions 2, 3, 63 and 64. Thus, the eight-byte vector indicates that the destination directors are only front-end director $108_2$ and $180_3$ and back-end directors $200_{31}$ and $200_{32}$. There is a mask vector stored in a register of register section 420 (FIG. 7) in the message engine (ME) 315 which identifies director or directors which may be not available to use (e.g. a defective director or a director not in the system at that time), Step 524, 525, for a uni-cast transmission). If the message engine (ME) 315 state machine 410 indicates that the director is available by examining the transmit vector mask (FIG. 11F) stored in register 420, the message engine (ME) 315 encapsulates the message payload with a MAC header and CRC inside the packetizer portion 428P, discussed above (Step 526). An example of the mask is shown in FIG. 11F, The mask has 64 bit positions, one for each one of the directors. Thus, as with the destination vectors described above in connection with FIGS. 11C–11E, bit positions 1–64 represents directors $180_1$–$180_{32}$, $200_1$–$200_{32}$, respectively. Here in this example, a logic 1 in a bit position in the mask indicates that the representative director is available and a logic 0 in such bit position indicates that the representative director is not available. Here, in the example shown in FIG. 11F, only director $200_{32}$ is unavailable. Thus, if the message has a destination vector as indicated in FIG. 11E, the destination vector, after passing through the mask of FIG. 11F modifies the destination vector to that shown in FIG. 11G. Thus, director $200_{32}$ will not receive the message. Such mask modification to the destination vector is important because, as will be described, the messages on a multi-cast are sent sequentially and not in parallel. Thus, elimination of message transmission to an unavailable director or directors increases the message transmission efficiency of the system.

Having packetized the message into a MAC packet via the packetizer portion of the packetizer/de-packetizer 428 (FIG. 7), the message engine (ME) 315 transfers the MAC packet to the crossbar switch 320 (Step 528) and the MAC packet is routed to the destination by the message network 260 (Step 530) via message network boards $304_1$, $304_2$ or on the same director board via the crossbar switch 320 on such director board.

Referring to FIG. 12, the message read operation is described. Thus, in Step 600 the director waits for a message. When a message is received, the message engine (ME) 315 state machine 410 receives the packet (Step 602). The state machine 410 checks the receive bit vector mask (FIG. 11) stored in register 399 against the source address of the packet (Step 604). If the state machine 410 determines that the message is from an improper source (i.e., a faulty director as indicated in the mask, FIG. 11F, for example), the packet is discarded (Step 606). On the other hand, if the state machine 410 determines that the packet is from a proper or valid director (i.e., source), the message engine (ME) 315 de-encapsulates the message from the packet (Step 608) in de-packetizer 428D. The state machine 410 in the message engine (ME) 315 initiates a 32-byte payload transfer via the DMA receive operation (Step 610). The DMA writes the 32 byte message to the memory receive queue 312R in the RAM 312 (Step 612). The message engine (ME) 315 state machine 410 then increments the receive write pointer register 450 (Step 614). The CPU 310 then checks whether the receive write pointer 450 is equal to the receive read pointer 452 (Step 616). If they are equal, such condition indicates to the CPU 310 that a message has not been received (Step 618). On the other hand, if the receive write pointer 450 and the receive read pointer 452 are not equal, such condition indicates to the CPU 310 that a message has been received and the CPU 310 processes the message in the receive queue 314R of RAM 312 and then the CPU 310 increments the receive read pointer and writes it into the receive read pointer register 452. Thus, messages are stored in the receive queue 312R of RAM 312 until the contents of the receive read pointer 452 and the contents of the receive write pointer 450, which are initialized to zero during power-up, are equal.

Figure 13:
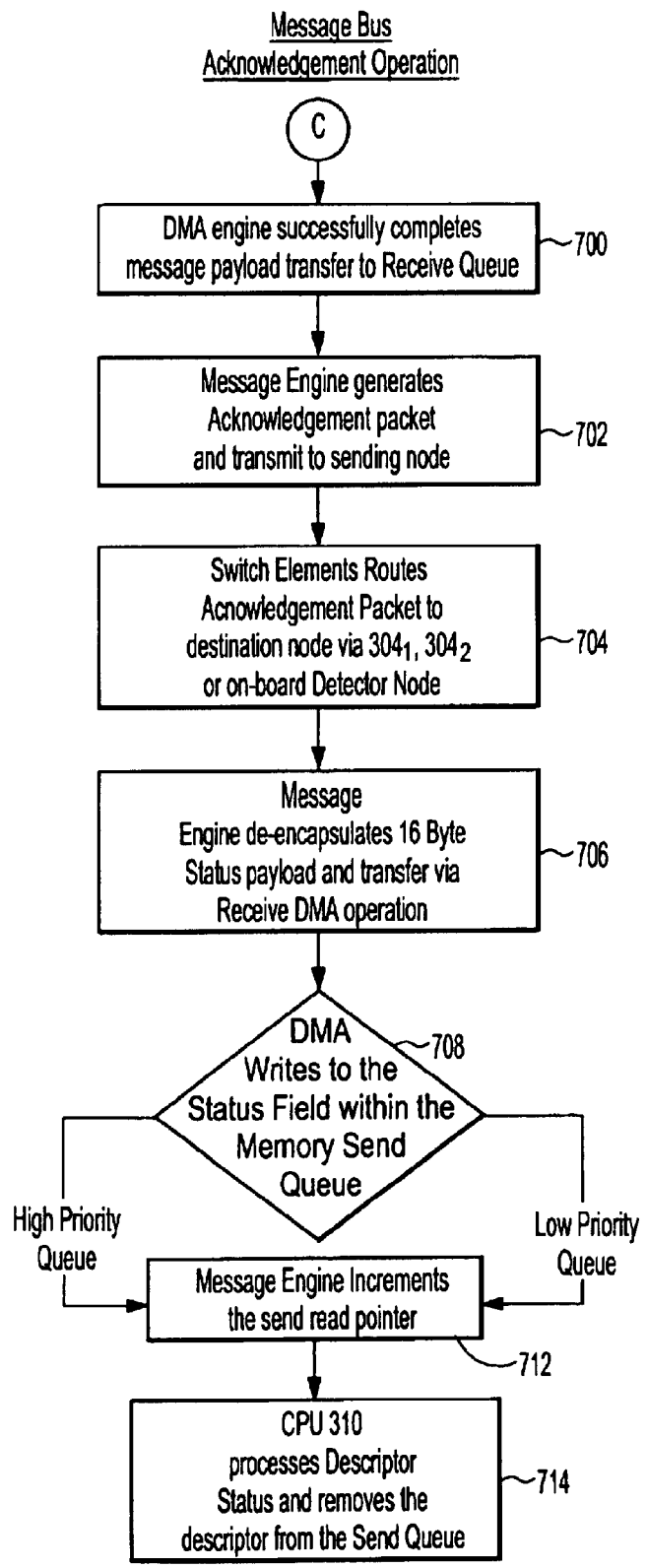
FIG. 13 shows the relationship between FIGS. 11A and 11B, such FIGS. 11A and 11B together showing a process flow diagram of the acknowledgement operation of a message network used in the system interface of FIG. 8.

Referring now to FIG. 13, the acknowledgement of a message operation is described. In Step 700 the receive DMA engine 420 successfully completes a message transfer to the receive queue in RAM 312 (FIG. 7). The state machine 410 in the message engine (ME) 315 generates an acknowledgement MAC packet and transmits the MAC packet to the sending director via the message network 260 (FIG. 2) (Steps 702, 704). The message engine (ME) 315 at the sending director de-encapsulates a 16 byte status payload in the acknowledgement MAC packet and transfers such status payload via a receive DMA operation (Step 706). The DMA of the sending (i.e., source) director writes to a status field of the descriptor within the RAM memory send queue 314S (Step 708). The state machine 410 of the message engine (ME) 315 of the sending director (which received the acknowledgement message) increments its send read pointer 454 (Step 712). The CPU 310 of the sending director (which received the acknowledgement message) processes the descriptor status and removes the descriptor from the send queue 312S of RAM 312 (Step 714). It should be noted that the send and receive queues 312S and 312R are each circular queues.

As noted above, the MAC packets are, during normal operation, transmitted alternatively to one of the pair of message network boards $304_1$, $304_2$ by hardware a selector S in the crossbar switch 320. The selector S is responsive to the bit B in the header of the MAC packet (FIG. 2B) and, when such bit B is one logic state the data is coupled to one of the message networks boards 402A and in response to the opposite logic slate the data is coupled to the other one of the message networks boards 402B. That is, when one message is transmitted to board $304_1$ the next message is transmitted to board $304_2$.

Referring again to FIG. 9, the details of an exemplary transmit DMA 418 is shown. As noted above, after a descriptor has been created by the CPU 310 (FIG. 7) and is then stored in the RAM 312. If the send write pointer 450 (FIG. 7) and send read pointer 452, described above, have different counts an indication is provided by the state machine 410 in the message engine (ME) 315 (FIG. 7) that the created descriptor is available for DMA transmission to the message engine (ME) 315, the payload off the descriptor is packetized into a MAC packet and sent through the message network 360 (FIG. 2) to one or more directors $180_1$–$180_{32}$, $200_1$–$200_{32}$. More particularly, the descriptor created by the CPU 310 is first stored in the local cache memory 319 and is later transferred to the send queue 312S in RAM 312. When the send write pointer 450 and send read pointer 452 have different counts, the message engine (ME) 315 state machine 410 initiates a DMA transmission as discussed above in connection with Step 520 (FIG. 11). Further, as noted above, the descriptor resides in send queues 312R within the RAM 312. Further, as noted above, each descriptor which contains the message is a fixed size, here 64-bytes. As each new, non-transmitted descriptor is created by the CPU 310, it is sequentially stored in a sequential location, or address in the send queue 312S. Here, the address is a 32-bit address.

When the transmit DMA is initiated, the state machine 410 in the message engine (ME) 315 (FIG. 7), sends the queue address on bus 411 to an address register 413 in the DMA transmitter 418 (FIG. 9) along with a transmit write enable signal Tx_WE signal. The DMA transmitter 418 requests the CPU bus 317 by asserting a signal on Xmit_Br. The CPU bus arbiter 414 (FIG. 7) performs a bus arbitration and when appropriate the arbiter 414 grants the DMA transmitter 418 access to the CPU bus 317. The Xmit Cpu state machine 419 then places the address currently available in the address register 413 on the Address bus portion 317A of CPU bus 317 by loading the output address register 403. Odd parity is generated by a Parity generator 405 before loading the output address register 403. The address in register 403 is placed on the CPU bus 317 (FIG. 7) for RAM 312 send queue 312S, along with appropriate read control signals via CPU bus 317 portion 317C. The data at the address from the RAM 312 passes, via the data bus portion 317D of CPU bus 317, through a parity checker 415 to a data input register 417. The control signals from the CPU 310 are fed to a Xmit CPU state machine 419 via CPU bus 317 bus portion 317C. One of the control signals indicates whether the most recent copy of the requested descriptor is in the send queue 312S of the RAM 312 or still resident in the local cache memory 319. That is, the most recent descriptor at any given address is first formed by the CPU 310 in the local cache memory 319 and is later transferred by the CPU 310 to the queue in the RAM 312. Thus, there may be two descriptors with the same address; one in the RAM 312 and one in the local cache memory 319 (FIG. 7), the most recent one being in the local cache memory 319. In either event, the transmit DMA 418 must obtain the descriptor for DMA transmission from the RAM 312 and this descriptor is stored in the transmit buffer register 421 using signal 402 produced by the state machine 419 to load these registers 421. The control signal from the CPU 310 to the Xmit CPU state machine 419 indicates whether the most recent descriptor is in the local cache memory 319. If the most recent descriptor is in the local cache memory 319, the Xmit CPU state machine 419 inhibits the data that was just read from send queue 312S in the RAM 312 and which has been stored in register 421 from passing to selector 423. In such case, state machine 419 must perform another data transfer at the same address location. The most recent message is then transferred by the CPU 310 from the local cache memory 319 to the send queue 312S in the RAM 312. The transmit message state machine 419 then re-arbitrates for the CPU bus 317 and after it is granted such CPU bus 317, the Xmit CPU state machine 419 then reads the descriptor from the RAM 312. This time, however, there the most recent descriptor is available in the send queue 312s in the RAM 312. The descriptor in the RAM 312 is now loaded into the transmit buffer register 421 in response to the assertion of the signal 402 by the Xmit CPU state machine 419. The descriptor in the register 421 is then transferred through selector 423 to message bus interface 409 under the control of a Xmit message (msg) state machine 427. That is, the descriptor in the transmit buffer register 421 is transferred to the transmit data buffer 422 (FIG. 7) over the 32 bit transmit message bus interface 409 by the Xmit message (msg) state machine 427. The data in the transmit data buffer 422 (FIG. 7) is packetized by the packetizer section of the packetizer/depacketizer 428 as described in Step 530 in FIG. 11.

Figure 9:
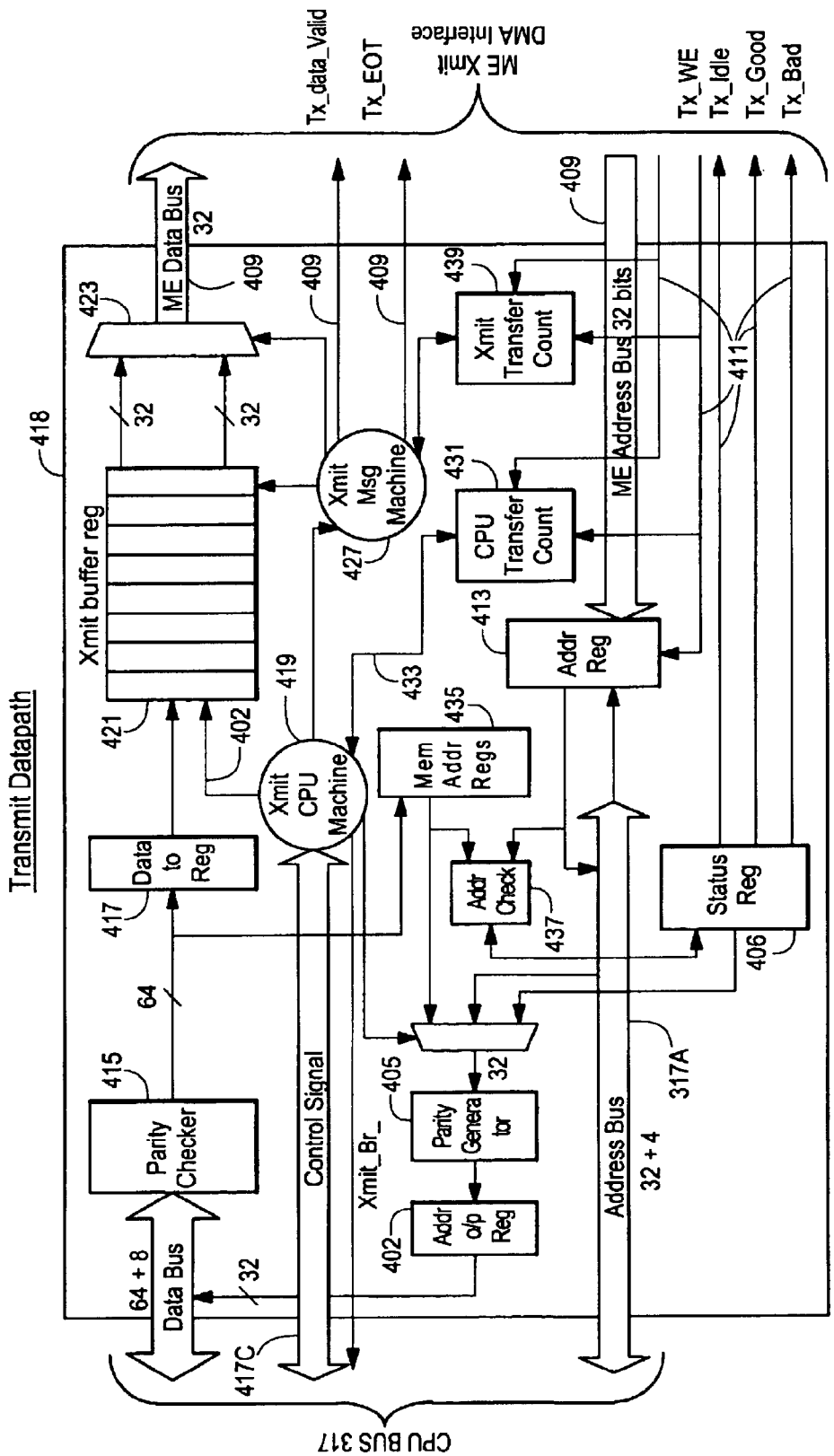
FIG. 9 is a block diagram of a transmit Direct Memory Access (DMA) used in the system interface of the FIG. 8.
Figure 14A:
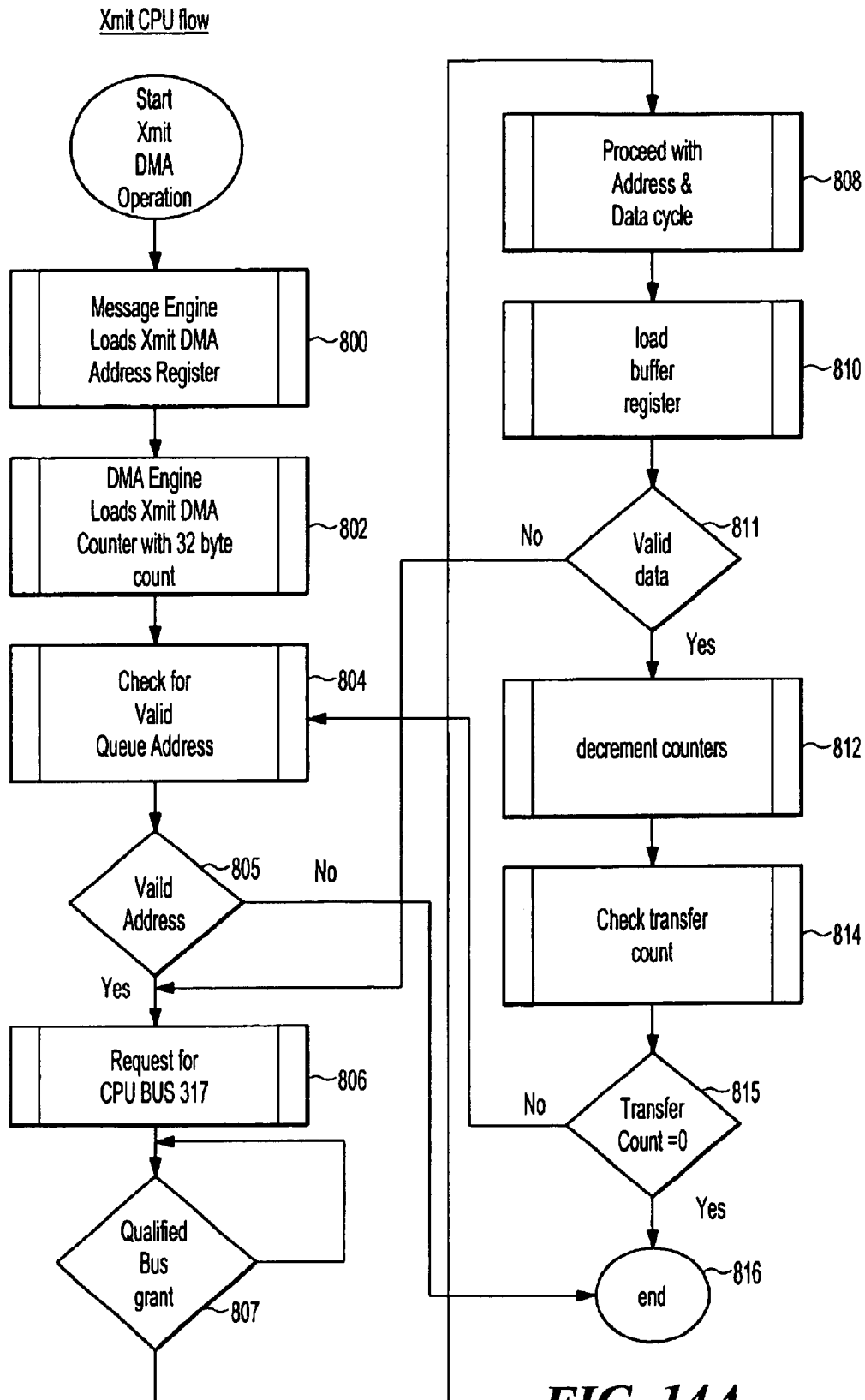
FIGS. 14A and 14B show process flow diagrams of the transmit DMA operation of the transmit DMA of FIG. 9.

More particularly, and referring also to FIG. 14A, the method of operating the transmit DMA 418 (FIG. 9) is shown. As noted above, each descriptor is 64-byte. Here, the transfer of the descriptor takes place over two interfaces namely, the CPU bus 317 and the transmit message interface bus 409 (FIG. 7). The CPU bus 317 is 64 bits wide and eight, 64-bit double-words constitute a 64-byte descriptor. The Xmit CPU state machine 419 generates the control signals which result in the transfer of the descriptor from the RAM 312 into the transmit buffer register 421 (FIG. 7). The 64-byte descriptor is transferred in two 32-byte burst accesses on the CPU bus 317. Each one of the eight double words is stored sequentially in the transmit buffer register 421 (FIG. 9). Thus, in Step 800, the message engine 315 state machine 410 loads the transmit DMA address register 413 with the address of the descriptor to be transmitted in the send queue 312S in RAM 312. This is done by the asserting the Tx_WE signal and this puts Xmit CPU state machine 419 in step 800, loads the address register 413 and proceeds to step 802. In step 802, The Xmit Cpu state machine 419 loads the CPU transfer counter 431 (FIG. 9) with a 32-byte count, which is 2. This is the number of 32 byte transfers that would be required to transfer the 64-byte descriptor, Step 802. The Xmit Cpu state machine 419 now proceeds to Step 804. In step 804, the transmit DMA state machine 419 checks the validity of the address that is loaded into its address register 413. The address loaded into the address register 413 is checked against the values loaded into the memory address registers 435. The memory address registers 435 contain the base address and the offset of the send queue 312s in the RAM 312. The sum of the base address and the offset is the range of addresses for the send queue 312S in RAM 312. The address check circuitry 437 constantly checks whether the address in the address register 413 is with in the range of the send queue 312S in the RAM 312. If the address is found to be outside the range of the send queue 312S the transfer is aborted, this status is stored in the status register 404 and then passed back to the message engine 315 state machine 410 in Step 416. The check for valid addresses is done in Step 805. If the address is within the range, i.e., valid, the transmit DMA state machine 419 proceeds with the transfer and proceeds to Step 806. In the step 806, the transmit DMA state machine 419 requests the CPU bus 317 by asserting the Xmit_BR signal to the arbiter 414 and then proceeds to Step 807. In Step 807, the Xmit Cpu state machine 419 constantly checks if it has been granted the bus by the arbiter. When the CPU bus 317 is granted, the Xmit CPU state machine proceeds to Step 808. In Step 808, the Xmit Cpu state machine 419 generates an address and a data cycle which essentially reads 32-bytes of the descriptor from the send queue 312S in the RAM 312 into its transmit buffer register 421. The Xmit Cpu state machine 419 now proceeds to step 810. In Step 810, the Xmit Cpu state machine 419 loads the descriptor that was read into its buffer registers 421 and proceeds to Step 811. In Step 811, a check is made for any local cache memory 319 coherency errors (i.e., checks whether the most recent data is in the cache memory 319 and not in the RAM 312) on these 32-bytes of data. If this data is detected to be resident in the local CPU cache memory 319, then the Xmit Cpu state machine 419 discards this data and proceeds to Step 806. The Xmit Cpu state machine 419 now requests for the CPU bus 317 again and when granted, transfers another 32-bytes of data into the transmit buffer register 421, by which time the CPU has already transferred the latest copy of the descriptor into the RAM 312. In cases when the 32-bytes of the descriptor initially fetched from the RAM 312 was not resident in the local CPU cache memory 319 (i.e., if no cache coherency errors were detected), the Xmit Cpu state machine 419 proceeds to Step 812. In Step 812, the Xmit CPU state machine 419 decrements counters 431 and increments the address register 413 so that such address register 413 points to the next address. The Xmit Cpu state machine then proceeds to step 814. When in Step 814, the Transmit CPU state machine 419 checks to see if the transfer counter 431 has expired, i.e., counted to zero, if the count was found to be non-zero, it then, proceeds to Step 804 to start the transfer of the next 32-bytes of the descriptor. In case the counter 431 is zero, the process goes to Step 816 to complete the transfer. The successful transfer of the second 32-bytes of descriptor from the RAM 312 into the transmit DMA buffer register 421 completes the transfer over the CPU bus 317.

Figure 14B:
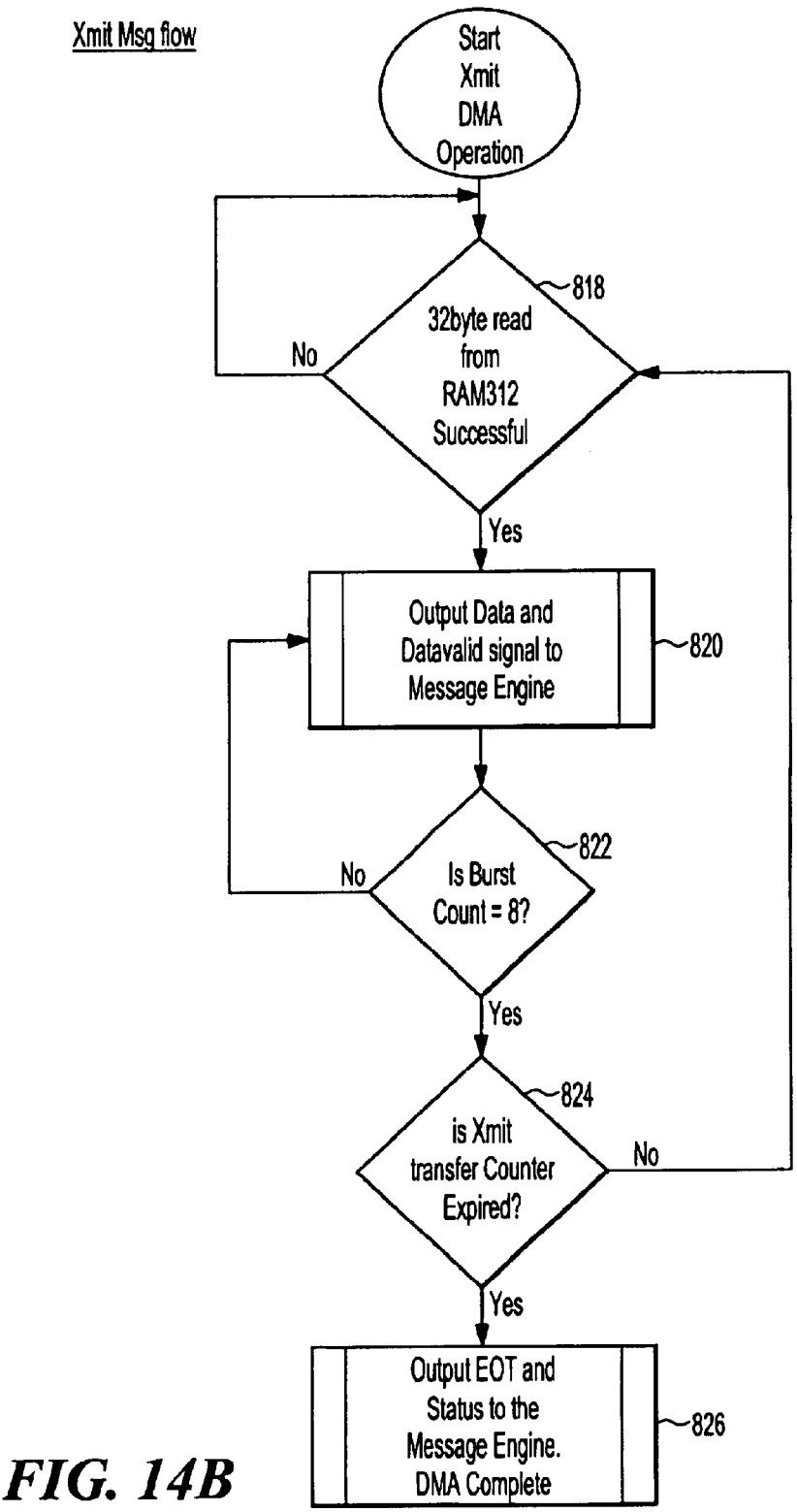

The message interface 409 is 32 bits wide and sixteen, 32 bit words constitute a 64-byte descriptor. The 64-byte descriptor is transferred in batches of 32 bytes each. The Xmit msg state machine 427 controls and manages the interface 409. The Xmit Cpu state machine asserts the signal 433 to indicate that the first 32 bytes have been successfully transferred over the CPU bus 317 (Step 818, FIG. 14B), this puts the Xmit msg state machine into Step 818 and starts the transfer on the message interface. In step 820, the Xmit msg machine 427 resets burst/transfer counters 439 and initiates the transfer over the message interface 409. In Step 820, the transfer is initiated over the message interface 409 by asserting the "transfer valid" (TX_DATA_Vaild) signal indicating to the message engine 315 state machine 410 that valid data is available on the bus 409. The transmit msg machine 427 transfers 32 bits of data on every subsequent clock until its burst counter in burst/transfer counter 439 reaches a value equal to eight, Step 822. The burst counter in burst/transfer counter 439 is incremented with each 32-bit word put on the message bus 409 by a signal on line 433. When the burst count is eight, a check is made by the state machine 427 as to whether the transmit counter 431 has expired, i.e., is zero, Step 824. The expiry of the transfer counter in burst/transfer counter 439 indicates the 64 byte descriptor has been transferred to the transmit buffer 422 in message engine 315. If it has expired, the transmit message state machine 427 proceeds to Step 826. In step 826, the Xmit msg state machine asserts the output End of Transfer (Tx_EOT) indicating the end of transfer over the message bus 409. In this state, after the assertion of the Tx_EOT signal the status of the transfer captured in the status register 404 is sent to the message engine 315 state machine 410. The DMA operation is complete with the descriptor being stored in the transmit buffer 422 (FIG. 7).

On the other hand, if the transfer counter in burst/transfer counter 439 has not expired, the process goes to Step 800 and repeats the above described procedure to transfer the $2^{nd}$ 32 bytes of descriptor data, at which time the transfer will be complete.

Figure 10:
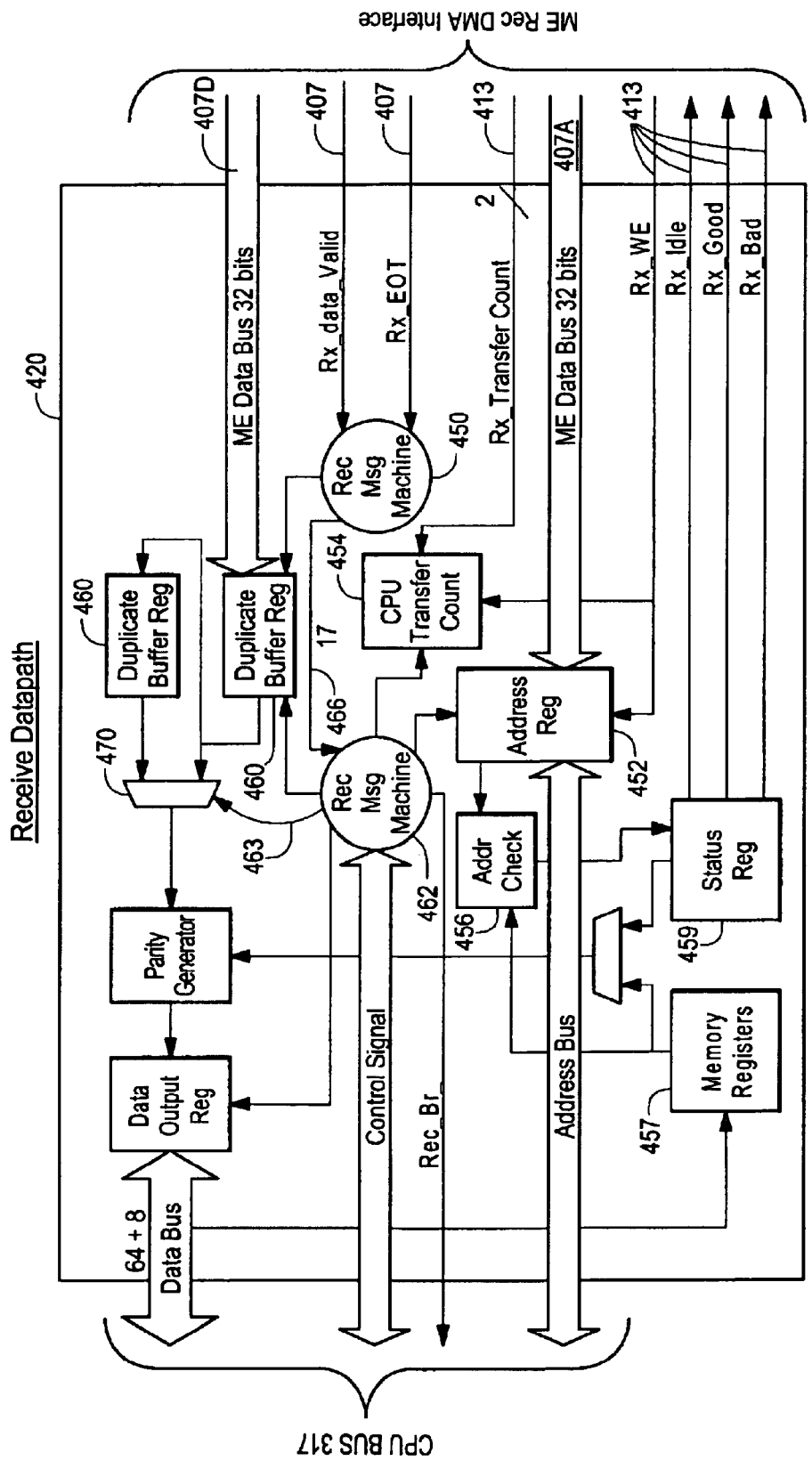
FIG. 10 is a block diagram of a receive DMA used in the system interface of FIG. 8.

Referring now to FIG. 10, the receive DMA 420 is shown. Here, a message received from another director is to be written into the RAM 312 (FIG. 7). The receive DMA 420 is adapted to handle three types of information: error information which is 8 bytes in size; acknowledgement information which is 16 bytes in size; and receive message payload and/or fabric management information which is 32 byes in size. Referring also to FIG. 7, the message engine 315 state machine 410 asserts the Rx_WE signal, indicating to the Receive DMA 420 that it is ready transfer the Data in its Rec buffer 426 FIG. 7. The data in the Receive buffer could be the 8-byte error information, the 16-byte Acknowledgment information or the 32-byte Fabric management/Receive message payload information. It places a 2 bit encoded receive transfer count, on the Rx_transfer count signal indicating the type of information and an address which is the address where this information is to be stored in the receive queue of RAM 312. In response to the receive write enable signal Rx_WE, the Receive message machine 450 (FIG. 10) loads the address into the address register 452 and the transfer count indicating the type of information, into the receive transfer counter 454. The address loaded into the address register 452 is checked by the address check circuitry 456 to see if it is with in the range of the Receive queue addresses, in the RAM 312. This is done by checking the address against the values loaded into the memory registers 457 (i.e., a base address register and an offset register therein). The base address register contains the start address of the receive queue 312R residing in the RAM 312 and the offset register contains the size of this receive queue 312R in RAM 312. Therefore the additive sum of, the values stored in the base address register and the offset register specifies the range of addresses of the receive queue in the RAM 312R. The memory registers 457 are loaded during initialization. On the subsequent clock after the assertion of the Rx_WE signal, the message engine 315 state machine 410 the proceeds to place the data on a 32-bit message engine 315 data bus 407, FIG. 10. A Rx_data_valid signal accompanies each 32 bits of data, indicating that the data on the message engine data bus 407 is valid. In response to this Rx_data_valid signal the receive message state machine 450 loads the data on the data bus into the receive buffer register 460. The end of the transfer over the message engine data bus 407d is indicated by the assertion of the Rx_EOT signal at which time the Receive message state machine 450 loads the last 32 bits of data on the message engine data bus 407D of bus 407, into the receive buffer registers 460. This signals the end of the transfer over the message engine data bus 407D portion of bus 407. At the end of such transfer is conveyed to the Rx_Cpu state machine 462 by the assertion of the signal 464. The Receive CPU machine 462 now, requests for the CPU bus 317 by asserting the signal REC_Br. After an arbitration by CPU bus arbiter 414 (FIG. 7) the receive DMA 420 (FIG. 10) is given access to the CPU bus 317. The Receive CPU state machine 462 proceeds to transfer the data in its buffer registers 424 over the CPU bus 317 into the Receive queue 312R in the RAM 312. Simultaneously, this data is also transferred into a duplicate buffer register 466. The data at the output of the receive buffer register 460 passes to one input of a selector 470 and also passes to a duplicate data receive buffer register 460. The output of the duplicate receive buffer register 466 is fed to a second input of the selector 470. As the data is being transferred by the Receive CPU state machine 462, it is also checked for cache coherency errors. If the data corresponding to the address being written into the RAM 312, is located in the CPU's local cache memory 319 (FIG. 7), the receive DMA machine 420 waits for the CPU 310 to copy the old data in its local cache memory 319 back to the receive queue 312R in the RAM 312 and then overwrites this old data with a copy of the new data from the duplicate buffer register 466.

More particularly, if central processing unit 310 indicates to the DMA receiver 420 that the data the receive buffer register 460 is available in the local cache memory 319, the receive CPU state machine 462 produces a select signal on line 463 which couples the data in the duplicate buffer register 466 to the output of selector 470 and then to the bus 317 for store in the random access memory 312.

The successful write into the RAM 312 completes the DMA transfer. The receive DMA 420 then signals the message engine 315 state machine 410 on the status of the transfer. The status of the transfer is captured in the status register 459.

Thus, with both the receive DMA and the transmit DMA, there is a checking of the local cache memory 319 to determine whether it has "old" data, in the case of the receive DMA or whether it has "new data" in the case of the transmit DMA.

Figure 15A:
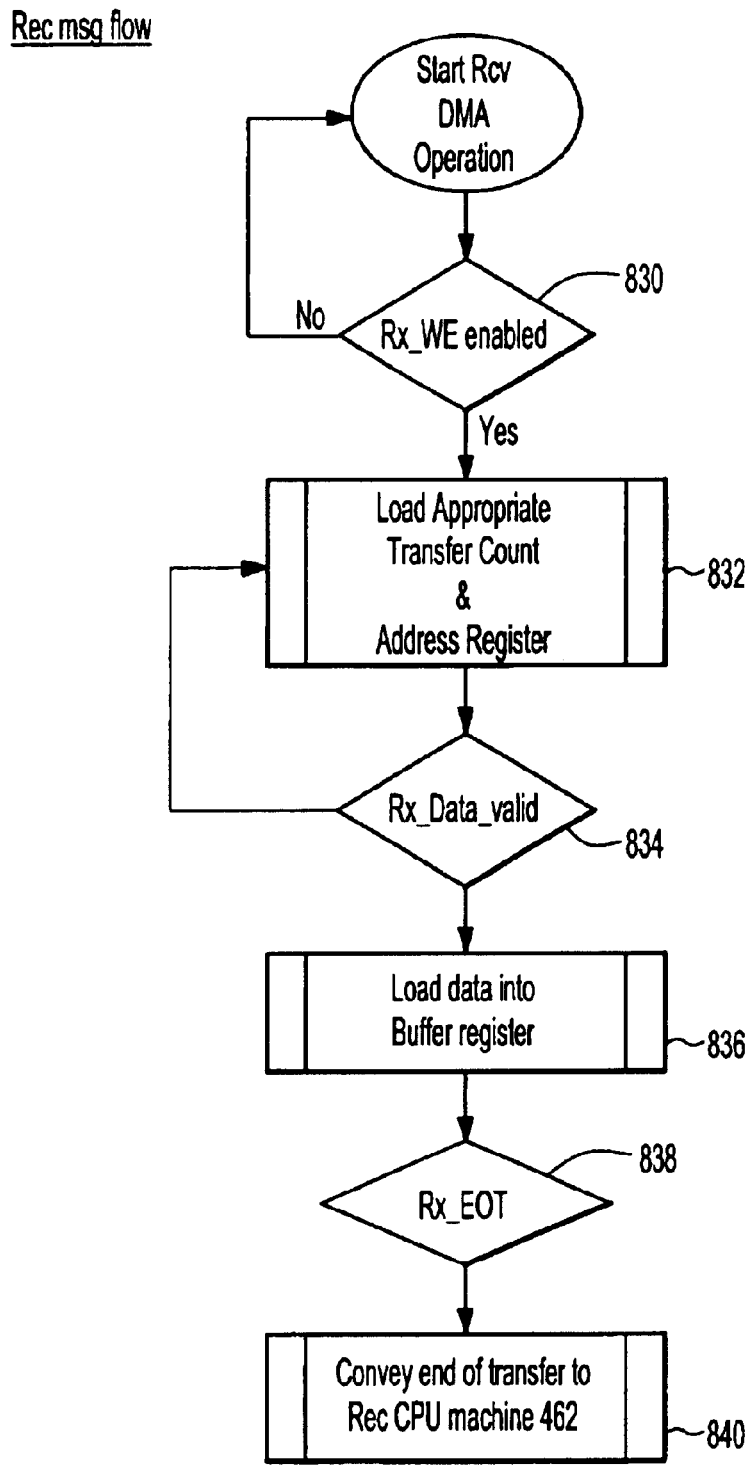
FIGS. 15A and 15B show process flow diagrams of the receive DMA operation of the receive DMA of FIG. 10.

Referring now to FIG. 15A, the operation of the receive DMA 420 is shown. Thus, in Step 830 the Receive message machine 450 checks if the write enable signal Rx_WE is asserted. If found asserted, the receive DMA 420 proceeds to load the address register 452 and the transfer counter 454. The value loaded into the transfer counter 454 determines the type of DMA transfer requested by the Message engine state machine 310 in FIG. 7. The assertion of the Rx_WE signal starts the DMA receive transfer operation. This puts the Rx msg state machine 450 in Step 832. In Step 832 the Rec msg state machine 450 loads the address register 452, the transfer counter 454 and then proceeds to Step 834. In Step 834, it checks to see if the Rx_DATA_VALID signal is asserted. If asserted it proceeds to step 836. The Rx msg state machine loads the buffer register 460 (FIG. 10) in Step 836 with the data on the message engine data bus 407D of bus 407 FIG. 10. The Rx_DATA_VALID signal accompanies each piece of data put on the bus 407. The data is sequentially loaded into the buffer registers 460 (FIG. 10). The End of the transfer on the message engine data bus 407D of bus 407 is indicated by the assertion of the Rx_EOT signal. When the Receive message state machine 450 is in the End of transfer state Step 840 it signals the Receive CPU state machine 462 and this starts the transfer on the CPU bus 317 side.

Figure 15B:
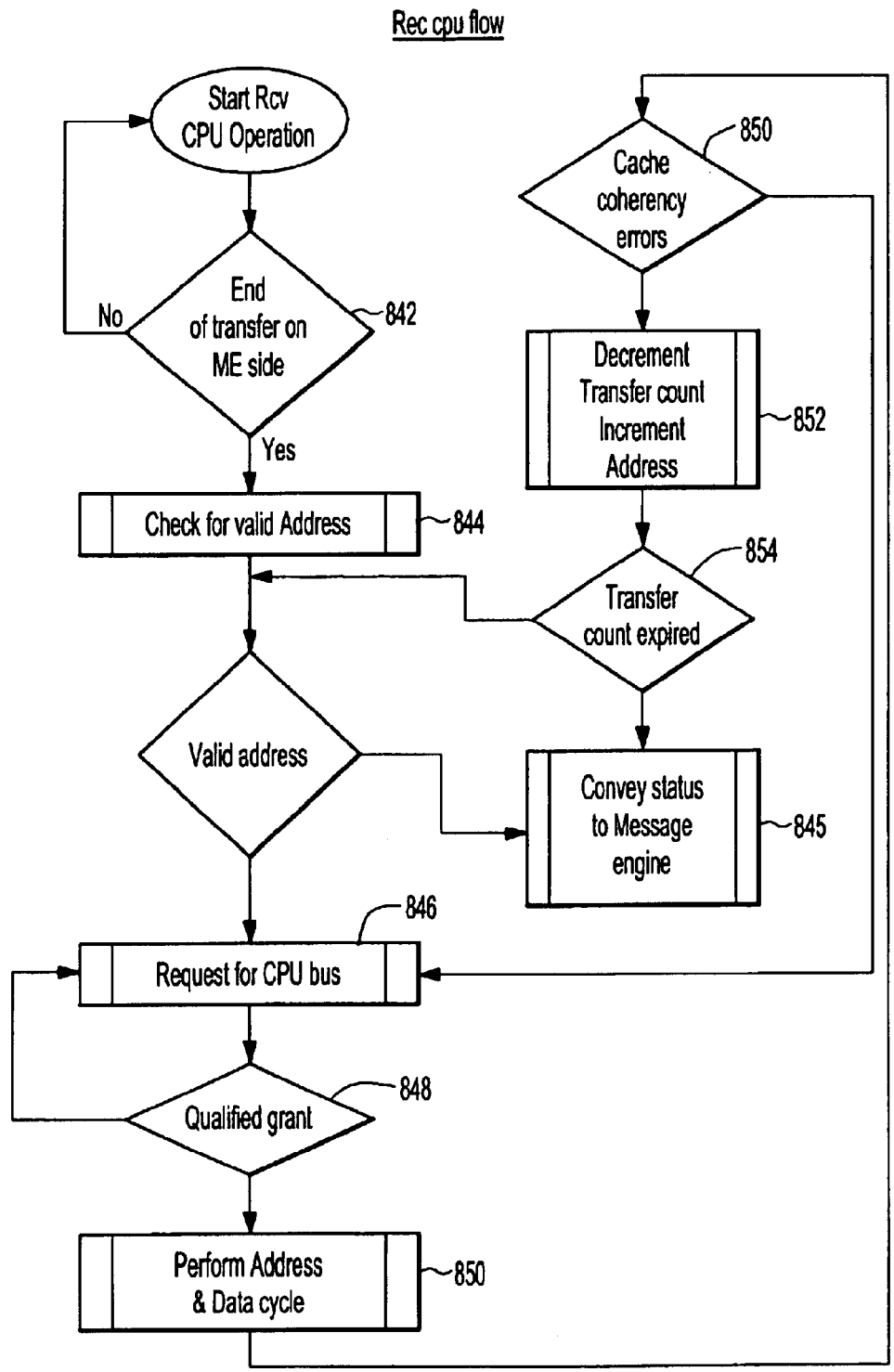

The flow for the Receive CPU state machine is explained below. Thus, referring to FIG. 15B, the End of the transfer on the Message engine data bus 407D portion of bus 407 starts the Receive CPU state machine 462 and puts it in Step 842. The Receive CPU state machine 462 checks for validity of the address in this state (Step 844). This is done by the address check circuitry 456. If the address loaded in the address register 452 is outside the range of the receive queue 312R in the RAM 312, the transfer is aborted and the status is captured in the Receive status register 459 and the Rec Cpu state machine 462 proceeds to Step 845. On a valid address the Receive CPU state machine 462 goes to Step 846. In Step 846 the Receive Cpu state machine 462 requests for access of the CPU bus 317. It then proceeds to Step 848. In step 848 it checks for a grant on the bus 317. On a qualified grant it proceeds to step 850. In Step 850, The Rec Cpu state machine 462 performs an address and a data cycle, which essentially writes the data in the buffer registers 460 into the receive queue 312R in RAM 312. Simultaneously with the write to the RAM 312, the data put on the CPU bus 317 is also loaded into the duplicate buffer register 466. At same time, the CPU 310 also indicates on one of the control lines, if the data corresponding to the address written to in the RAM 312 is available in its local cache memory 319. At the end of the address and data cycle the Rec Cpu state machine 462 proceeds to Step 850. In this step it checks for cache coherency errors of the type described above in connection with the transmit DMA 418 (FIG. 9). If cache coherency error is detected and the receive CPU state machine 462 proceeds to Step 846 and retries the transaction more particularly, the Receive CPU state machine 462 now generates another address and data cycle to the previous address and this time the data from the duplicate buffer 466 is put on to the CPU data bus 317. If there were no cache coherency errors the Receive CPU state machine 462 proceeds to Step 852 where it decrements the transfer counter 454 and increment the address in the address register 452.

The Receive Cpu state machine 462 then proceeds to Step 854. In Step 854, the state machine 462 checks if the transfer counter has expired, i.e., is zero. On a non zero transfer count the receive Cpu state machine 462 proceeds to Step 844 and repeats the above described procedure until the transfer becomes zero. A zero transfer count when in step 854 completes the write into the receive queue 312R in RAM 312 and the Rec Cpu state machine proceeds to 845. In step 845, it conveys status stored in the status register back to status is conveyed to the message engine 315 state machine 410.

Referring again to FIG. 7, the interrupt control status register 412 will be described in more detail. As described above, a packet is sent by the pocketsize portion of the packetizer/de-packetizer 428 to the crossbar switch 320 for transmission to one or more of the directors. It is to be noted that the packet sent by the packetizer portion of the packetizer/de-packetizer 428 passes through a parity generator PG in the message engine 315 prior to passing to the crossbar switch 320. When such packet is sent by the message engine 315 in exemplary director $180_1$, to the crossbar switch 320, a parity bit is added to the packet by parity bit generator PG prior to passing to the crossbar switch 320. The parity of the packet is checked in the parity checker portion of a parity checker/generator (PG/C) in the crossbar switch 320. The result of the check is sent by the PG/C in the crossbar switch 320 to the interrupt control status register 412 in the director $180_1$.

Likewise, when a packet is transmitted from the crossbar switch 320 to the message engine 315 of exemplary director $180_1$, the packet passes through a parity generator portion of the parity checker/generator (PG/C) in the crossbar switch 320 prior to being transmitted to the message engine 315 in director $180_1$. The parity of the packet is then checked in the parity checker portion of the parity checker (PC) in director $180_1$ and is the result (i.e., status) is transmitted to the status register 412.

Figure 16:
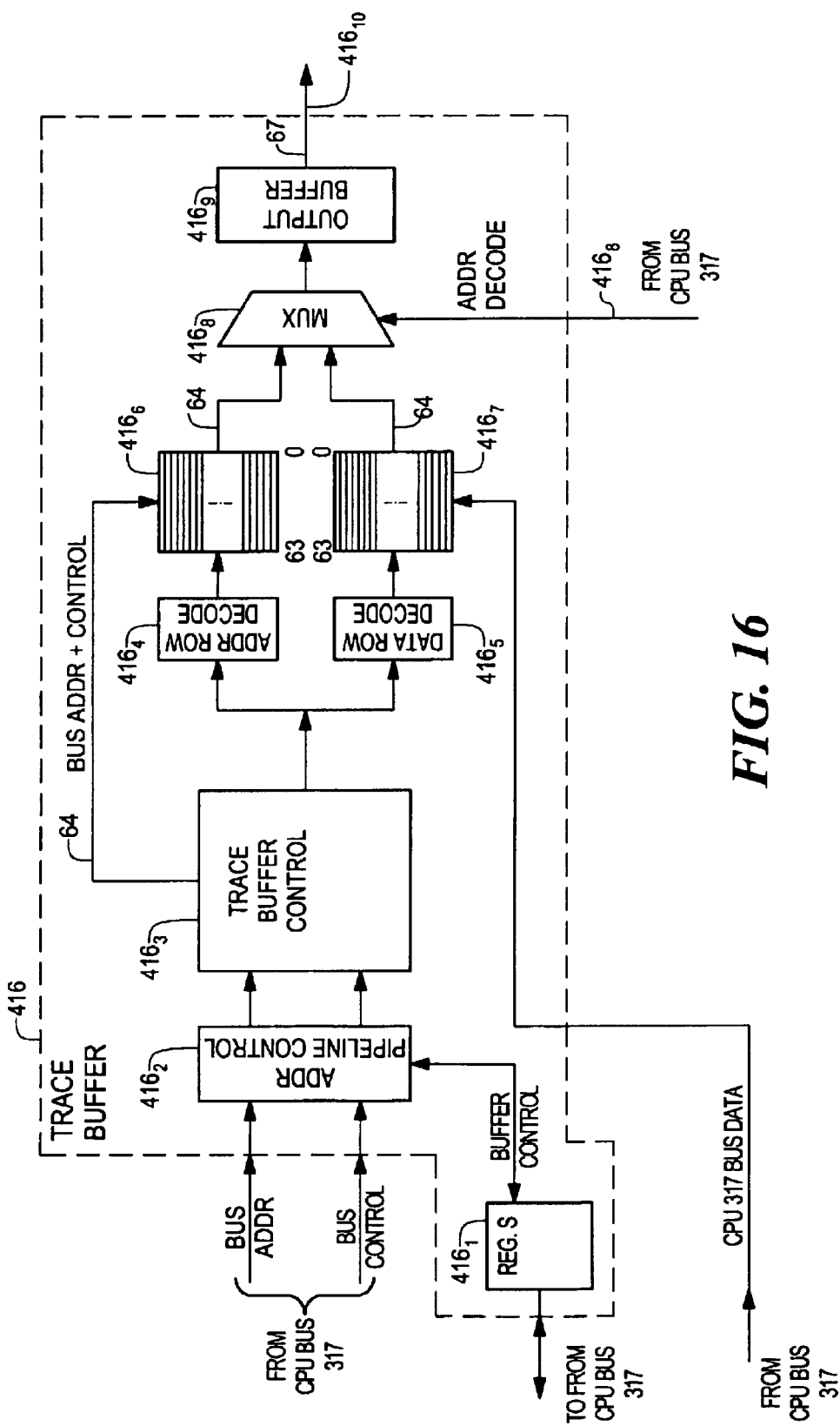
FIG. 16 is a block diagram of a trace buffer according to the invention.

Referring to FIG. 16, the trace buffer 416 is shown to include an SRAM available on the FPGA 314, such trace buffer 416 being used to record activity of the CPU bus 317 (FIG. 7). More particularly, for each bus cycle, the digital word on the bus 317 produced by the CPU 310 may be recorded and stored in the trace buffer 416 for later analysis in detecting and evaluating faults which may be produced by the CPU 310. Here, the trace buffer 416 can record activity from up to 512 consecutive CPU 317 bus cycles. The trace buffer 416 stores the address, data, and control/status signals active for each bus cycle. The user has full control of the trace buffer 416 record and stop record modes through trace buffer control and status registers $416_1$. Here, there are 11 registers $416_1$ located at the following addresses: (F100 420$h$ through F100 478$h$), respectively. These registers $416_1$ stored a digital word at each address, each digital word represents a specific control function for the trace buffer 416 operation. For example, one such operation is the address mode of the trace buffer 416. Other operations and details will be described hereinafter.

More particularly, referring now to FIG. 16, the details of the trace buffer 416 is shown to include in addition to registers $416_1$, an address pipeline control section $416_2$, here a FIFO, a trace buffer control section $416_3$, a address row decoder $416_4$, a data row decoder $416_5$, a pair of memory sections $416_6$, $416_7$, a selector $416_8$ and an output buffer $416_9$, all arranged as shown. The address pipeline control section $416_2$ is fed by the portion of the CPU bus 317 carrys address and control signals on such bus 317. The data stored in the FIFO of the address pipeline control section $416_2$ is fed to the trace buffer control section $416_6$. Also fed to the trace buffer control section $416_6$ are buffer control signals on bus BUFFER CTL, such signal being driven by the trace buffer control registers $416_1$. These control signals indicate: (1) whether the data fed to the trace buffer control $416_2$ should be stored in the trace buffer memory sections $416_6$, $416_7$; (2) whether storage in the trace buffer 416 should stop; or, (3) whether the data in the trace buffer 416 should be read by the CPU 310. The trace buffer control section $416_3$ also produces a trace buffer status signals, such signal being fed to the trace buffer status register $416_1$.

Each one of the pair of memory sections $416_6$, $416_7$ has 512 storage locations, each location here being 64 bits. The address, control and data portion information on the CPU bus 317 are stored in memory section $416_6$ and $416_7$. The address portion of the information on the CPU bus 317 here includes 32 bits and the control portion here includes 17 bits. The data portion here includes 64 bits.

The information (i.e., 32 bits of address, 17 bits of control and 64 bits of data) is stored sequentially in the two memory sections $416_6$ and $416_7$ after each CPU bus 317 cycle. The information stored in the memory sections $416_6$ and $416_7$ is always available for reading by the CPU 310 at the output buffer $416_9$ on output bus $416_{10}$. Because the output bus $416_{10}$ (CPU READ DATA) from the trace buffer 416 is here only 64 bits, the information stored in memory sections $416_6$ and $416_7$ for each stored CPU bus 317 cycle must be read from such memory sections $416_6$ and $416_7$ in two consecutive read cycles. Thus, during the first read cycle, the logic signal on line $416_8$ ADDRESS DECODE, is a logic 1 thereby coupling the address and control portion of the information in one memory location of memory sections $416_6$ and $416_7$ through output buffer $416_9$ to the CPU 310 and during the second read cycle the logic signal on line ADDRESS DECODE is a logic 0 thereby coupling the data portion of the information in the same memory location of memory section $416_6$ and $416_7$ through output buffer $416_9$ to the CPU 310. The logic signals on the ADDRESS DECODE line $416_8$ are provided by CPU 310.

More particularly, at reset, all locations in both memory sections $416_6$ and $416_7$ are initialized to zero. The trace buffer 416 will not start recording CPU bus 317 activity until programmed to do so through registers $416_1$. Such programming is performed by a user who stores a program in the RAM 312 for use in controlling the CPU 310. Using these registers $416_1$, one can a priori specify various address, access type, to be described, and stop modes by accessing and selecting specific bits in such register $416_1$. Once the desired mode has been programmed in registers $416_1$, the trace buffer 416 begins recording activity of the CPU bus 317 for each bus cycle after a START command is issued to the trace buffer control section $416_3$ from the trace buffer registers $416_1$. This recording continues until a stop condition, to be described below, is detected.

When the trace buffer 416 detects a stop condition, it remains in the stop mode and its contents in memory sections $416_6$ and $416_7$ can be read by the CPU 310, as described above. A trace buffer stop register included as one of the 11 registers in registers $416_1$ contains the address of the last CPU bus 317 cycle recorded by the trace buffer 416. The number of cycles recorded can be determined by subtracting the start address in the first location of memory section $416_6$ and $416_7$ from the stop address.

To read the stored CPU bus 317 cycle information from the trace buffer 416, it is necessary to read two double-words from the first and second memory sections $416_6$ and $416_7$, each one of the double words being read in each of two sequential read cycles, as described above.

The trace buffer 416 has several operational modes. These modes will be described below. Suffice it to say here, however, that more than one mode can be enabled simultaneously during trace buffer 416 recording. At least one address and access type mode (described below) must be enabled by the register $416_1$ at the same time in order for the trace buffer 416 to record.

ADDRESS MODES—The trace buffer 416 has three address modes which use the address portion of the information on the CPU bus 317 for the control of the trace buffer 416 recording. More than one address mode can be enabled by the trace buffer register $416_1$ at the same time. These address modes are:

Address Count Mode

With the Address Count mode enabled, the trace buffer counts the accesses to a specific system resource, here a specific system 100 (FIG. 1) memory location (i.e., system resource, described below) and decrements a counter, not shown, located in the trace buffer control section $416_3$ with each address match memory location. When the counter value reaches zero, the trace buffer 416 stops recording and generates the trace buffer 416 interrupt. This mode can be used to track the access frequency to a specific system 100 (FIG. 2) resource, here, for example, a specific system memory location, such system memory being, for example the global cache memory 220 (FIG. 2) or the RAM 312 (FIG. 7)

Start-Stop Address Mode

With the Stop-Stop Address mode enabled, the trace buffer starts recording when the specified system memory location is accessed (start address) and continues recording until another specified system memory location is accessed (end address). When the end address is accessed, the trace buffer stops recording, and generates the trace buffer interrupt. This mode can be used to record the activity from a specific window of addresses.

Address Range Mode

When the Address Range mode enabled, the trace buffer records cycles when the system memory location accessed falls between the specified address range. This mode does not generate a stop condition, so other modes must be enabled to generate the trace buffer stop.

Access Type Modes

The access type modes control the type of cycles to be recorded in the trace buffer 416. More than one mode can be in use at the same time. The access type modes are:

Address-Only Enabled Mode

The Address Only Enabled mode enables the trace buffer to record address-only transaction generated by the CPU 310.

RAM Enabled Mode

The RAM 312 in the Enabled mode enables the trace buffer 416 to record accesses by the CPU 310 to the RAM312 space.

DMA Enabled Mode

The DMA Enabled mode enables the trace buffer 416 to record accesses by the DMA Machine 408 (FIG. 7, described above) to the RAM 312 space.

SYSTEM MEMORY Enabled Mode

The system memory enabled mode enables the trace buffer 416 to record accesses by the CPU 312 to the system memory space.

Stop Condition

There are various conditions and modes in addition to the address and access type modes that will stop the trace buffer 416 recording. When the trace buffer 416 detects a stop condition, it stops recording, generates the trace buffer interrupt, and remains in the stop state until a Start command is issued by the CPU 310 writing to the register $416_1$.

The trace buffer 416 contents (stored cycle information) may be read when the trace buffer 416 is in the stop condition. When the trace buffer 416 is restarted, all trace buffer status information is cleared from memories $416_6$ and $416_7$, the trace buffer 416 interrupt is cleared, and the trace buffer 416 begins recording cycles at the beginning of memory $416_6$ and $416_7$ (0h).

The conditions that cause the trace buffer 416 to stop recording are as follows:

Full Interrupt Mode

The Full Interrupt Mode is a mode that generates the stop condition when the trace buffer 416 memory $416_6$ and $416_7$ are full (512) consecutive cycles recorded). On the 512th cycle, the trace buffer 416 generates the Trace Buffer interrupt into trace buffer register $416_1$.

Interrupt/Error Stop Enable Mode

The Interrupt/Error Stop Enable mode stops the trace buffer 416 on a specific interrupt or error (user-selectable). The interrupt/error is specified in the Trace Buffer Stop Interrupt Enable register located in the trace buffer register $416_1$. When the specified interrupt/error occurs, the trace buffer 416 stops and generates the trace buffer interrupt to the register $416_1$ Software Stop Write The trace buffer 416 may also be stopped by the CPU 312 writing to the trace buffer register $416_1$. This stop command may be written to at any time while the trace buffer 416 is recording. The trace buffer 416 remains in the stop condition until restarted by the CPU 312.

Figure 1:
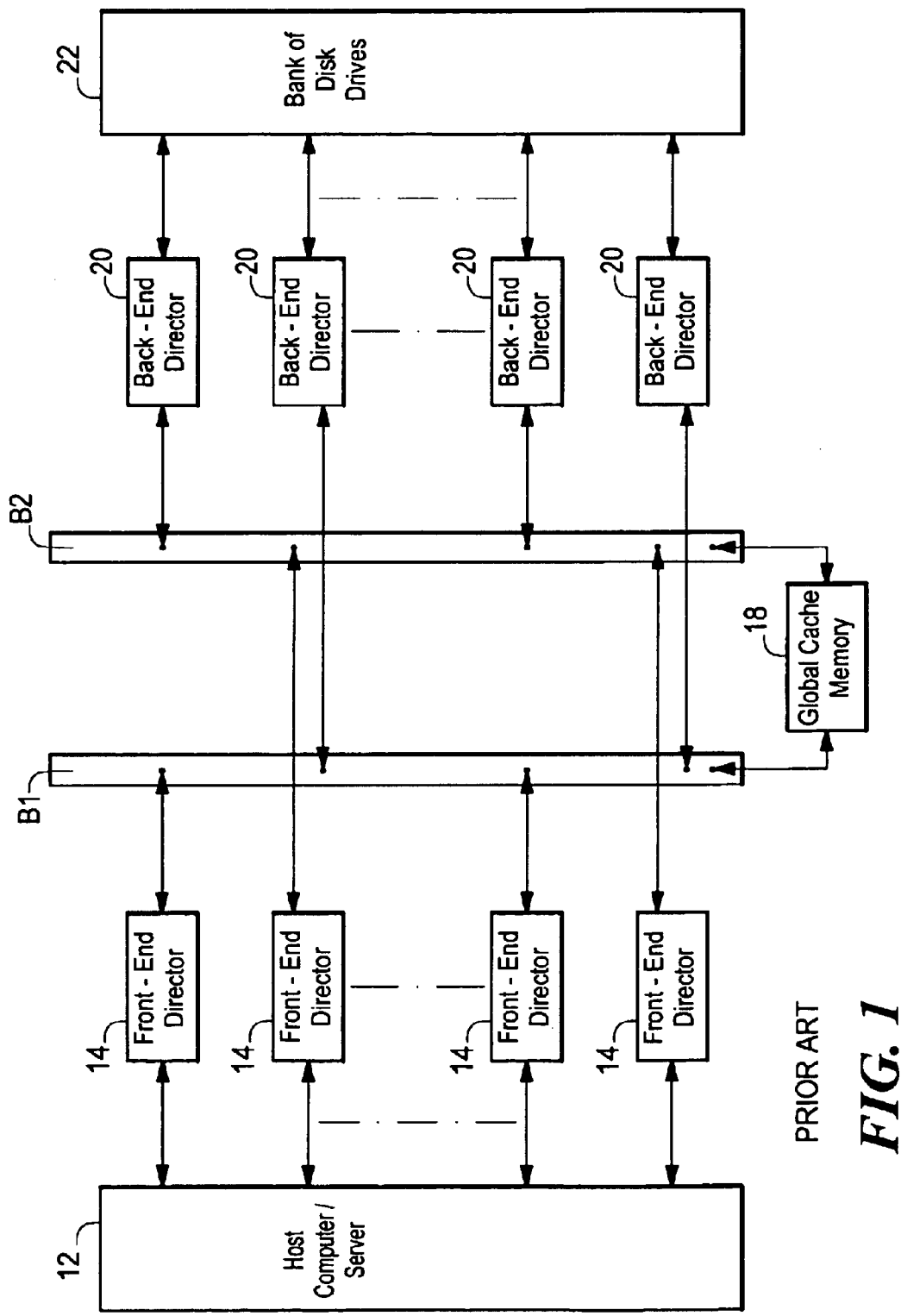
FIG. 1 is a block diagram of a data storage system according to the PRIOR ART.

Therefore, the trace buffer has stored therein here up to 512 bus cycles of information which was produced on the CPU bus during operation of the system 100 (FIG. 1). A technician can access this stored information at any time by performing a read operation on the CPU bus 317 using a program stored in memory 312. Thus, with this arrangement, the technician has full capability of monitoring/de-bugging the CPU bus 317 without using any external bus probing devices.

Bus Arbiter 414

Figure 18:
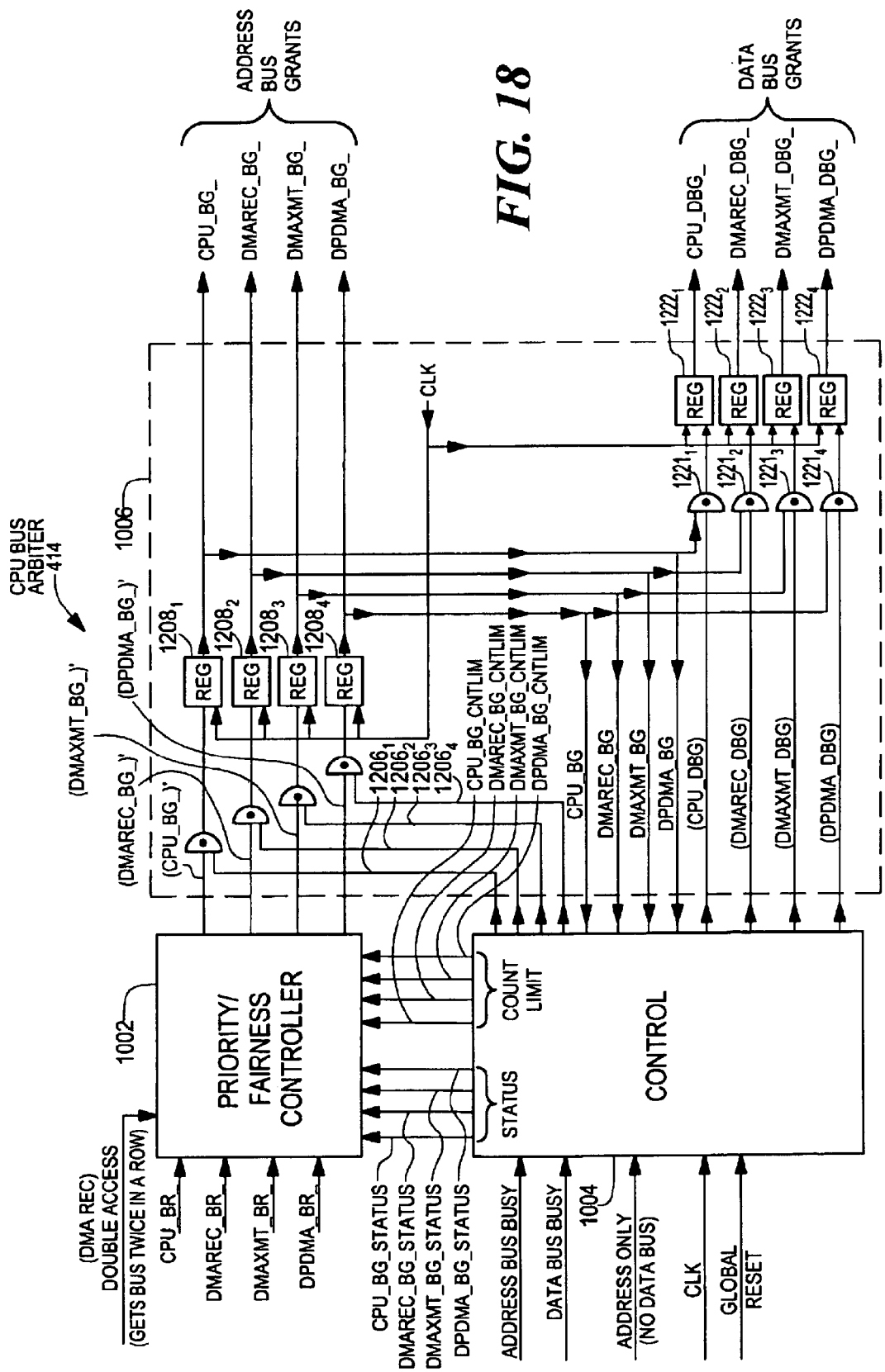
FIG. 18 is a block diagram of the CPU bus arbiter of FIG. 17.

Referring now to FIG. 18, the details of the CPU bus arbiter 414 are shown in more detail to include a priority/fairness controller 1002, a control 1004, and an enable network 1006 all arranged as shown to provide CPU bus address bus grant signals CPU_BG_, DMAXMT_BG_, DMAREC_BG_, and DPDMA_BG_ for the CPU 310, DMA REC 424, DMA XMIT 418, and, Data Pipe DMA unit 403, and data bus grant signals CPU_DBG_, DMAREC_DBG_, DMAXMT_DBG_, and DPDMA_DBG_ for the CPU 310, DMA XMIT 418, DMA REC 424; and, Data Pipe DMA 403. Such bus grant signals are produced selectively in response to bus requests signals CPU_BR_, DMAREC_BR_, DMAXMT_BR_, and DPDMA_BR_ from the CPU 310, DMA REC 424; DMA XMIT 418, and, Data Pipe DMA 403, respectively. The details of the priority/fairness controller will be described in connection with FIG. 18. Suffice it to say here, however, that the controller 1002 is a decoder which implements a "Truth-Table", such "Truth Table" in turn implements a priority/fairness algorithm based on the following principles:

A. The CPU 310 is parked on the address portion of the CPU bus 317; that is, the CPU 310 is granted the CPU address bus 317 by default;

B. The address portion of the CPU bus 317 will be granted to the candidate with the highest priority if such candidate requests the address bus (BR_) subject to conditions C and D below, the priority order being as follows:

1. CPU 310 (i.e., highest priority);
2. DMA REC 424;
3. DMA XMIT 418;
4. Data Pipe DMA 403 (i.e., lowest priority), C. When multiple candidates are requesting the CPU bus 317, the "highest priority" requesting candidate will not be granted the bus if such candidate was the recipient of the previous address bus grant (BG_), subject to condition D below.

D. Each candidate shall have an independent "wait count" that indicates that the candidate has waited for n assertions of BG_ to other bus candidates without being granted the address bus BG_ itself. If a candidate's predetermined wait count limit is reached, that such candidate receives the next address bus grant BG_. However, if multiple candidates simultaneously reach their respective "wait count" limit, then the address bus grant BG_ will be granted in accordance with the priority:

1. CPU 310 (i.e., highest priority)
2. DMA REC 424;
3. DMA XMIT 418;
4. Data Pipe DMA 403 (i.e., lowest priority).

It should be noted that the CPU bus arbiter 414 supports one-stage deep, in-order-execution address pipelining. Therefore, the data bus portion of the CPU bus 317 will be granted (i.e., Data Bus Grant, DBG_) to the bus candidate with the oldest outstanding BG_. If that candidate is executing an "address only" transfer, then no DBG_ will be asserted to that candidate.

Figure 17:
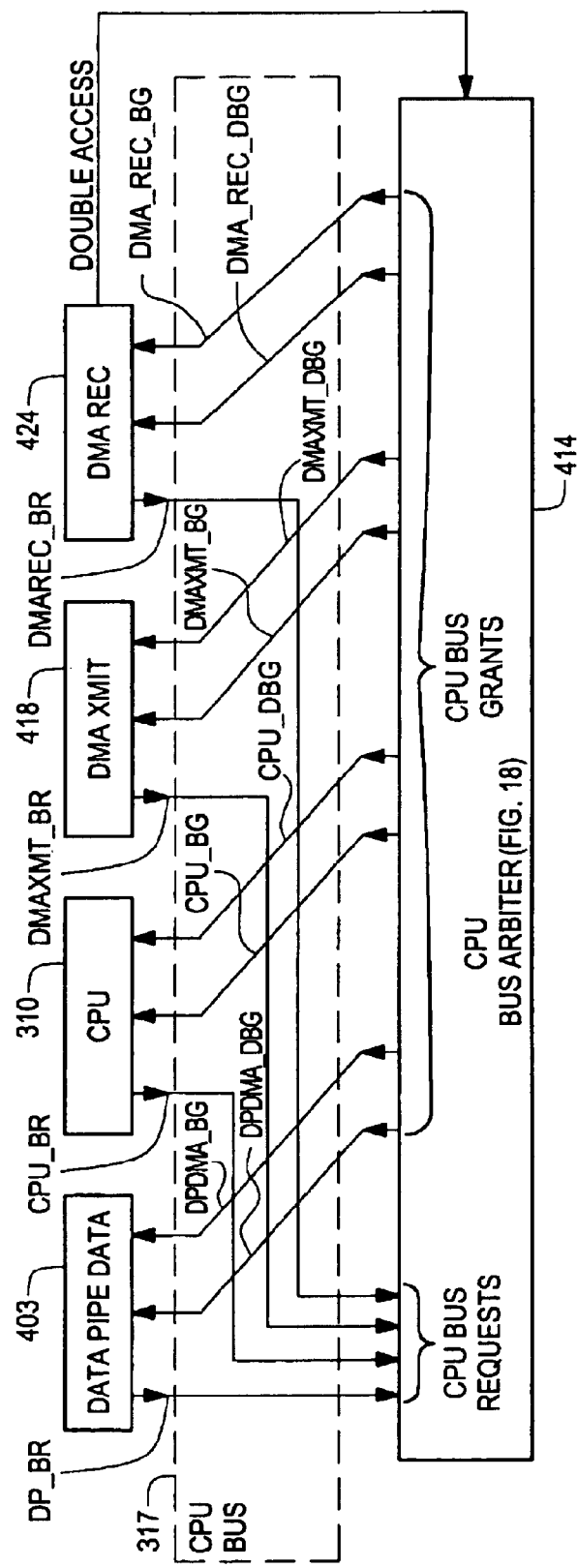
FIG. 17 is a block diagram of a CPU bus used in one of the directors, such bus having coupled to it a CPU bus arbiter which arbitrates for the access to the bus among a data pipe DMA, a CPU a DMA Transmit (XMIT) and a DMA Receive (REC) used in such director

The above-described priority/fairness algorithm is implemented by the "truth-table" stored in priority/fairness controller 1002. It should first be noted that the priority/fairness controller issues a "conditional" CPU bus 317 grant indicated by the prime (') notation. Thus, the "conditional" CPU bus grants to the CPU 310, DMA REC 424, DMA XMIT 418, and, Data Pipe DMA 403, are indicated as: (CPU_BG_)', (DMAREC_BG_)', (DMAXMT_BG_)', and (DPDMA_BG_)', respectively. The inputs to the Truth-Table are:

A. Candidate Requests:

CPU Bus Request (CPU_BR_) from CPU 310 (FIG. 17);

DMA REC Bus Request (DMAREC_BR_) from the DMA REC 424;

DMA XMIT Bus Request (DMAXMT_BR_) from the DMA XMIT 418;

Data Pipe Bus Request (DPDMA_BR_) from the data pipe DMA 403;

B. Status (Which candidate is the most recent recipient of the CPU bus 317?):

CPU Bus Grant Status (CPU_BG_STATUS) from CPU 310 (FIG. 17);

DMAREC Bus Grant Status (DMAREC_BG_STATUS) from the DMA REC 424;

DMA XMIT Bus Grant Status (DMAXMT_BG_STATUS) from the DMA XMIT 418;

Data Pipe DMA Bus Grant Status (DPDMA_BG_STATUS) from the data pipe 403;

C. Count Limit (Has the candidate reached its specific count limit? A count is registered in the control 1004 of the number of times each candidate has requested the bus but was not granted the bus by the arbiter 414. Each candidate has a predetermined number of times it can be "passed-up"

and when such number is met, or exceeded, the candidate asserts a Count Limit signal, CNTLIM). Thus:

CPU Bus Grant Count Limit (CPU_BG_CNTLIM) is asserted when the count limit for the CPU 410 has been reached;

DMA REC Bus Count Limit (DMAREC_BG_CNTLIM) is asserted when the count limit from the DMA REC 424 has been reached;

DMA Transmit Bus Count Limit (DMAXMT_BG_CNTLIM) is asserted when the count limit from the DMA XMIT 418 has been reached;

Data Pipe DMA Bus Count Limit (DPDMA_BG_CNTLIM) is asserted when the count limit for the data pipe DMA 403 has been reached;

D. Double-Access

Has the DMA REC 424 indicated that it is to make two consecutive transfers by asserting Double-Access signal?

The "Truth Table" is shown in FIG. 19. It should be noted that "DC" in the "Truth-Table" below indicates a "don't care" condition. Further, an assertion of a status condition (i.e., the candidate had the bus during the previous grant) or count limit (CNTLIM) condition (i.e., the candidate has reached its count limit) are indicated by a logic 1 and the absence of such condition is indicated by a logic 0.

Figures 20, 21A, 21B:
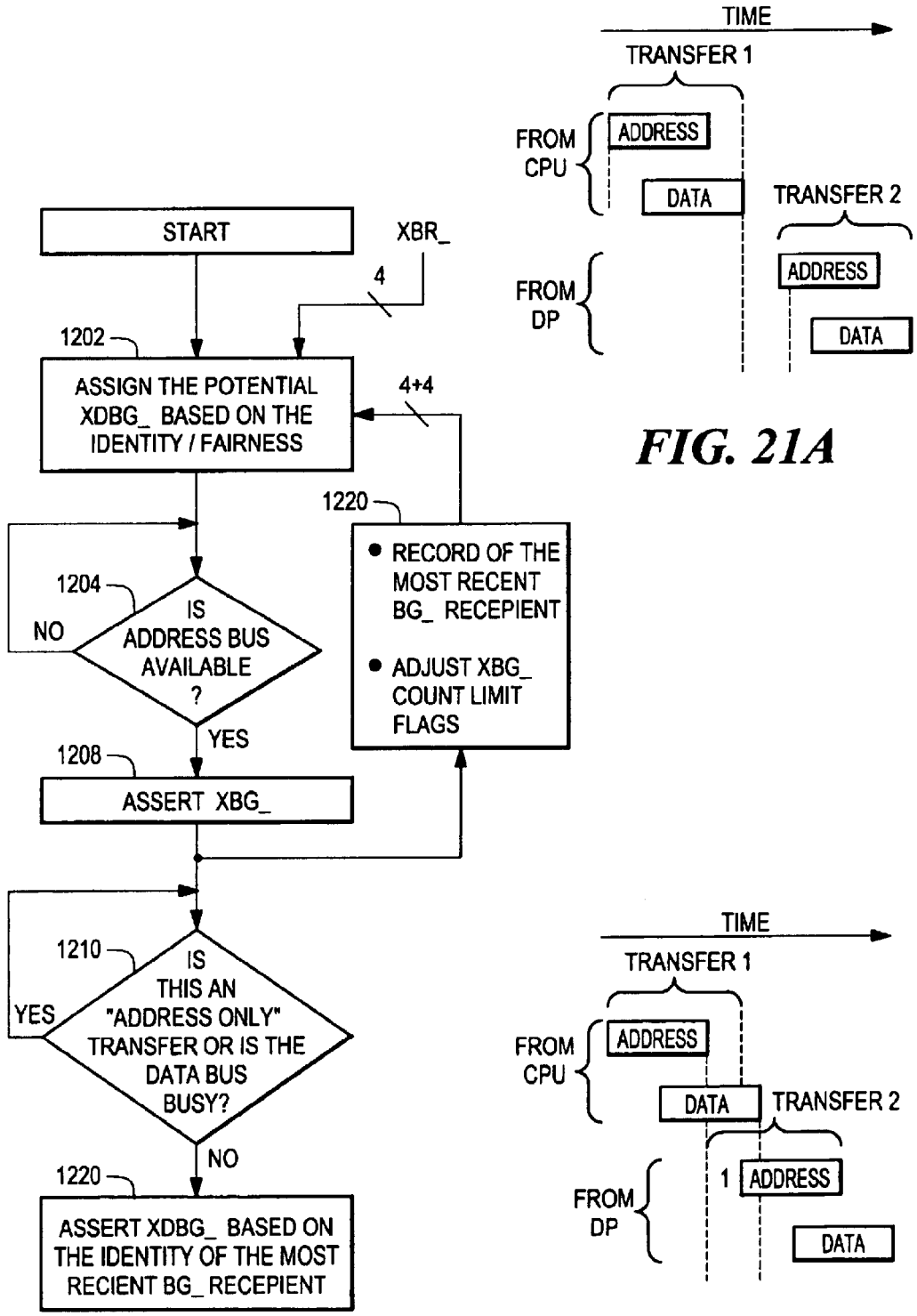
FIG. 20 is a flow diagram of the process used by the bus arbiter of FIG. 18 in performing an arbitration for the CPU bus of FIG. 17.
FIG. 21A is a timing diagram showing a non-overlapping pair of address/data transfers.
FIG. 21B is a timing diagram showing an overlapping pair of address/data transfers.

The Status signals (CPU_BG_STATUS, DMAREC_BG_STATUS, DMAXMT_BG_STATUS, and DPDMA_BG_STATUS) and Count Limit signals (CPU_BG_CNTLIM, DMAREC_BG_CNTLIM, DMAXMT_BG_CNTLIM, DPDMA_BG_CNTLIM) are generated by the control 1004 (FIG. 18) in accordance with the flow diagram shown in FIG. 20. Before discussing the flow diagram, it might be helpful to understand that each transfer on the CPU bus 317 is typically made up of an initial address portion which is provided by the candidate granted the address portion of the CPU bus followed by a data portion, if necessary, which is provided by such candidate on the data portion of the CPU bus. The system can operate in a non-pipeline mode, shown in FIG. 21A where two consecutive transfers, here from two different candidates (e.g., a first transfer from the CPU and a second transfer from the data pipe DMA (DPDMA), do not overlap in time, or in a pipeline mode, shown in FIG. 21B, where an address portion of the second transfer can begin prior to the completion of the data portion of the first transfer (that is, the two transfers overlap). This overlap is sometimes referred to as "pipelining"

Referring now to the flow diagram in FIG. 20, the control 1004 assigns the potential bus grant (XBG_)' to one of these four candidates based on the priority/fairness algorithm provided by the Truth-Table in Priority/Fairness controller 1002 (FIG. 18) described above in connection with FIG. 19 (where X is a general designation for the candidate, that is, X is either CPU 310, the DMA REC 424, the DMAXMT 418, or the data pipe DMA 403). As indicated above, the potential address bus grant signal is either: (CPU_BG_)', (DMAREC_BG_)', (DMAXMT_BG_)' or (DPDMA_BG_)'.

The control 1004 checks to determine whether the address portion of the CPU bus 317 is available (Step 1204). If the address portion of the CPU bus 317 is available, the Priority/Fairness controller 1002 asserts the potential bus grants. More particularly, the Priority/Fairness controller 1002 provides a logic 1 signal on exactly one of the lines $1206_1$, $1206_2$, $1206_3$ or $1206_4$ (FIG. 18) which will potentially be latched into one of the registers $1208_1$, $1208_2$, $1208_3$, or $1208_4$. Thus, for example, if the potential bus grant was to the CPU 310, and the address portion of the CPU bus 317 was available, the Priority/Fairness controller 1002 would issue a logic 1 on line $1206_1$ and the potential bus grant signal (CPU_BG)' would be latched into register $1208_1$ in response to a system clock, CLK, thereby providing the actual bus grant signal CPU_BG_, in this example. Further, the control 1004 maintains a record of the most recent recipient of the CPU bus grant (i.e., the STATUS information), as well as adjusting the count limit flags, if necessary (Step 1206). Thus, in step 1206, control 1004 provided the logic signals for STATUS (i.e., CPU_BG_STATUS, DMAREC_BG_STATUS, DMAXMT_BG_STATUS, and DPDMA_BG_STATUS) and the logic signals for Count Limit (i.e., CPU_BG_CNTLIM, DMAREC_BG_CNTLIM, DMAXMT_CNTLIM, DPDMA_BG_CNTLIM). Thus, it is noted that the priority/fairness controller 1002 makes the potential bus grant as a result of a feedback operation, i.e., the information produced in Step 1206 (i.e., X_BG_STATUS, and X_BG_CNTLIM, where X is a general designation for the candidate).

Next, after the asserted address bus grant signal X_BG_ in Step 1208, the control 1004 determines whether to assert the data bus grant signal for the candidate X granted access to the address portion of the CPU bus (Step 1210). The X_BG_ signal is stored in the control 1004. If the control 1004 determines that a data phase is required, and determines that the data bus portion of the CPU bus 317 is not busy, the X_DBG_ signal is asserted (Step 1220). More particularly, the potential data bus grant signal (X_DBG_)' generated based on the actual address bus grant signal X_BG_, is gated through one of the AND gates $1221_1$, $1221_2$, $1221_3$ $1221_4$ by the address bus grant signal X_BG_ to a corresponding one of the registers $1222_1$, $1222_2$, $1222_3$ $1222_4$. Thus, if the candidate being granted access to the address portion of the CPU bus is the CPU, the CPU_BG_ signal is asserted, as described above, and the potential data bus grant to the CPU, i.e., (CPU_DBG_)' is gated through AND gate $1221_1$ to register $1222_1$, such signal (CPU_DBG_)' being loaded in such register $1222_1$ in response to the system clock, CLK, to provide the actual data bus grant signal CPU_DBG_, in this example.

It should be noted that the following other signals are fed to the control 1004 from the CPU bus 317: an "address bus busy" signal; a "data bus busy" signal, an "address only" signal (which, if asserted, the control 1004 will not assert a potential data bus grant signal (XDBG_)' to the corresponding one of the AND gates $1221_1$, $1221_2$, $1221_3$ $1221_4$ in Step 1220 (FIG. 20); the system clock CLK; and, a "global reset" signal.

Data Pipe DMA 403

Figure 22:
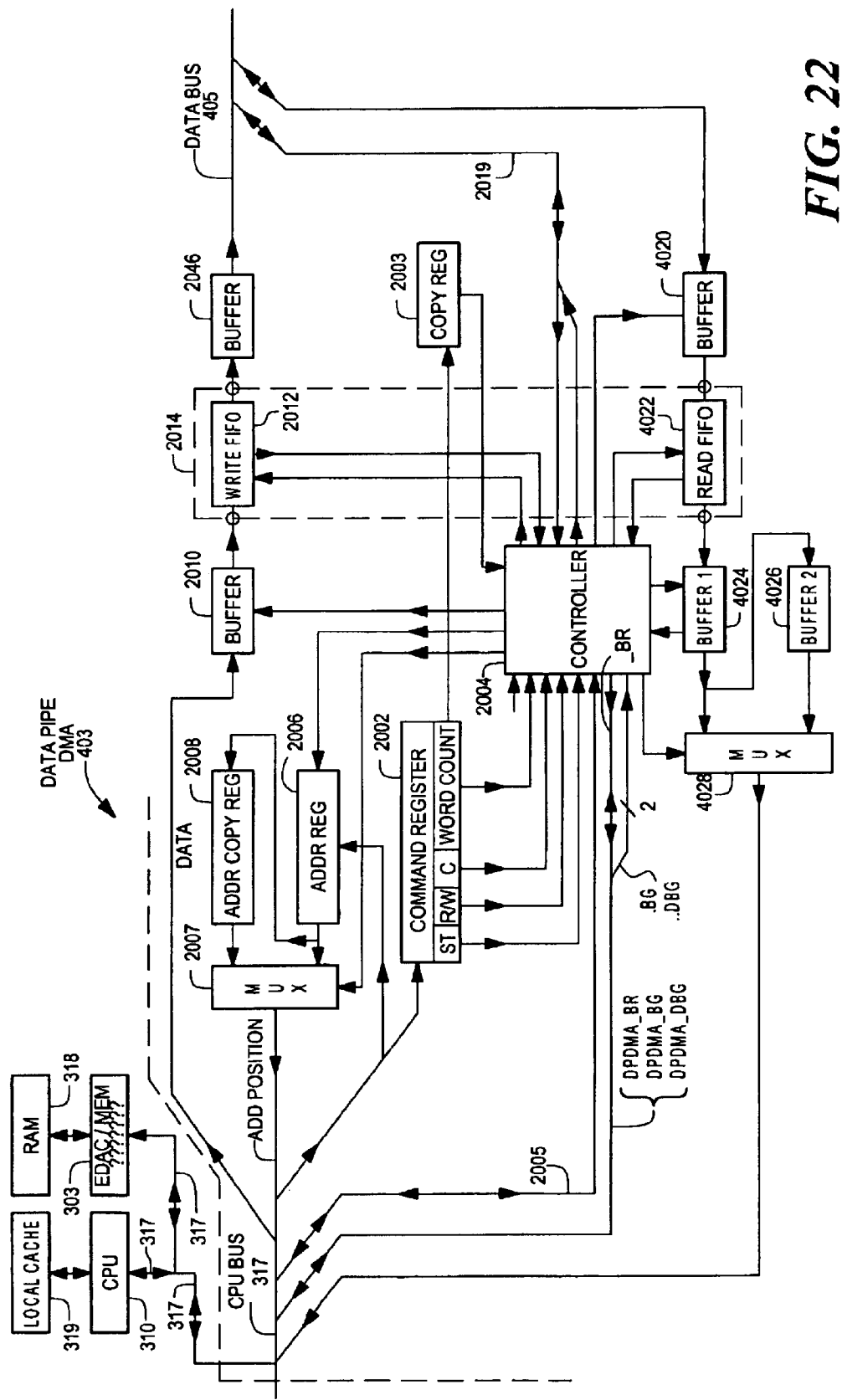
FIG. 22 is a block diagram of a data pipe DMA of FIG. 17.

Referring now to FIG. 22, the data pipe Direct Memory Access (DMA) 403 is shown in more detail. As noted from FIG. 7, the data pipe DMA 403 is connected to the random access memory 312 via the EDAC/memory controller 303 and CPU bus 317. The DMA 403 is also connected to the CPU 310 via the CPU bus 317. It should also be noted that the CPU 310 is connected to the local cache 319. Finally, is should be noted that the selector section 300 in FIG. 7, and described in detail below, is not shown for convenience.

The data pipe DMA 403 (FIG. 22) includes a command register 2002 and an address register 2006, which receive the following information from the CPU 310 via the CPU bus 317 when the CPU wishes a direct transfer of data between the RAM 312 and the global cache memory 220 via the data pipe 316 (FIG. 7): (1) a read/write bit (R/W) indicating whether the data is to flow from the RAM 312 to the global cache memory 220 (i.e., a write command, W) or whether the data is to flow from the global cache memory 220 to the RAM 312 (i.e., a read command, R); (2) an initial address which gets stored in the address register 2006, indicating the initial address of the data in RAM 312; (3) a word count, here a 64 bit word, indicating the number of addresses of data to be transferred beginning with the initial address; (4) an indication by the CPU 310 of whether a coherency check, C, should be made, (i.e., a check of whether the most recent data to be transferred is in the local cache memory 319); and (5) a start command which initiates the DMA transfer. The information stored in the command register 2002 is fed to a DMA controller 2004. Also fed to the controller 2004 via the CPU bus 317 are other control signals from the CPU 310 on CPU control bus 2005 as well as data pipe DMA bus grant and data bus grant signals (DPDMA_BG_, DPDMA_DBG_) from the CPU bus arbiter 414 (FIG. 7) described above in connection with FIGS. 17–22. It should be noted that the controller 2004 issues to the CPU bus arbiter 414 (FIG. 7) via the CPU bus 317 the data pipe DMA bus request signal DPDMA_BR_, described above in connection with FIGS. 17–22.

In response to start signal, ST, the controller 2004 reads the information in the command register 2002 to determine whether the command is either a read command (R) or a write command (W).

It should be noted that data in the local cache memory 319 couldn't be directly transferred to the DMA 403. Rather, a two CPU bus cycle operation is required. For example, in order for the DMA 403 to obtain the "most recent" data in the local cache memory 319, during a first CPU bus cycle, the "most recent" data at a particular address in the local cache memory 319 is transferred to the RAM 403 via the CPU bus 317 under the control of the CPU 310 and, during a subsequent CPU bus cycle initiated by the DMA 403, the transferred "most recent" data now in the RAM 312 is placed on the CPU bus 317 for transfer by the DMA 314 to the data pipe 316. Likewise, in order to store the "most recent" data from the data pipe 316 at a particular address in the RAM 403 when "non-most recent" (i.e., old) data at that address is in the local cache memory 319, during a first CPU bus cycle, the "non-most recent" data in the local cache memory 319 is transferred to the RAM 403 via the CPU bus 317 under the control of the CPU 310 and, during the next CPU bus cycle, the "non-most recent" data in the RAM 312 is then overridden with the "most recent" data from the data pipe 317 which has been placed on the CPU bus by the DMA 403. The CPU 310 sometimes requests a coherency check. Such coherency check is used to determine whether the "most recent" data is in the local cache memory 319. When such coherency check is requested by the CPU 310, the CPU 310 provides a logic 1 for bit C; otherwise, C=logic 0. The above process of repeat transfers occurs only in the case where C=1.

Considering a write command, W, where data is to be read from the RAM 312, in response to a bus grant signal DPDMA_BG_ and written into the global cache memory 220, assuming a coherency check is not requested (i.e., the coherency bit, C=logic 0), the address in the register 2006 passes through the multiplxer 2007 and is placed on the address portion of the CPU bus 317, along with a control signal on control bus 2005 portion of the CPU bus 317, indicating to the CPU 310 that the data at this address need not be coherent (i.e., controller 2004 does not care if the CPU 310 has a copy of this data in the local cache memory 319). Further, a copy of the address is stored in a copy register 2008. Also, the contents of the address in the address register 2006 are incremented by the controller 2004 and the pre-incremented address is stored in the copy register 2008. In other words, during any CPU bus cycle the contents of the address register 2006 provides the current address and the copy register 2008 stores a copy of this address. The address incrementing process repeats until the word count indicates to the controller 2004 that all addresses have been supplied to the address register 2006.

As addresses are placed on the CPU bus 317, data is placed on the data portion of the CPU bus 317 as described above in connection with FIGS. 21A and 21B. The data on the CPU bus 317 that is read from the RAM 312 are transferred to the data pipe 316 via a DMA bus 405 under control of DMA 403 (see also FIG. 7).

More particularly, an address is placed on the CPU bus 317 via multiplxer 2007. Data at that address is read from the RAM 312 and is placed on the CPU bus 317. This data, at such address, is then stored in buffer 2010 under the control of the controller 2004. The process repeats for as many addresses as indicated by the word count stored in the command register 2002. Here, the buffer 2010 is able to store data from up to four addresses for each CPU data bus cycle. Each address corresponds to a byte of data.

After each CPU cycle, the data in the buffer 2010 becomes transferred to the write FIFO 2012 of FIFO 2014 under the control of the controller 2004. A measure of the amount of data in the write FIFO 2012 (i.e., the percent full or watermark) is sent to the controller 2004. At some predetermined level, for example when the write FIFO is more than ⅛th empty, and with the word count not being exceeded, the controller 2004 issues another data pipe bus request, DPDMA_BR_.

Considering the case where the CPU 310 requests a coherency check (i.e., when the coherency bit C is a logic 1 bit), upon detection of the logic 1 C bit, the controller 2004 operates multiplexer 2007 to initially feed the address stored in the address register 2006 to the address portion of the CPU bus 317. Also the controller 2004 issues a coherency control signal on bus 2005. In response to this control signal, CPU 310 checks to see if the data at the address on the CPU bus 317 is residing in its local cache memory 319. If the data at the address on the CPU bus 317 is not residing in the local cache 319, but rather is in the RAM 312, the CPU 310 signals the controller 2004 via bus 2005 indicating such scenario. In such case, the controller 2004 loads the data on the bus 317 into buffer 2010 and then proceeds to write this data in the buffer 2010 into the write FIFO 2014. If the requested data is resident in the local cache memory 319, the CPU 310 signals the controller 2004 via bus 2005 indicating such scenario. In such case, the controller 2004 loads the data on the bus 317 into buffer 2010; however, here the controller 2004 does not load the data in buffer 2010 into the write FIFO 2014. More particularly, when an address is placed on the CPU bus 317, the CPU 310 reads the addresses on such bus 317 and determines whether the most recent data at that address is in the local cache 319 or in the RAM 312. If the most recent data in the local cache 319 and the CPU 310 wants the most recent data (i.e., the data in the local cache 316), the CPU 310 transfers the data from its local cache 319 to the RAM 312 via the CPU bus 317. Further the controller 2002, in response to the logic 1 coherency bit, C, described above, the data in the buffer 2010 does not get written into the write FIFO 2012. On the next CPU cycle initiated by the controller 2002, the controller 2002 provides a control signal to the multiplexer 2006 so that the address in the copy register 2008 (which is the same as the address on the CPU bus 317 during the previous CPU cycle) gets placed on the CPU bus 317 even though during this next CPU cycle the incremented address is stored in the register 20064. Now, the data transferred by the CPU 310 to the RAM 312 (i.e., the most recent data) is placed on the CPU bus 317, overwrites the non-most recent data in the buffer 2010 which had been stored in the buffer 2010, and then finally the most recent data now stored in the buffer 2010 gets stored in the write FIFO 2012.

The data in the write FIFO 2012 transfers to the DMA bus 405 via buffer 2016, as indicated, whenever the data pipe 316 (FIG. 7) is ready to receive data. More particularly it should be noted that a copy of the word count placed in the command register 2002 is also stored in the word count copy register 2003. The data is transferred by the controller 2004 from the FIFO to the DMA bus 405 until the copy of the word count in register 2003 indicates to the controller 2004 that all words have been transferred.

Considering the case where data in the global cache memory is to be read from the global cache memory 220 and stored in the RAM 312. It is first noted that the CPU 310 has requested data from the global cache memory 220 and that such data has been transferred to the buffer 4020 and then to the read FIFO 4022. Here, the read/write (R/W) bit provided by the CPU 310 indicates a read operation. This R/W bit, along with the start address, word count and coherency bit, C, information is stored in the command register 2002.

More particularly, in response to the start bit ST in the command register 2002, the controller 2004 monitors the DMA bus 405 for a indication by the data pipe 316 that the is ready to be transferred to the RAM 312. When such indication is provided via DMA bus 405 portion 2019, the DMA 403 proceeds to read data from the data pipe over the DMA bus 405 and stores the data in the buffer 4020 and then transfers into the read FIFO 4022. The amount of data stored in the read FIFO 4022 is monitored so that it doesn't overflow with data. Further, each time data is written into the read FIFO 4022, the copy of the word count stored in register 2003 is decremented. This process continues until the word count copy register 2003 indicates to the controller 2004 that the entire data transfer is complete.

Still further, during each CPU cycle, an address is supplied on the address portion of the CPU bus 317 by the multiplexer 2006 indicating the address in the RAM 312 where the data on the data portion of the CPU bus 317 is to be stored. As noted above in connection with the write operation the address stored in the address register 2006 is stored in the address copy register 2008 during an CPU bus address cycle. Still further as described above, during successive CPU bus cycles the controller 2004 increments the address register 2006.

More particularly, the data read from the read FIFO 4022 is first stored in buffer 4024 and during the CPU cycle the data in buffer 4024 is transferred to buffer 4026. The data in either buffer 4024 or 4026 is fed to the output of multiplexer 4028 and thus is placed on the data portion of the CPU bus 317.

Considering the case when the CPU does not request a coherency check, i.e., the coherency bit C=logic '0'. In such case, the data in buffer 4024 is transferred through multiplexer 4028 and is stored in the RAM 312 at the address provided at the address register 2006.

Considering the case where the CPU 310 requests a coherency check (i.e., when the coherency bit, C=a logic 1). When the controller 2004 detects such logic 1 bit, the controller 2004 operates multiplexer 2007 to initially feed the address stored in the address register 2006 to the address portion of the CPU bus 317. Also the controller 2004 issues a coherency control signal on bus 2005. In response to this control signal, CPU 310 checks to see if the data at the address on the CPU bus 317 is residing in its local cache 319. If the data at the address on the CPU bus 317 is not residing in the local cache 319, but rather is in the RAM 312, the CPU 310 signals the controller 2004 via bus 2005 indicating such scenario. In such case, the controller 2004 puts the data in buffer 4024 via the muxliplexer 4028 on the CPU bus 317 and such data get written into the RAM 312 at the address provided by register 2006. If the data is resident in its local cache 319, the CPU 310 signals the controller 2004 via bus 2005 indicating such scenario. Further, the CPU 310 writes the data in its local cache 319 into the RAM 312, thereby destroying the data pipe data that was just written into the RAM 312. In order to restore this data pipe data a second CPU bus cycle is required. In response to the control signal asserted by the CPU 310, the DMA controller 2004 requests for the CPU bus 317 to repeat the previous transfer of asserting the signal DPDMA_BR. The controller 2004, during the next CPU bus cycle initiated by it, transfers the copy of the data pipe data which was stored in register 4026 into RAM 312 at the same desired address since the copy of this desired address was stored in register 2008. Thus the process flows as follows. The data pipe data at a particular address is written into the RAM 312, is overwritten by data in the local cache 319, and such data is then over written by the desired data pipe data.

CPU Bus Selector

Referring to FIG. 7, the coupling of various agents, such as, for example, the status register 412, trace buffer 416 and DMA unit 403 are coupled to the CPU bus through a selector section 3000. More particularly, selector section 3000 includes a selector 3002, a parity generator/parity checker 3004 and a controller 3006, all arranged as shown.

When the CPU 310 is granted access to the CPU bus 317, and the CPU 310 wishes to couple one of the agents to the data portion of the CPU bus 317, the CPU 310 issues a signal, more particularly an address, on the CPU bus 317. The controller 3006 in response to the address produces a control signal indicating the selected one of the agents the CPU wants to have access to the data portion of the CPU bus 317. The controller 3006, in response to such address, operates the selector 3002 to thereby couple the selected one of the agents selected by the CPU 310 through the selector 3002 to the CPU bus 317. Further, the selector section 3000, as noted above, includes a parity generator/parity checker 3004. Since all agents shown here fed to the selector 3002 are on the same chip, here the FPGA message engine/CPU controller 314, the parity generator/parity checker 3004 generates parity and appends such parity to the data placed on the CPU bus 317. If an agent fed to the selector 3002 were from another chip, not shown, (i.e., an "off-chip" agent), the parity generator/parity checker 3004 would check parity of such "off-chip" agent and report any parity error to the status register 412. It is noted that parity is then regenerated and appended to the data placed on the CPU bus 317. Accordingly, other embodiments are within the scope of the following claims.

What is claimed is:

1. A bus arbitration method for granting access to a common bus having coupled thereto a plurality of candidates desiring access to such bus, one of such candidates being granted access to such bus in accordance with the a method comprising:

granting default access to the bus to a predetermined one of the candidates or, in the absence of such default granting;

granting access to the bus to one of the candidates in accordance with predetermined priority criteria, such grant being modified when a plurality of such candidates request the bus, such grant to the bus then being such that the one of the candidates requesting the bus having the highest priority in the predetermined priority criteria not be granted the bus if such candidate was the recipient of the previous bus grant and with each one of the requesting plurality of candidates having a predetermined independent "wait count limit" indicating that such requesting one of the plurality of candidates has waited for n assertions of a grant to the bus to other requesting candidates without being granted the address bus, where n is a predetermined integer, and wherein if one of such candidate's "wait count limit" is reached, such candidate receives the bus grant, except that if plural requesting candidates simultaneously reach their respective "wait count limit", then the bus grant will be granted in accordance with the predetermined priority criteria;

wherein when multiple candidates are requesting the bus, the "highest priority" requesting candidate will not be granted the bus if such candidate was the recipient of the previous address bus grant; and wherein the bus arbitration includes determining whether or not one of the candidates has requested two consecutive transfers by asserting a double-access request for the bus.

\* \* \* \* \*